(12) United States Patent
Burden et al.

(10) Patent No.: US 7,891,567 B2
(45) Date of Patent: Feb. 22, 2011

(54) IDENTIFICATION TAG, OBJECT ADAPTED TO BE IDENTIFIED, AND RELATED METHODS, DEVICES, AND SYSTEMS

(75) Inventors: Adrian Paul Burden, Singapore (SG); Peter Malcolm Moran, Singapore (SG); Yen Peng Kong, Irvine, CA (US); Yan Zhao, Shanghai (CN)

(73) Assignee: Agency for Science, Technology and Research, Singapore (SG)

( * ) Notice: Subject to any disclaimer, the term of this patent is extended or adjusted under 35 U.S.C. 154(b) by 774 days.

(21) Appl. No.: 11/795,658

(22) PCT Filed: Jan. 19, 2005

(86) PCT No.: PCT/SG2005/000012
§ 371 (c)(1),
(2), (4) Date: Jul. 18, 2007

(87) PCT Pub. No.: WO2006/078220
PCT Pub. Date: Jul. 27, 2006

(65) Prior Publication Data
US 2008/0210757 A1    Sep. 4, 2008

(51) Int. Cl.
*G06K 7/08*    (2006.01)
*G06K 19/06*    (2006.01)
(52) U.S. Cl. .................... 235/449; 235/493
(58) Field of Classification Search .............. 235/380, 235/449, 488, 493, 494
See application file for complete search history.

(56) References Cited

U.S. PATENT DOCUMENTS

| | | | |
|---|---|---|---|
| 4,238,674 A | 12/1980 | Kuerbitz | |
| 4,395,628 A | 7/1983 | Silverman | |
| 4,557,550 A | 12/1985 | Beals | |
| 4,682,794 A | 7/1987 | Margolin | |
| 5,035,960 A | 7/1991 | Kamigaki | |
| 5,139,884 A | 8/1992 | Daimon | |
| 5,430,279 A | 7/1995 | Fernadez | |
| 5,988,500 A * | 11/1999 | Litman | 235/449 |
| 6,254,002 B1 | 7/2001 | Litman | |

(Continued)

FOREIGN PATENT DOCUMENTS

EP    0 226 365 B1    3/1993

(Continued)

OTHER PUBLICATIONS

Pores in III-V Semiconductors, Helmut Foll, et al., Adv. Mater. 2003, 15, No. 3, Feb., pp. 183-198.

(Continued)

*Primary Examiner*—Thien M Le
(74) *Attorney, Agent, or Firm*—Foley & Lardner LLP

(57) ABSTRACT

Disclosed is an object (200) such as a credit card, bank note, document, label, etc which carries an identification layer (103) which contains readable information. The identification layer can include randomly distributed conductive/magnetizable particles (303), semiconductive particle, optically active particles and the like. The identification layer is sandwiched between an upper layer (105) and lower layer (104) to form the object. At least some of the particles are exposed along one edge (102) of the object and can be read by a read head (201) which moves along the edge.

25 Claims, 38 Drawing Sheets

U.S. PATENT DOCUMENTS

| | | |
|---|---|---|
| 6,582,138 B1 | 6/2003 | Meunier et al. |
| 2001/0010333 A1 | 8/2001 | Han |
| 2002/0145050 A1 | 10/2002 | Jayaratne |
| 2005/0047593 A1* | 3/2005 | Hampp ..................... 380/54 |

FOREIGN PATENT DOCUMENTS

| | | |
|---|---|---|
| EP | 0 696 779 A1 | 2/1996 |
| EP | 0 824 242 A2 | 2/1998 |
| EP | 0 583 709 B1 | 6/1999 |
| EP | 1 182 608 A1 | 2/2002 |
| EP | 0 820 031 B1 | 4/2004 |
| EP | 1 031 115 B1 | 4/2004 |
| GB | 2 099 756 A | 12/1982 |
| GB | 2 324 065 A | 10/1998 |
| JP | 08-287454 A | 11/1996 |
| JP | 09-259243 A | 10/1997 |
| JP | 09-277767 A | 10/1997 |
| JP | 09-297938 A | 11/1997 |
| JP | 10-112077 A | 4/1998 |
| JP | 10-124643 A | 5/1998 |
| JP | 10-317300 A | 12/1998 |
| WO | WO 87/01845 | 3/1987 |
| WO | WO 87/06041 | 10/1987 |
| WO | WO 03/017192 A1 | 2/2003 |
| WO | WO 03/052701 * | 6/2003 |
| WO | WO 2004/013735 A2 | 2/2004 |

OTHER PUBLICATIONS

High density hexagonal nickel nanowire array, K. Nielsch, et al. Journal of Magnetism and Magnetic Materials 249 (2002) 234-240.

Computer simulation of the spinodal decomposition for a polydisperse polymer mixture, Mikihito Takenaka et al. Physical Review E vol. 48 No. 2, Aug. 1993, R647-R650.

Structure Formation via Polymer Demixing in Spin-Cast Films, Stefan Walheim, et al., Macromolecules 1997, 30, 4995-5003.

Supplementary European Search Report dated Jul. 5, 2010, in corresponding EP 05704832.4, 3 pages.

English translation of Japanese Office Action dated Sep. 14, 2010, in corresponding JP 2007-552093, 2 pages.

* cited by examiner

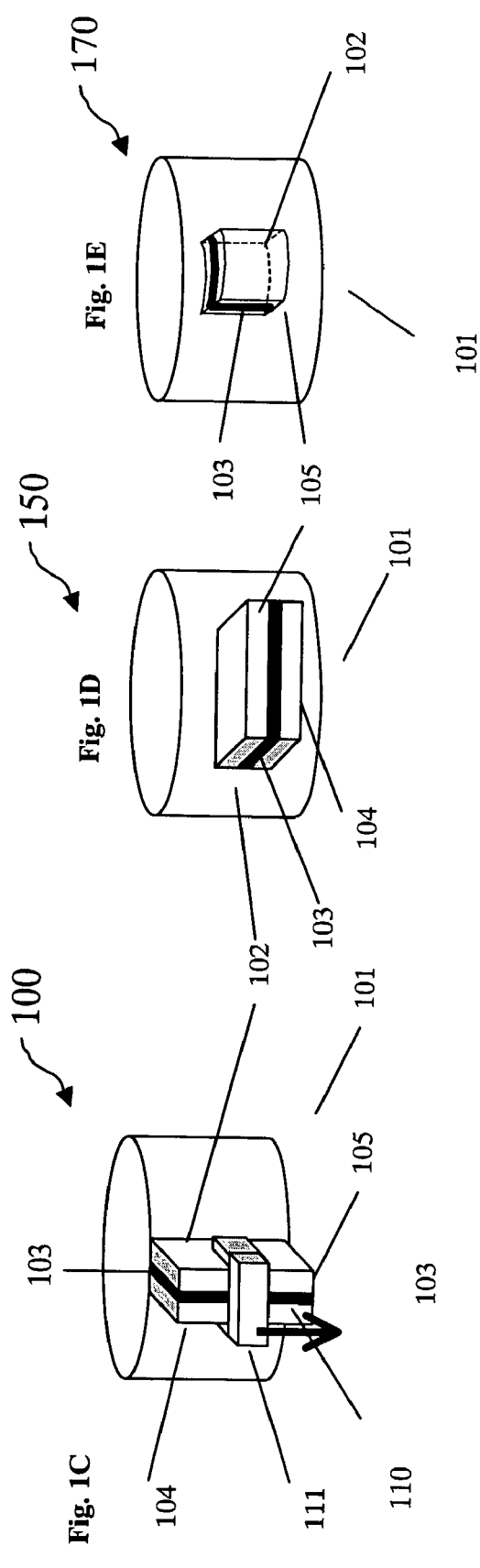
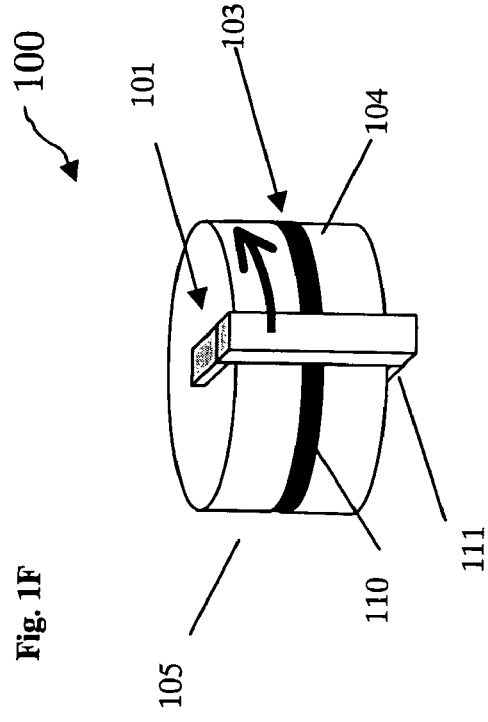

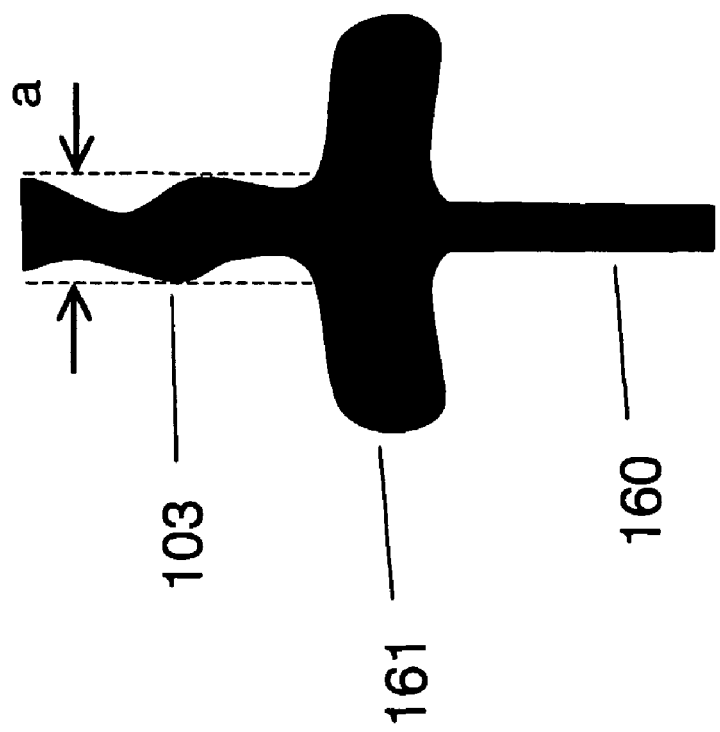
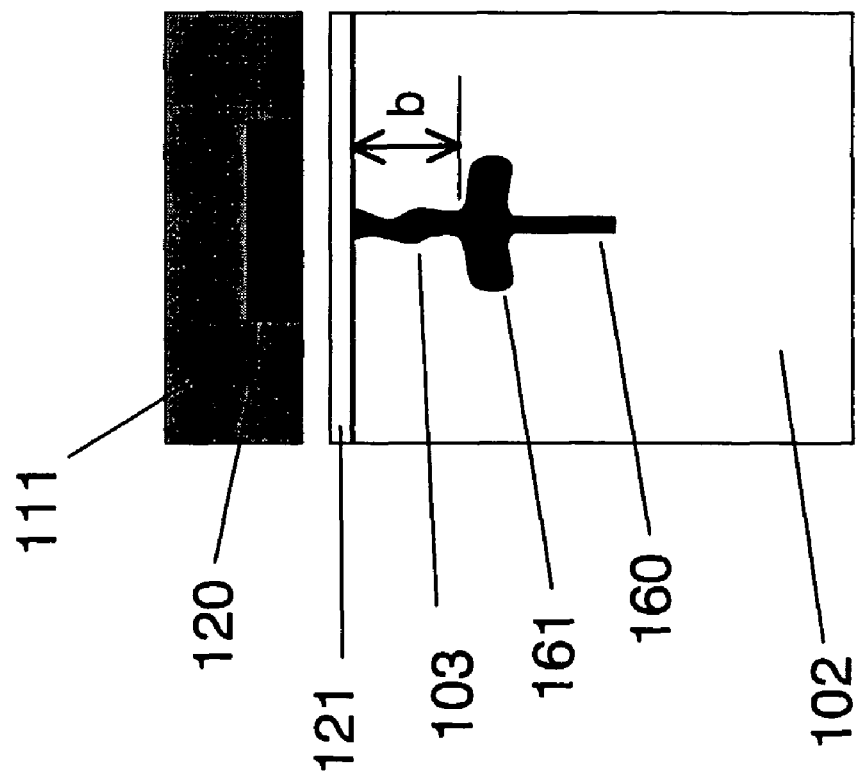
Fig. 1G(ii)

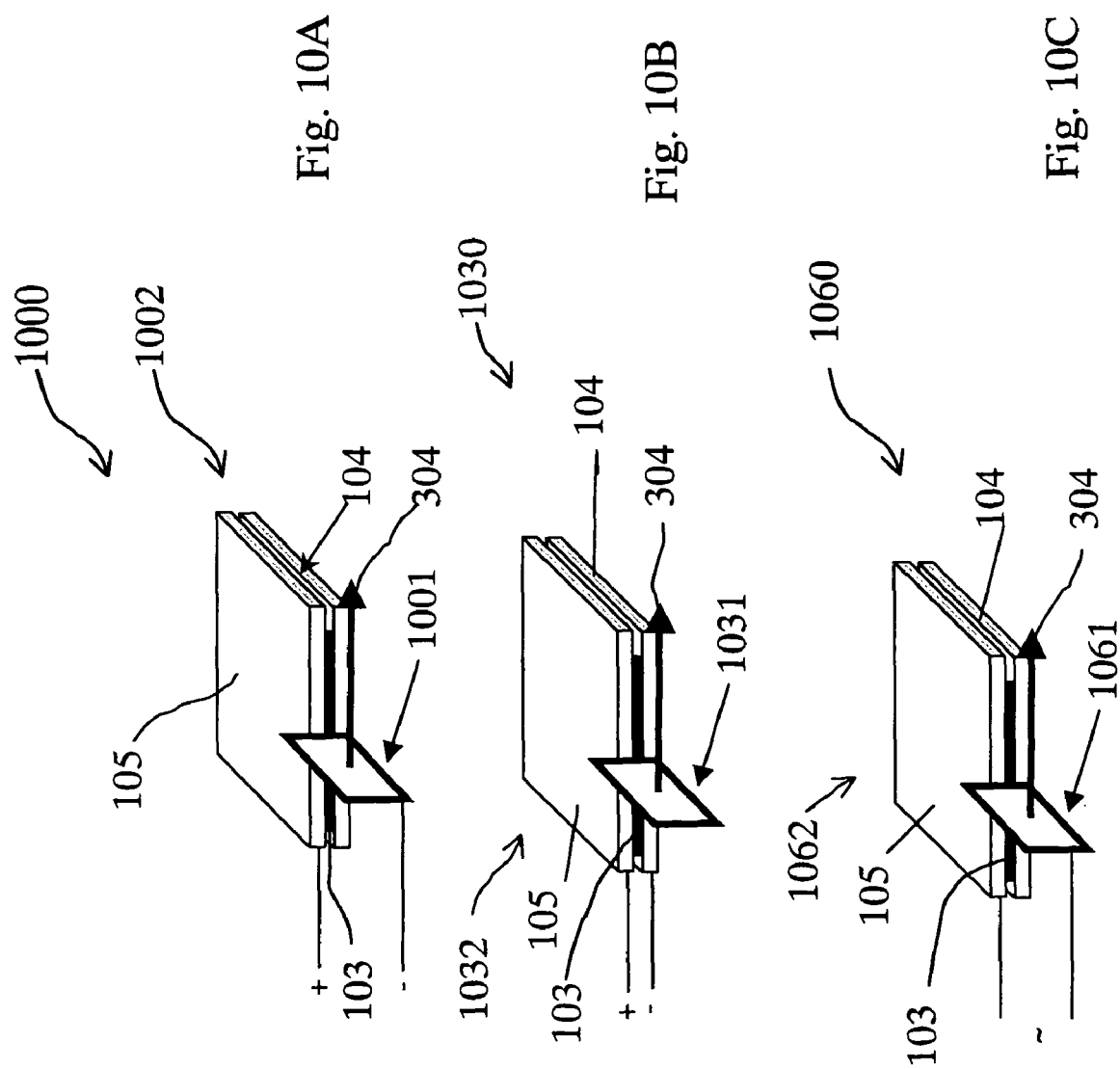

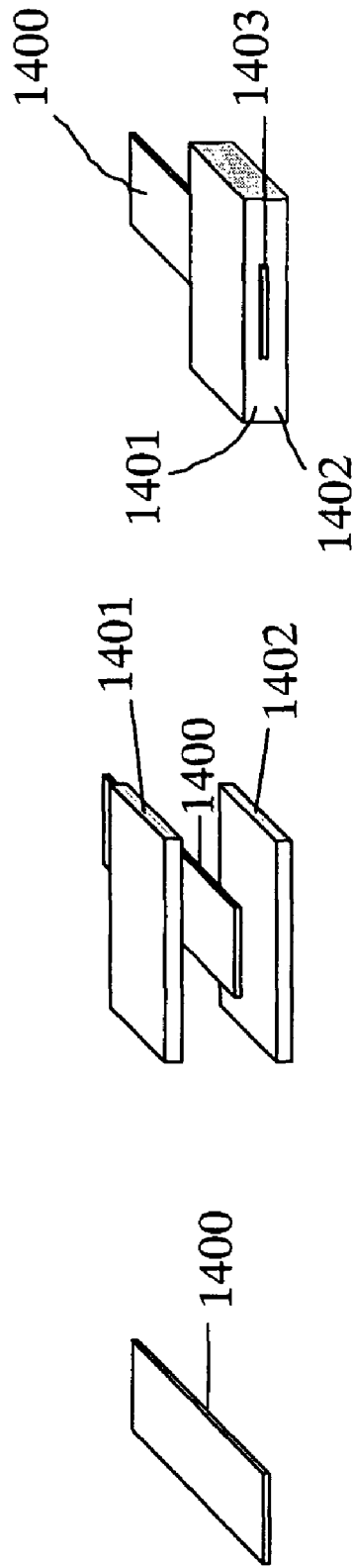
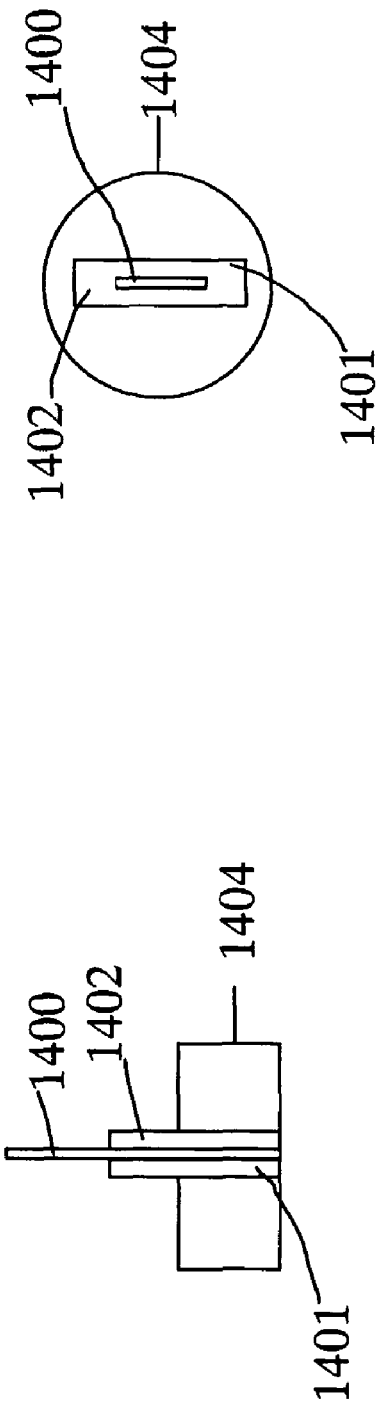
Fig. 14A  Fig. 14B  Fig. 14C  Fig. 14D  Fig. 14E

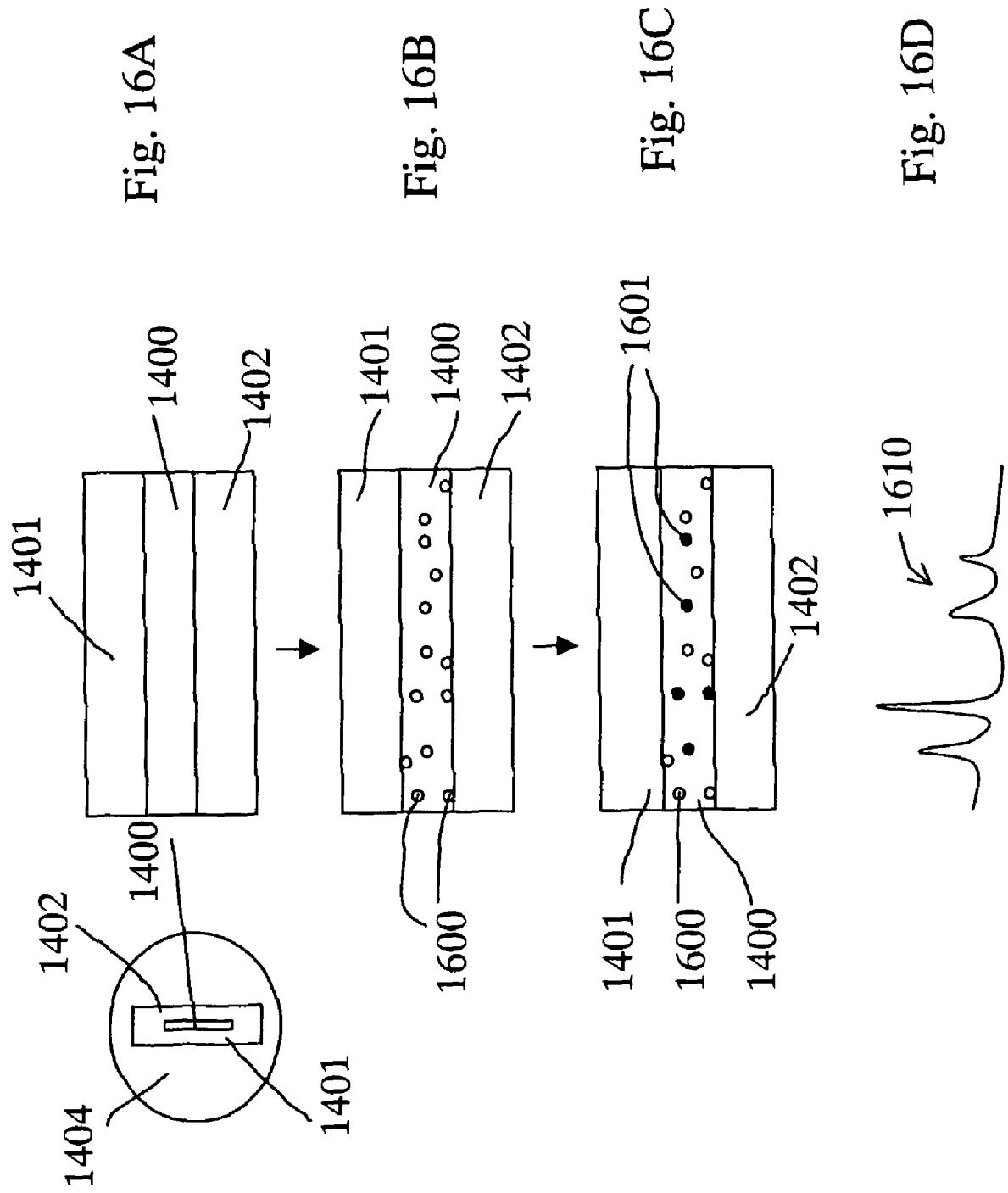

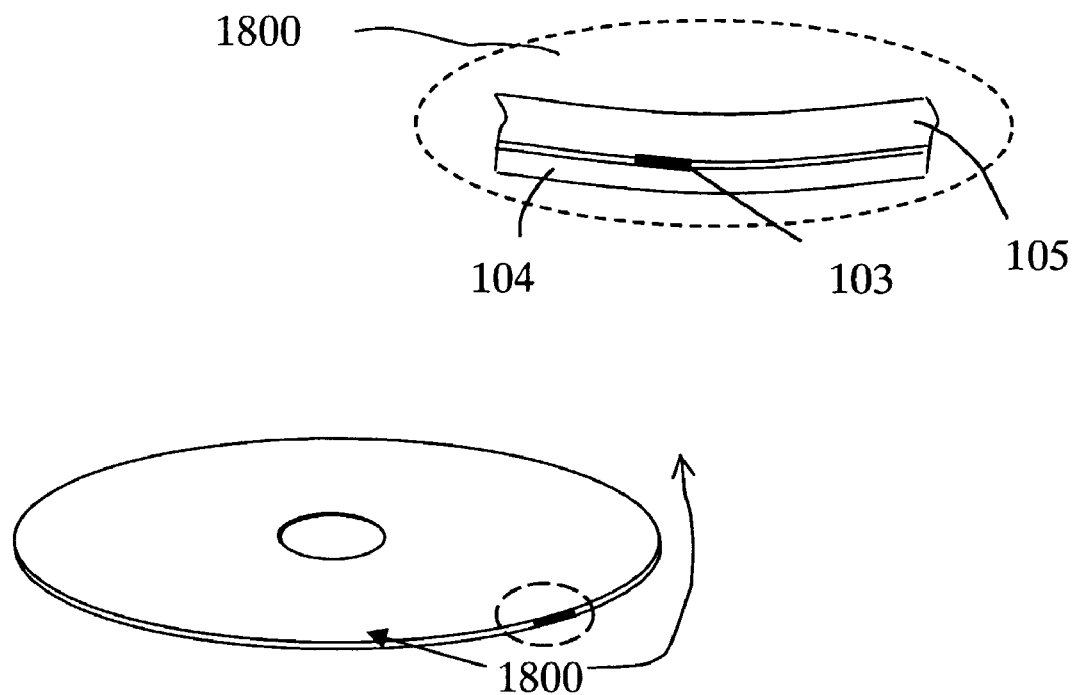
Fig. 18
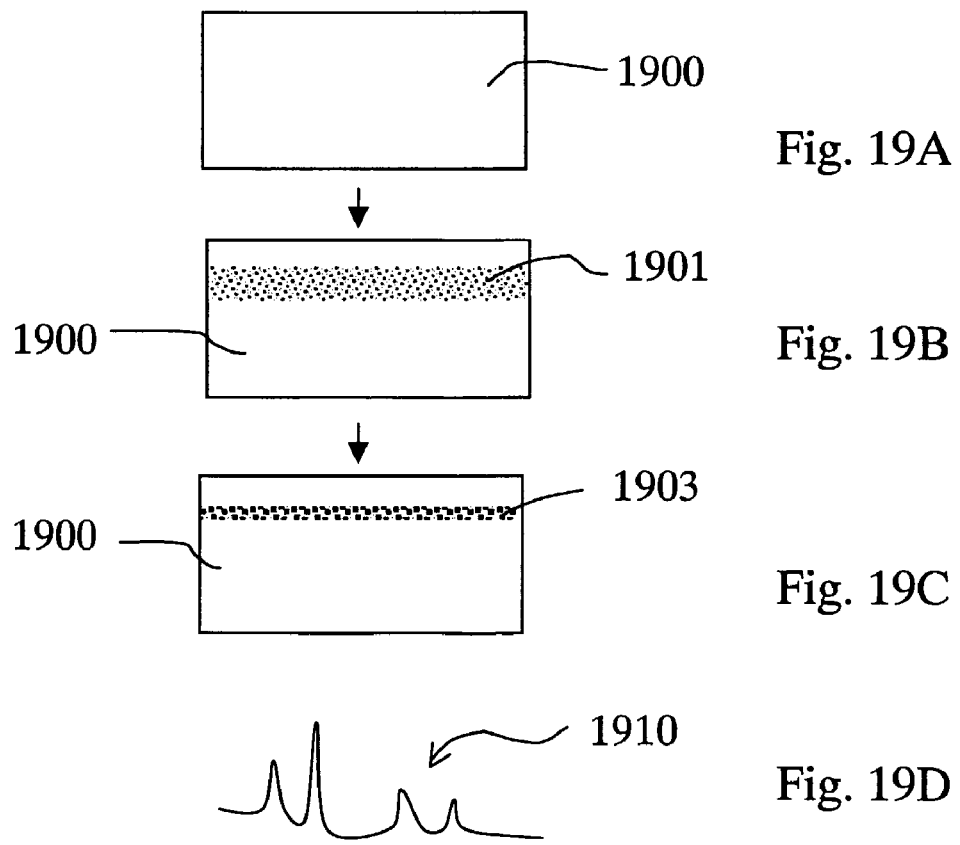
Fig. 19A
Fig. 19B
Fig. 19C
Fig. 19D

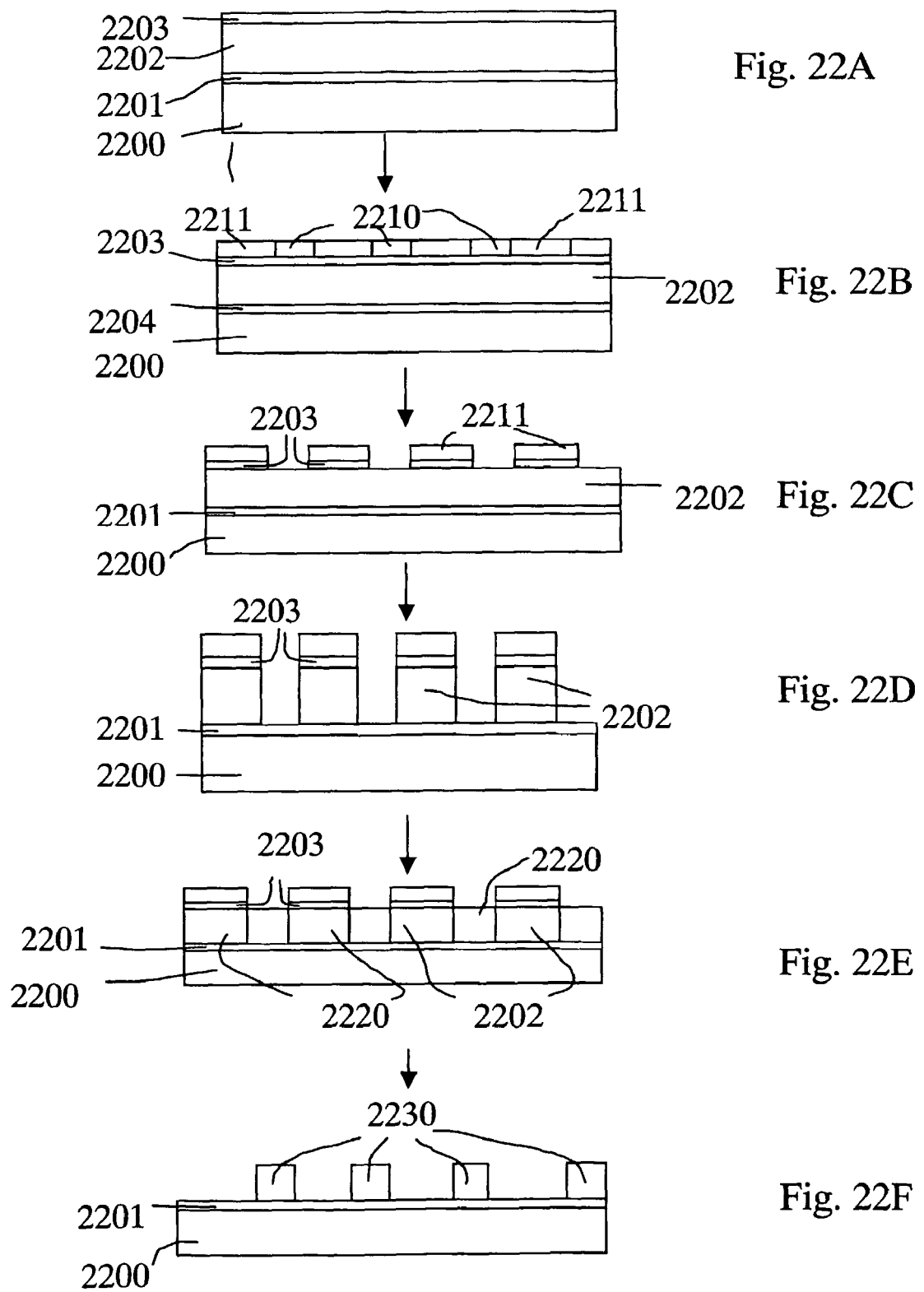

IDENTIFICATION TAG, OBJECT ADAPTED TO BE IDENTIFIED, AND RELATED METHODS, DEVICES, AND SYSTEMS

The present invention relates to an identification tag for identifying an object to which the identification tag may be attached as well as to an object that is adapted to be identified. In particular, the invention relates to such an identification tag and an object that is adapted to be identified, which each comprises an identification layer in which readable identification features are located. In addition, the present invention relates to a reading device, an identification arrangement, an identification system, a method for forming an identification tag and a method for reading identification features (information) from the identification tag or the object that is adapted to be identified.

Identification technology has been an area of widespread interest and development for many years. Common methods of identification rely on the use of readable tags. Such tags range from barcodes, holograms and machine-readable tags (such as magnetic stripes and Radio Frequency Identification (RFID) chips) on the visible scale, to fluorescent inks and micron-sized scattered particles at microscopic scales.

One of the main reasons for the continued interest in identification technology is the incidence of fraud largely attributable to transactions which have been carried out in a non-secure manner. The need for more secure systems of transactions is apparent. For example, there is a need to reliably authenticate personal documents such as passports, certificates, work permits, visas and driver's licenses as well as commercial instruments such as ATM cards, credit cards, currency, cheques and other instruments of commercial transactions at the point of transaction. In another example, it would be extremely beneficial to the software and entertainment industries to be able to uniquely fingerprint items such as compact discs (CDs) and digital versatile disks (DVDs) to prevent the use of pirate copies. In yet another example, where articles of great commercial value, such as precious stones, artwork, and antiques, are transacted, it is vital that the party receiving such articles is able to ascertain the identity of the articles before issuing credit. At a more common level, there is also a need for an inexpensive and reliable authentication system for any physical object that needs to have its identity verified subsequently. Commercially, this facilitates 'brand protection'.

Several methods of identification are known and are described in the following.

A well-known identification method relies on information encoded in a magnetic stripe, also known as a magnetic barcode, as found on a credit card. A magnetic stripe is typically made up of small magnetic particles set in a resin. The particles are either applied directly to the card or made into a stripe on a plastic backing which is applied to the card. The stripe is encoded by having regions of these particles (e.g. iron particles) magnetized in a particular direction, i.e. polarity of the magnetic particles in the stripe is changed locally, to define bits of information. By changing the direction of the encoding along the length of the stripe, information is written and stored on the stripe. Thus, identification information such as a user account number is first programmed into the magnetic stripe by a write head, and subsequently verified by reading the magnetic stripe with a read head. The user is then verified by having the user sign a document or chit, for example, or enter a personal identification number, to verify the user's identity.

Such systems are inherently non-secure because the signature and data encoded in the magnetic stripe can be forged easily. Furthermore, the magnetic media is prone to corruption when the magnetic stripe is brought into close proximity with magnetic fields.

In the following, prior art in the field of identification devices will be mentioned.

European patent application EP 0 824 242 A2 describes random magnetic rods, fibres or filaments lying on the surface of an article, the positions of which are then read and used to provide a unique signature.

US Patent application 2001/0010333 describes measuring the effect of light guided through credit cards and other planar/laminated structures and detecting the unique pattern that emerges at the edge of the item. This reference also considers the use of predetermined patterns and random patterns of such fibres as well as the effect of light scattering from opaque and transparent regions to generate patterns for identification purposes.

U.S. Pat. No. 4,218,674 describes the measurement of random surface imperfections in materials as a means of identifying an object.

The PCT application WO 2004/013735 describes an identification means that is printed using, for example, magnetic toner. This is similar to a 2D barcode pattern, and is a means of writing security information to an object in a pixellated form, like a bitmap.

PCT application WO 87/01845 and the European Patent EP 0236 365 B1 disclose the use of microwave interrogation of random fibres as a means of creating a signal for authentication.

European patent application EP 0 696 779 A1 discloses the use of random patterns of magnetic ink printed on the surface of an object such as a credit card.

European patent EP 0 583 709 B1 discloses the random distribution of particles on a card measured over a surface by electromagnetic scanning and then the signature is linked to a memory chip on the card.

European patent EP 0 820 031 B1 discloses replacing the strip on a credit card to a card in which the whole area contains magnetic material.

The PCT application WO 03/017192 relates to magnetic fibres or filaments on the surface of an object that are interrogated using an induction read head.

US patent application 2002/0145050 relates to storing data in a magnetic stripe of a card relating to its microstructure, and linking it with biometric data.

EP 1 031 115 B1 discloses the attachment of magnetic particle fingerprints to the surfaces of documents, and to read the signature and cross-reference it with another attached label.

U.S. Pat. No. 5,430,279 discusses methods and circuits to detect and authenticate (using a checksum approach) the magnetic jitter in magnetic stripes.

U.S. Pat. No. 4,395,628 discloses the use of microdots of magnetic material as a unique pattern that is written (e.g. using laser beam) to a card as part of its security system.

U.S. Pat. No. 4,557,550 discloses the use of two stripes, one recordable and one permanent to improve security on a card.

Finally U.S. Pat. No. 6,254,002 B1 discloses an anti-forgery security system in the field of casino chips having randomly distributed magnetic particles attached to the surfaces and/or edge of a casino chip to form a source of magnetically readable information.

However, many of the identification systems according to the prior art fail to disclose an identification tag which can be read in an easy and efficient manner, which is inexpensive in production, and which provides sufficient security of verification, i.e. in which the reliability of the identification is sufficiently high.

It is an objective of the present invention to provide an identification system which can be read in an easy and efficient manner, which is inexpensive, and with which the reliability of an identification is sufficiently high.

The objective is achieved among others by providing an identification tag, an object adapted to be identified, a reading device, an identification arrangement, an identification system, a method for forming an identification tag, a method for forming and objected adapted to be identified, and a method for reading identification feature as defined in the respective independent claims.

Such an identification tag is an identification for identifying an object to which the identification tag may be attached, wherein said identification tag comprises an identification layer in which readable identification features are located, wherein a track for reading the identification features exposes the thinnest dimension of the identification layer in such a manner that at least some of the readable identification features are only meaningfully readable from this track. In one embodiment, the identification tag is adapted such that the identification tag is attachable to an object such that at least some of the identification features are only meaningful readable from the thinnest dimension of the identification layer.

An object adapted to be identified is an object that comprises an identification layer in which readable identification features are located, wherein a track for reading the identification features exposes the thinnest dimension of the identification layer in such a manner that at least some of the readable identification features are only meaningfully readable from this thinnest dimension of the identification layer.

Before explaining the invention in more detail, the terminology used herein will be clarified in the following with reference to FIG. 1A and FIG. 1B. As shown in FIG. 1A a tag and an object of the invention may comprise a layer structure with one or more layers, for example two or three.

Layer 1 is the identification layer in which readable identification features are located, wherein this identification layer has dimensions a×b×c. This identification layer 1 typically comprises at least in one part thereof a plurality of randomly distributed particles that form the readable identification features. Typically, the thickness 'a' of the identification layer 1 is less than either 'b' or 'c', preferably much less. There is no need that the identification layer 1 be rectangular; in which case b and c are the largest dimensions of the extent of the in-plane shape. In this respect, it is noted that by "layer" a structure is meant that is substantially long or elongated in two dimensions and thin in the remaining third dimension.

As explained also below, the identification layer 1 may be self-supporting—e.g. particles dispersed in a sheet of polymer, and therefore layers 2 and/or 3 may not be present in some embodiments.

The identification layer 1 may be discontinuous—i.e. individually scattered particles, where the particles mainly all lie in a plane, in which case at least layer 2 or layer 3 are present to support and to adhere.

Layers 2 and 3, if they exist, may be of different dimensions to layer 1, and to each other. There is no requirement for a<f nor a<i, although this may be preferential in some embodiments of the tag or the object of the invention.

The track 4 is formed from one or more of the edges of layer 1 such that the track exposes the thinnest dimension (dimension "a" in FIG. 1) of the identification layer. At least some of the identification features are only meaningfully readable from this track. "Meaningfully readable" as used herein means that on reading the track a unique signal is obtained that is used for identification purposes. This means that in an object or a tag of the invention it is not necessary to expose for reading any edge or parts of the identification layer 1 along or in the b-c plane. Rather, the tag or the object is usually designed/adapted such that only the track 4 can be read and accordingly, no reading along the edges or parts along or in the b-c plane of the identification layer is or needs to be carried out. However, it should also be noted that in practising the invention, that in addition to the track formed from the thinnest dimension "a" other areas, for example, a part of the identification layer in the a-b plane could be read, if desired.

On reading track 4, one obtains a unique signal such as a magnetic/electrical/optical signal termed the 'fingerprint' herein. This fingerprint can be stored (with any suitable processing method such as encoding, digital processing, encryption, compression, filtering if necessary, to name only a few) as a 'signature'.

The fingerprint may be obtained from reading a part or the entire exposed track, for example, from reading along only a part of one edge, along one entire edge or also around the corners or the entire periphery of the identification layer 1 (if exposed to form the track).

Layer 1 may be included as part of the object itself (further layers such as layers 2 and/or 3 may also be present as part of the object), such as in the credit card or CD-ROM examples. Alternatively, in a tag of the invention the layers 1, 2 and 3 may be an object themselves (a tag) that is attached to another object.

Reading the track is performed with any suitable reading element. The dimension (height=j in FIG. 1B) of the reading element (or composite element) (the "reading element" is/are sensor/s that detects the fingerprint along the track) is equal (or preferably greater) than the track width, so that it senses all the fingerprint information across the track. If the reading element is narrower than the track width then the reading element is moved so that it scans an area whose width is greater to or equal than the track width. One exemplary method of scanning the area is shown in FIG. 1H—in this case the scan width is now defined as "j". Furthermore if the reading device is based on a remote reading technique such as magneto-optical reading, then the "reading element" as described above and the associated dimension "j" should be understood to mean the width of the area scanned by, for example, the optical beam as a opposed to being the dimensions of a physical element.

In a further embodiment, the invention provides a reading device for reading identification features that are located in an identification tag or an object to be identified. This reading device comprises a reading element adapted for reading information located in an identification layer, wherein said identification layer is located in the identification tag or the object as disclosed above, and a guiding means for guiding said reading element along said track.

Moreover, an identification arrangement for identifying an object to which an identification tag is attached is provided, comprising an identification tag having the above-mentioned features and comprising an object to which said identification tag is attached.

Beyond this, the invention provides an identification system for identifying an object, comprising either an identification tag or an object comprising an identification layer as explained above, a reading device having the above mentioned features for reading identification information located in said identification tag, and a data storage medium for storing information obtained from reading the identification information.

Further, a method for forming an identification tag for identifying an object to or for forming an object to be identified is disclosed herein. The tag or object comprises at least an identification layer in which identification features are located. This method comprises forming a track for reading the identification features such that said track exposes the thinnest dimension of the identification layer in such a manner that at least some of the readable identification features are only meaningfully readable from this thinnest dimension of the identification layer.

Moreover, a method for reading identification information located in an identification tag is provided, comprising the steps of reading, with the use of a reading element, identification features from a track that exposes the thinnest dimension of the identification layer, the identification features that is located in the identification layer as explained above, and guiding said reading element along said track.

The underlying concept of the invention is to provide an object to be identified or an identification tag, i.e. a tag attachable or attached to, or embedded within an object the identity of which is to be verified, wherein the readable identification layer is exposed such that typically only its thinnest dimension is accessible for reading the identification features contained in the identification layer, in contrast to using a "main surface" of this the layer structure for reading. A "main surface" is defined here as being one of the larger or more prominent surfaces. For example in FIG. 1A the surface lying in the b-c plane is a "main surface" whereas the surface in the a-c plane is a narrow edge and does not constitute a "main surface" under the definition used herein. Thus, in the present invention, a surface with a usually much smaller surface area than a "main surface" area of the object to be identified or the identification tag is generally used as the surface for providing the track exposing the readable identification layer.

However, even when only the track that is typically formed from at least one of the edges is used for sampling the identification layer, material of the identification layer which is buried within in the identification layer (that can be part of a layer structure) can also contribute to a fingerprint and its signature which is read out and which provides the identification information for verifying the identity of an object or a tag. This approach makes it very difficult to forge the object or the tag of the invention.

For example, in the case that the identification layer is formed within a cuboid (which can either be an object to be identified or an identification tag) having length dimensions x, y, z, the identification layer is formed as a narrow plane having dimensions a, b, c within the cuboid—(see also FIG. 1G). As shown in FIG. 1G, typically the layer extends to at least one of the peripheral faces or edges of said cuboid, where a narrow track exposes the identification features. If, for example, the identification layer is exposed as shown in FIG. 1G then typically, $a \leq x$, $a \ll y$ and $c > x$, $c \leq y$. In this case, the y-z surface of the cuboid constitutes a "main surface" of the cuboid, as defined above.

In order to easily and reliably read out the identification information in the object or an identification tag described here, a reading device adapted to the identification tag of the invention is provided, in which a reading element is guided along said track formed from at least a part of one edge of the identification layer wherein the readable identification information is located. In more detail, the reading element can be moved along the object or the identification structure, preferably parallel or "substantially parallel" (as defined below) to the track exposing the narrowest dimension of the identification layer, wherein the guiding means ensures that the relative orientation of the reading element with respect to the readable identification features in the readable identification layer is maintained in proper correlation so that the identification features (which can also be called identification information) can be read out accurately and precisely. FIG. 1I shows a reading element that is moving parallel to the track. FIG. 1J shows a reading element that is being moved "substantially parallel" to the track—in this case the element motion is acceptable if the element straddles the track throughout its motion over the area of the track containing the relevant identification information. If the reading element is scanned across the track (as shown in FIG. 1H), then the scanned area should be at least "substantially parallel" to the track as defined above. In this connection, it is noted that the track that exposes the thinnest dimension of the identification layer may have a width of about 1 millimeter or less to about 100 nanometers. In some embodiments, the width of the track is less than about 500 micrometers, less than about 100 micrometers, less than about 10 micrometers, less than about 1 micrometer or less than about 500 nm. In this regard it is also noted that the width of the track can be larger or smaller than the width (thinnest dimension) of the identification layer in areas that are buried within the tag or the object (cf. FIG. 1G(ii)). Accordingly, the dimensions, "a" and "b" (as defined in FIG. 1A) of the identification layer 103 are shown in the FIG. 1G(ii). Here "a" is measured as the thickness of the plane containing the identification layer. Dimension "b" is defined as the distance between the exposed surface of the identification layer and the beginning of the significantly out-of-plane protrusion 161. Hence, the thinnest dimension that is exposed by the track is the thinnest dimension of the identification layer according to this clarification of the identification layer.

The identification tag or an object comprising an identification layer as described here may be manufactured with low cost which is an essential condition for an identification tag, for example, which is competitively priced in the market. With the teaching of the invention, the fingerprint can be reliably read from the identification layer and the protection against imitation of the identification information located in the object to be identified or in identification tag is improved.

Further, as the identification layer comprising the identification features is usually very thin (see above), and the exemplary methods of manufacturing of the invention provide for an easily fabricated and well defined track without the need for expensive lithographic patterning, the reliability of the identification system is improved.

Thus, an identification system is provided where identification information may be read easily, which is inexpensive in production, and where the reliability of the identification is sufficiently high.

In the following, preferred embodiments of the identification tag and the object of the invention are described. These embodiments are also applicable to the reading device, the identification arrangement, the identification system, the method for forming an identification tag and the method for reading identification information.

In one embodiment, the layer structure of the tag or the object of the invention may comprise a supporting layer below the identification layer. Additionally, the tag or the object may comprise a cover layer, so that the identification layer is arranged between the support and the cover (top)

layer. In principle, every material that is compatible with the identification layer can be used both as support and/or cover layer. Examples of suitable materials include, but are not limited to plastics, metals, ceramics, textiles, natural materials such as leather or wood, glass and combinations thereof. Examples of suitable plastics include polymeric materials such as polyethylene, polypropylene, polyester, polyether, polystyrene, polycarbonate, poly(meth)acrylate that are commonly used for the production of plastic articles such as bags, credits cards, packing materials, sheets etc. Suitable glasses and ceramics include, but are not limited to, alumina, silica, bone china, enamels, and vitreous frits.

By the use of the support layer (in case of a two layer structure) or the sandwich structure (in case of a three layer structure), the identification layer is structurally supported and may also be electromagnetically shielded from below and from the top (in the case of the sandwich structure). Such a layer structure further allows the exposure of the thinnest dimension (from an edge) of the identification layer. The thinnest dimension of the identification layer can be easily exposed (and so the track obtained from one or more of the edges of the identification layer) by simply cutting, polishing or abrading the identification layer (or a layer structure if a support and/or covering layer is used) at an angle greater than 10 degrees to the plane (or in some embodiments substantially perpendicular to the plane) of the identification layer or the layer structure.

The layer structure of the identification tag may comprise at least one further identification layer arranged between said bottom layer and said top layer.

By providing one or more additional identification layers, the identification features can be divided in a plurality of identification layers, thus further increasing the security, since the effort needed to imitate the information included in the identification layers is thus significantly increased. Moreover, this measure can introduce redundancy in the system further increasing the reliability of the identification tag.

The layer structure may comprise at least one intermediate layer arranged between said identification layer and said further identification layer.

By taking this measure, the different identification layers may be separated spatially from one another allowing to separately and/or simultaneously read the information located in said identification layer(s). Thus, a further redundancy may be included which also improves the reliability of the identification tag or object of the invention.

The tag or the object of the invention may also comprise an alignment layer arranged between the top and the bottom layer that facilitates the alignment of a reading element during the process of reading the identification features.

The identification layer(s) may comprise, at least in parts of the layer(s), a plurality of randomly distributed particles. In some embodiments, the identification layer comprises a host material having pores, wherein at least some of the pores contain the particles. As explained below the particles may consist of a magnetic or magnetisable material or of a substantially electrically conducting material. In other embodiments, the particles may be randomly dispersed in a matrix or the particles may be provided by sputtering/ion implantation (cf. also Examples).

By providing such a (highly) disordered structure with particles to define the identification features in the identification layer, the information can only be imitated with extremely high effort and/or cost thereby improving the security of the identification system.

The identification layer may comprise a plurality of magnetic (or magnetisable) particles. By implementing magnetic (or magnetisable) particles as randomly distributed and/or oriented particles, a magnetic read head can be used as a reading element that moves along the track that exposes the identification layer, thus reading a fingerprint of the identification features that is formed from the magnetic field distribution caused by the magnetic (or magnetisable) particles, thus providing an inexpensive and highly reliable identification structure. Any material exhibiting magnetic properties can be used in the identification layer, including but not limited to magnetic materials such as ferrimagnetic materials, antiferromagnetic materials and ferromagnetic materials. Magnetic materials used include but are not limited to ferromagnetic materials such as Fe, Ni, Co, Gd, Dy, the corresponding alloys, oxides and mixtures thereof, and other compounds such as MnBi, CrTe, EuO, $CrO_2$ and MnAs. Other materials influenced by magnetism are also contemplated. Examples of such materials include ferrimagnetic materials e.g. spinels, garnets and ferrites such as magnetite. Other materials commonly used in magnetic media, such as alloys of Ce, Cr, Pt, B, Nd (e.g. Nd—Fe—B, Nd—Fe—Co—B, Nd—Pr—Fe—Co—Ti—Zr—B), Sm (e.g. $SmCo_5$), and alloys such as, AlNiCo, Permalloy and MuMetal are also contemplated.

In case a porous material is used the pores of which are at least partially filled, the host material is a substantially non-magnetic material. In general, any porous host material that is at least substantially non-magnetic (magnetically inert) or substantially electrically insulating can be used in the present invention. Usually, this host material has good mechanical, thermal and chemical stability in order that migration of the material in the pores to other regions of the host material is prevented or negligible. In addition, the host material's stability minimizes oxidation and unwanted chemical modification of the material in the pores. Such properties enable the magnetic, electric or electromagnetic signal obtained from the tag to remain uniquely identifiable. A suitable host material can, for example, comprise porous alumite prepared by the anodisation of aluminium films as described in U.S. Pat. Nos. 5,139,884, 5,035,960 or Nielsch et al., *Journal of Magnetism and Magnetic Materials* 249 (2002) 234-240. Thus, the host material of the tag can be alumina.

Other suitable host materials include porous polymeric films (usually bi- or tri-block copolymers where one component has been selectively removed) or porous semi-conducting materials such as porous silicon or porous III-V materials (see, for example, Föll et al., *Advanced Materials*, 15, 183-198 (2003)). Examples of III-V materials suitable for use as a porous host material in the present invention include GaAs, InP and AlAs. Another suitable host material is zeolites. Examples of suitable zeolites include any one of the members of the zeolite mineral group, for instance clinoptilolite, chabazite, phillipsite and mordenite. Other suitable porous materials include inorganic oxides such silicon oxide, zinc oxide and tin oxide.

Additionally or alternatively, the identification tag or object of the invention may comprise a plurality of conductive or semi-conductive particles. Electrically conducting materials include metals, such as but not limited to Cu, Sn, Fe, Ni or alloys thereof. Examples of semi-conducting materials include (poly)silicon, gallium arsenide, gallium nitride, platinum silicide, silicon nitride or sichrome (SiCr) to name only a few. According to this embodiment, a magnetic read head can be used as a reading element for sampling the identification layer to read the identification features that are formed from an electromagnetic field distribution caused by passing current through at least some of said particles. Similarly, an electrical parameter like the resistivity, conductivity, impedance, or the like of the randomly distributed conductive or semiconductive particles as a function of position within the identification layer may be detected using a suitable reading device (such as a conductive sensor). In the case of a porous host material the pores of which can be filled with electrically conducting particles, the same host materials given above in connection with the magnetic particles may be used.

In addition or alternatively, the identification tag or object may comprise an identification layer comprising a plurality of optically reflective, absorptive or active particles. By 'optically active' it is meant in the present application particles that change the wavelength and/or plane of polarisation of light that is transmitted through or reflected from them. According to this embodiment, an optical detector can be used as a reading element for sampling the track formed from the identification layer to read the identification features. These identification features may be formed from, for instance, particles that fluoresce at a specific wavelength, chiral particles that change the plane of polarisation, or a mixture of particles that fluoresce at different wavelengths and/or change the plane of polarisation of interacted light, to name only a few possibilities.

The invention may also include a combination of magnetic and/or magnetisable and/or conductive and/or semi-conductive and/or optically active particles to further improve the reliability and the security of the system. In one case, for instance, a combination of an optical verification and a magnetic verification can be implemented. Typically, the particles present in the identification layer may have a largest dimension (but not limited to) of between about 10 nanometers to about 500 micrometers.

In the identification tag or object of the invention, a plurality of identification layers each comprising identification features is contemplated, wherein each identification layer is readable independently from other identification layers.

By reading individual layers, different kinds of information can be located in the identification tag or the object of the invention (e.g. identification features and additional information like a price of a product to which the tag may be attached or background information concerning such a product).

In a further embodiment the track(s) that expose(s) the identification layer(s) is/are covered by a protective coating. In principle, every material that is suitable for physically protecting the track from environmental damage (for example, by chemical and/or mechanical degradation) can be used, as long as this material does not prevent that at least some of the identification features are meaningful readable from the track. Examples of suitable material that can be comprised in the protective coating include, but are not limited to, polymeric coatings such as Teflon coating, a rigid polymer, a sol gel or vapour deposited material such as an oxide, nitride, amorphous diamond, a diamond-like material (film) such as diamond-like carbon, tetrahedral amorphous carbon or a spun-coated lacquer. This protective coating (layer) may be a "hard" material. A "hard" material is defined herein as a material preferably having a bulk yield stress of 50 mega-newtons per square metre, i.e. 50 $MN/m^2$, or more. An example of a suitable polymer that acts as the hard material is poly methyl methacrylate which has the advantages of being tough and transparent. A single coating layer of poly methyl methacrylate can be produced by dip or spin coating the tag with a solution of monomeric methyl methacrylate. The monomer solution is polymerized during or after coating.

In the following, preferred embodiments of the reading device of the invention will be described. These embodiments are also applicable to the identification tag, the identification arrangement, the identification system, the method for forming an identification tag and the method for reading identification information.

The guiding means may be adapted for guiding the reading element along the above defined identification layer so that it moves along the track in a direction that is parallel or at least substantially parallel (as defined previously) to the track that exposes the thinnest dimension of the identification layer.

Thus, the guiding means typically has a shape or other characteristic allowing the reading element to be guided along the track formed from the identification tag or the object to be identified so that the reading element moves parallel or at least substantially parallel (as defined previously) to the track exposing the thinnest dimension of the identification layer.

The reading element may be adapted for reading information from a plurality of randomly disordered particles included in the identification layer.

Thus, the reading element may be adapted to detect a signal resulting from the characteristic arrangement of the randomly oriented particles providing a unique fingerprint (and signature).

The reading element may be adapted for reading information from a plurality of magnetic or magnetisable particles included in the identification layer. In this case, the reading element is a magnetic reading element.

The reading element may also be adapted for reading information from a plurality of conductive and/or semiconductive particles included in the identification layer. According to this embodiment, the reading element is an electrical or electromagnetic or magnetic reading element reading out an electrical parameter characteristic for an arrangement of randomly disordered particles.

The reading element may further be adapted for reading information from a plurality of optically active particles included in the identification structure. According to this embodiment, the reading element is an optical reader or detector which may read out an optical parameter such as a reflectance or fluorescence intensity, an optical anisotropy, or the like.

It is also possible to use a reading element having at least two different types of reading capabilities, for example, magnetically and optically, or electrically and magnetically. So doing, the security can be further improved.

The guiding element may be adapted for mechanically guiding the reading element along an edge of an identification tag. This means, the shape of the guiding element may be adapted such that the guiding elements may be guided by this mechanical guiding means along the track formed in the manner explained above. Such a mechanical guiding element can have, for instance, a U-shape, wherein the open portion of the U engages the identification tag or the object to be identified in a portion where the track exposes the thinnest dimension of identification layer.

The guiding element may also be adapted for optically guiding the reading element perpendicularly along at least part of the track formed from an edge of the identification layer. According to this embodiment, a visual mark can be provided on the object or identification tag indicating a path along which the reading element should be guided in order to allow an error-free detection of the identification features located in the identification layer. As an example, an optical sensor and a feedback loop linked to the actuation mechanism of the reading element can achieve this.

The reading device may further be provided such that the guiding element is adapted for electromagnetically guiding said reading element along said track. According to this embodiment, a readable electromagnetic guiding layer or feature is provided, for example a structure of ferromagnetic material, which allows an auxiliary sensing element of the guiding element to follow a path along which a fingerprint shall be captured.

According to a further embodiment, the reading device may have a processing means adapted to compare the signature of the fingerprint read by the reading element with a pre-stored reference signature, and to identify an identification tag to be valid, if the signature read from the identification tag differs from the pre-stored reference signature by less than a threshold.

In other words, a unique signature can be stored in a data storage medium of a reading device as a set of parameters. This set of parameters may be compared with a signature detected in a particular case, wherein this measured signature is compared to the signature stored in the data storage medium. If the deviation between the measured and the pre-stored signature is less than a threshold value, the identification is considered to be verified. In turn the object as such or the object to which the tag is attached may be considered authentic. It is however not necessary that the pre-stored reference signature is stored permanently in the memory of a reading device. Rather, the reading device can be designed such that it is able to receive the pre-stored reference signature that is stored in a remote data storage medium with respect to the reading device. Alternatively, the reading device may be able to receive the pre-stored reference signature that is stored in the object to which the tag is attached or the object to be identified. In this context, it is noted that the object or the tag of the invention may additionally have stored further information, for example, the price of the object, the manufacturer thereof or the like. Such information may be included in a conventional bar code, a two-dimensional bar code, a magnetic strip or a memory chip. The reading device may thus also be adapted to read such a signature from a conventional barcode, a two-dimensional barcode, a magnetic strip or memory chip.

The processing means may further be adapted to update the pre-stored reference signature by storing the signature from the read fingerprint as an updated reference signature for a future verification check. When using the identification tag or the object adapted to be identified for a longer period, abrasion of the track or the entire identification layer may occur as a consequence of the intense use of the identification tag. Such an abrasion may cause the characteristic signature to be changed. In a static system, in which the pre-stored reference signature would always stay constant, such an abrasion effect may have the consequence that an identification tag is not recognized by the system. Thus, the dynamic system that is used in one embodiment of the invention updates changes in the detected signature and stores this updated signature as the pre-stored reference signature. Thus, small changes with time due to abrasion of material of the identification layer can be taken into account, thus improving the functionality of the system, since an erroneous classification of a tag or the object to be non-valid as a consequence of abrasion is avoided.

In accordance with the above disclosure, a conventional read head can be used in order to determine a characteristic (signature) that represents the identification features of the tag or the object adapted to be identified. Examples of read heads that can be used are those used in cassette tape players, video cassette recorders (VCRs), magnetic data storage tapes, hard disk drives, Zip™ discs, Jaz™ disks and magnetic stripe readers, for example. Alternatively, a magnetic force microscope, commonly known as an MFM, can be used. In addition, detection of magneto-optical effects such as the magnetic Kerr effect can be utilized. For determining characteristics such as the electric or electromagnetic field strength, any conventional high sensitivity electric field meter or EMF gaussmeter which can be calibrated to a suitable frequency can be used for this purpose. For determining optical characteristics, any photodetector or photodiode may be used equipped where necessary with polarising filters and/or colour filters for example.

Once the fingerprint from the object or the tag has been determined, it can be subjected to mathematical procedures to process (e.g. filter, smooth, take Fourier transforms or other mathematical signal processing techniques) and/or compress and/or encrypt the fingerprint (signal) prior to storage and to obtain the signature of the object or the tag. The first measured fingerprint (or if desired a subsequent measured fingerprint), either in the form of the raw signal obtained from the reading of the tag, or in its processed/compressed/encrypted form, can be stored in a variety of data storage media such as a hard disk, smartcard, RAM module, tape storage, magnetic stripe or any other data storage media (so becoming the pre-stored reference signature).

In the invention, the first fingerprint/signature can be obtained from scanning the entire track comprised in the tag or the object of interest. It is however also possible to obtain this first fingerprint/signature only from reading a portion of the track. For example, in applications which require a lower level of authentication it may be sufficient to read only a portion of the track. This 'partial' fingerprint then becomes the pre-stored signature (identification information). In this way, processing time for reading and recording the fingerprint of new tags or objects can also be reduced.

The requirement for only a "partial" fingerprint also makes it more complicated to forge, because the portion used is not required to be identifiable from the identification features comprised in the identification layer of the tag or object alone, but preferentially forms part of an independent instruction within the overall system. This means that, in general, a counterfeiter is forced to reproduce the entire identification layer (meaning the entire tag or object), despite only some of the information being used to authenticate the object. Typically, duplicating the unused portion increases the cost and effort needed to counterfeit the tag without significantly increasing the cost and effort for the original producer or legitimate user.

Next, embodiments of the identification arrangement are described. These embodiments are also applicable to the object or identification tag of the invention, the reading device, the identification system, the method for forming an identification tag and the method for reading identification information.

In the identification arrangement, the identification tag may be attached to the object at a part of the narrowest dimension of the layer structure. Alternatively, in the identification arrangement, said identification tag may be attached to the object at a main surface of the layer structure.

Next, preferred embodiments of the method for forming an identification tag or object of the invention are described. These embodiments are also applicable to the identification tag, to the reading element, to the identification system, to the identification arrangement and to the method for reading identification information.

The identification or object tag may be manufactured by forming a cover layer arranged on top of the identification layer. In addition a layer structure can be formed in which the at least one identification layer is arranged between a bottom layer and the top layer.

So doing, a laminated structure, for example, may be produced having the identification layer sandwiched between a bottom layer and a top layer, wherein the track exposes the thinnest dimension of the identification layer.

The track may be formed by any suitable technique, for example, by cutting, abrasing and/or polishing, to name only a few.

This means, a laminated structure may be cut into different parts, wherein each of the parts may form a separate identification tag or object. The cut edges then contain the tracks that expose the thinnest dimension of the identification layer comprising the readable identification features.

The identification layer may be formed using a plurality of randomly disordered structures/particles manufactured by forming a porous matrix and filling pores of the porous matrix with suitable material to create said disordered structures/particles.

Such a porous matrix, i.e. a solid body having a lot of randomly distributed pores, may form the identification layer, for example if the porous matrix is made of a magnetic or magnetisable material, and the voids or pores lead to the modulation of the detected signal that comprises the fingerprint derived from the information layer. Or if the porous material is non-magnetic and the pores are filled or at least partially filled with a magnetic or magnetisable material.

Alternatively, the identification structure may be manufactured by implanting ions in said layer structure.

According to this embodiment, a statistically distributed arrangement of implanted ions that have then been thermally annealed is typically used for forming the identification structure. This random distribution is a result of the random coalescence of the implanted ions after thermal annealing.

Alternatively, the identification structure may be manufactured using a phase separation of an immiscible binary polymer.

According to this embodiment, a two phase system is used for forming a layer, and then the two phases are automatically separated. One of these phases may be removed and the resulting cavities (or pores) are then used as locations where material for forming part of the identification layer can be introduced.

An embodiment of the method for reading identification information is as follows. This embodiment is also applicable for the identification tag, the object to be identified, the reading device, the identification arrangement, the identification system and the method for forming an identification tag.

According to this embodiment, the guiding step may include guiding the reading element along the track formed form an edge of the identification layer of an identification tag being attached to an object.

In accordance with the above disclosure, the invention may be used in fields such as:

1. Preventing counterfeiting of: official documents, tickets, security cards, cheques, credit cards, certificates, identification cards, boarding passes, visas, passports, and bonds.

2. Identification of valuable items after theft recovery or to validate certified authenticity, e.g. jewelry, heirlooms, antiques and works of art.

3. Identifying and brand protecting items of commercial value, e.g. designer goods, gems and diamonds, critical engineering components, pharmaceutical packaging, children's toys, babies' goods, food packaging.

For example, losses from credit card and cheque forgery in the US alone are estimated to be US$5 billion per year (source: Washington University in St. Louis).

The invention provides an inexpensive and easily produced identification tag or an object adapted as such to be identified (both containing what is termed identification features or a fingerprint derived therefrom here) and associated system for identification and tracking of genuine items. Moreover, it is the aim that the identification features are extremely difficult (if not impossible) and/or extremely expensive (if not prohibitively expensive) to reproduce (or copy) by design. This is achieved by selecting a range of complex particles and/or making use of very small features (such as pores and asperities) and having an essentially in-plane structure of the identification layer, in combination with the reading of the track that is formed such that it exposes the thinnest dimension of the identification layer. In this respect, it is also noted that the approach of the invention to expose the thinnest dimension of the identification layer ensures that many of the particles are oriented out-of-plane with respect to the reading. Thereby the ease of reading and the difficulty of reproducing the features is increased.

The invention provides methods for making naturally or self-assembled disordered identification layers and structures that can be read or detected and hence provide a unique fingerprint and signature. Depending on the choice, these identification layers can be robust, inexpensive, mass-produced, and tailored to a level of security.

The approach provides for very thin identification layers (down below one micrometer in width, i.e. their smallest dimension) to be easily manufactured. The smallest dimensions considered are below the limit of conventional photolithography, and would otherwise rely on extremely expensive patterning techniques such as deep-UV lithography, electron beam lithography, or focused ion beam lithography that is not suited for high volume, inexpensive mass production.

Typical embodiments of the invention provide a suitably shaped identification layer (for example, a relatively long narrow strip of material). As explained above the smallest exposable dimension of the identification layer defines the track that is formed for reading out the identification features. This allows easy patterning, easy control of the track width and reliable location and reading of the fingerprint.

As can be seen from the above, it is possible and common on a practical level that obtaining the reference fingerprint and the fingerprint taken for identification purposes to take place at different times and locations. For example, manufactured tags or objects can be first sent to a remote location where the signatures are obtained and stored on a data storage medium before the tags or objects are delivered to the user of the tag or the object such as a credit card company or a diamond mining company (alternatively, of course the signatures can be read where the tags or objects are manufactured and the reference signature could be sent to a remote location and stored there). In case of a tag, this tag user then affixes the tag to an object to be tagged, for example, a credit card or a diamond, before distributing it to its customers. Similarly, in case of an object, the user such as a credit card company may store further information/content such as credit card number and the like on the raw credit card containing an identification layer as described here. Or, in case of a data storage media such as a CD containing such an identification layer of the invention, a user such as record company may store music on the CD and then distribute to its customer. This customer may then obtain the second fingerprint and compare the obtained signature with the pre-stored reference signature (which may be stored in a remote data storage medium)—in order to verify the identity of the object. Alternatively, the tag user may affix the tag to the object prior to reading the tag and thereafter send the signature to the data storage medium (likewise, the object user may first produce the commercial item of interest and send it the to a remote location where the reference signature is read and stored on a data storage medium). In both cases, identification information is obtained in the form of a signature from a tag or an object of interest and is stored on a data storage medium for subsequent identification of the tag or object.

In this context, embodiments of the method for reading identification features in an object or a tag of the invention are discussed in the following.

In one embodiment information is read from a plurality of randomly distributed particles that are included at least in part of said identification layer. The plurality of randomly distributed particles can be magnetic or magnetisable, conductive or semiconductive or optically active particles.

In the case where magnetic particles are used the reading may comprise determining at least one characteristic of a magnetic field of at least a portion of the identification layer of the tag or the object. Thereby a specific magnetic signal is obtained. In this case, the identification layer may comprise a substantially non-magnetic host material having pores, wherein at least some of the pores contain a magnetic material.

The reading may be at least one characteristic of the magnetic field of the portion of the identification layer that is highly dependent on the disorder of the identification layer. More specifically, the disorder may be related to at least one of the properties of the identification layer, for example, size, shape and orientation of pores, inter-pore distances, percentage of pore filling and crystal orientation of magnetic material in the identification layer. For example, if a porous host material is used the disorder can be a characteristic of the host material alone. As an example for this, a host material can be used that has different pore sizes and interpore distances, and the pores of this material can be (equally) filled with a magnetic material. It is also possible to use a host with ordered pores in which the disorder is created by varying the filling degree of the material within the pores. It is of course also possible to use an identification layer with a disordered structure and also vary the percentage of filled pores or (in the case of magnetic material) the crystal orientation of the material within the tag, for example. The above properties which can be manipulated to produce disorder in the identification layer of the tag or the object can also be considered as degrees of freedom.

In one embodiment the identification layer is subjected to a magnetic field prior to each determination of the at least one characteristic of the magnetic field (the signal) of said portion of the track. In this embodiment, the magnetic material within the identification layer, can be remagnetized under the magnetic field before each reading. This increases the magnetic field signal of the track for easy reading. For this purpose, a uniform but also an inhomogeneous magnetic field can be used to re-magnetize the identification layer, such as that produced by simple bar magnets, or the magnetic field generated from solenoids or combinations of magnets.

In one embodiment, the method of further storing (recording) information in the identification layer of the tag or the object is contemplated. This storing (recording) of information can be done by magnetizing the magnetic material that is present, for example, in a group of particles into poled domains, or by determining through patterning groups of particles of the track to contain magnetic (or electrically conducting) material or by a combination of these two approaches. This recording step is preferably done prior to the first determination of the fingerprint or alternatively after this first determination.

The above and other objects, features and advantages of the present invention will become apparent from the following description and the appended claims, taken in conjunction with the accompanying drawings in which like parts or elements are denoted by like reference numbers.

The invention is further illustrated by reference to the following non-limiting examples and drawings, in which:

FIG. 1A shows an identification layer of the invention in combination with an optional covering layer on the top and bottom of the identification layer as present in a tag or an object according to the invention and in combination with a reading element used in the invention, FIG. 1B a side view of an identification layer of FIG. 1A, FIG. 1C shows an identification arrangement according to one embodiment of the invention, FIG. 1D shows an identification arrangement according to a second embodiment of the invention, FIG. 1E shows an identification arrangement according to another embodiment of the invention, FIG. 1F shows an object of the invention according to one embodiment of the invention, FIG. 1G(i) shows an isometric view of a tag or object according to an embodiment of the invention. FIG. 1G(i) and FIG. 1G(ii) also show a cross-sectional view of the tag/object and reading device according to that embodiment, FIG. 1H shows a reading element being scanned across the track, FIG. 1I shows a reading element being moved over the track in a direction parallel to the track, FIG. 1J shows a reading element being moved over the track in a direction "substantially parallel" to the track, FIG. 2 also shows an identification system according to a first embodiment of the invention, FIG. 3 is another view of the identification system according to the first embodiment of the invention, FIGS. 4A to 4H are views during a method for manufacturing an identification tag according to a first embodiment of the invention, FIG. 5 are light microscopy and electron microscopy images of the identification tag manufactured according to the method of the first embodiment of the invention, FIG. 6 is an identification system according to a second embodiment of the invention, FIG. 7 shows views during a method for manufacturing an identification tag according to a second embodiment of the invention, FIG. 8 shows a view of an optional step during the method for manufacturing an identification tag according to the second embodiment of the invention, FIG. 9 shows a credit card as example for an object according to an embodiment of the invention, FIGS. 10A to 10C show identification systems of the invention based on reading of a fingerprint derived from an electrical characteristic, FIGS. 11A to 11C show identification systems of the invention using optical reading, FIGS. 12A to 12D show identification systems according to the invention using mechanical guiding means, FIG. 13 is an identification arrangement according to a further embodiment of the invention, FIGS. 14A to 14E are views during a method for manufacturing an identification tag according to an embodiment of the invention shown in FIG. 13, FIG. 15 is a view during a method for manufacturing an identification tag according to some embodiments of the invention, FIGS. 16A to 16D are views during the method for manufacturing an identification tag according to an embodiment of the invention, whereas FIG. 16E shows a cross-section of a tag made using said method, FIG. 17 shows an SEM image of an identification tag manufactured according to an embodiment of the invention, FIG. 18 shows a CD as another example of an object of the invention, FIGS. 19A to 19D are views during a method for manufacturing an identification tag or object according to the invention, FIG. 20 shows an atomic force microscope image of a phase separated morphology, FIGS. 21A to 21F are views during a method for manufacturing an identification tag according to a further embodiment of the invention, FIGS. 22A to 22F are views during a method for manufacturing an identification tag according to yet another embodiment of the invention, FIGS. 23A to 23D are views during a method for manufacturing an identification tag according to yet another embodiment of the invention, FIGS. 24 and 25 show atomic force microscope images of the identification tag manufactured according to the method of the embodiment of the invention shown in FIG. 23, FIG. 26 is an identification arrangement according to one embodiment of the invention, FIG. 27 is a view during a method for manufacturing the identification arrangement according to the embodiment of the invention shown in FIG. 27, FIG. 28 shows an identification system according to yet another embodiment of the invention, FIG. 29 shows an identification systems according to yet another embodiment of the invention, FIG. 30A shows one embodiment of a reading device of the invention, whereas FIG. 30B and FIG. 30C show two examples of objects tagged according to the invention FIG. 31 shows a the formation of one-layer tag according to one embodiment of the invention, it also shows an isometric view of said tag, FIG. 32 shows a cross-sectional view of a three-layer tag according to one embodiment of the invention where the face of the tag containing the track is now planar and the top and bottom layers are not symmetrical.

The illustrations in the drawings are schematics and in different drawings, similar elements are provided with the same reference signs.

In the context of this specification, the terms "individually tagging", and "identifying" and their derivatives are used interchangeably to particularly mean marking an item in such a way that it can be distinguished uniquely from other items. Although "watermarking" and "barcoding" may be sometimes used in this context, these terms generally refer to distinguishing a group of items from another group of items, e.g. a banknote watermark distinguishes it from a fake note, but it does not distinguish a banknote from other individual genuine banknotes. The terms "counterfeit", "fake", "forge" and "copy" are used interchangeably.

In accordance with the above explanation, the invention is based on the finding that disorder that exists (inherently) or is deliberately created in an object comprising one or more identification layers, such that the disordered region is read or probed along a track that exposes the thinnest dimension of the identification layer(s), the resulting signal creating a fingerprint that can be used for the purpose of identity verification. The inventors recognized that such a disorder is difficult to be intentionally reproduced by design, and the resulting fingerprint is easy to read, if the thinnest dimension of the identification layer(s) is (are) exposed for reading.

By "layer" it is particularly meant something that is narrow (thin) in one dimension, but extensive in the other two, typically at least of the ratio 1:10:10, but preferably 1:100:100 or greater. There is, however, no need for the larger two dimensions to be equal in extent.

This approach has the important benefit that the identification layer may be used to form a narrow, extended stripe (track) avoiding the complexities and expense of conventional photolithography. By "conventional photolithography" it is meant using a photoactive layer (such as a resist), an exposure source (such as an ultraviolet lamp) and a mask (such as a master glass plate coated with an opaque layer of metal in the desired pattern as either a positive or negative image).

Preferably, the identification layer is of an aspect ratio of typically at least 1:10, but more preferably 1:100, with the narrowest dimension being typically less than 1 millimeter, but more preferably less than 500 micrometers, 100 micrometers, 10 micrometers, or even 1 micrometer.

In the following, referring to FIG. 1C, an identification arrangement 100 according to a first embodiment of the invention will be described.

The identification arrangement 100 for identifying an item 101 as an object to which an identification tag 102 is attached, comprises the identification tag 102 and comprises the item 101 to which the identification tag 102 is attached.

The identification tag 102 for identifying the item 101 to which the identification tag 102 is attached, has a layer structure and comprises a readable identification layer 103 in which identification information is located. From at least one edge of the identification layer 103 a track 110 for reading the identification features is formed such that said track exposes the thinnest dimension of the identification layer in such a manner that at least some of the readable identification features are only meaningfully readable from this thinnest dimension of the identification layer. The identification tag 102 is adapted such that the identification tag 102 is attachable to the item or object 101 such that the identification features are only meaningfully readable from this thinnest dimension of the identification layer.

In the identification tag 102, the layer structure comprises a top layer 105 arranged on said identification layer, and optionally (if the identification layer may require further support, for example) also a bottom layer 104.

As shown in FIG. 1C, the identification tag 102 is attached to the item 101 at a main surface of said layer structure. In this embodiment, the tag 102 is attached to the (here cylindrical) item 101 in such a manner that the thinnest dimension of the identification layer is oriented parallel to the main rotational axis of the cylinder shaped item 101. FIG. 1C also shows a read head 111 which reads the track 110.

In the following, referring to FIG. 1D, an identification arrangement 150 according to a second embodiment of the invention will be described.

The identification arrangement 150 differs from the identification arrangement 100 in that the identification tag 150 is attached to the cylindrical item 101 in such a manner that the thinnest dimension of the identification layer is oriented perpendicular to the main rotational axis of the cylinder shaped item 101.

FIG. 1E shows yet a further embodiment of an identification arrangement 100. In this arrangement, the identification tag 170 is attached to the cylindrical item 101 in such a manner that the thinnest dimension of the identification layer is oriented perpendicular to the circumferential surface of the cylinder shaped item 101.

Accordingly, one advantage of the invention is that a tag can be applied to a item that is to be identified in virtually any imaginable way and still the track of the identification layer is exposed in such a manner that (at least some of) the identification features are only meaningful readable from the thinnest dimension of the tag. In this connection, it is noted again that in all the above-explained embodiments, it is possible to read a part or the entire exposed track, for example, reading along only a part of one edge, along one entire edge or also around the corners or the entire exposed periphery of the identification layer 103. By "exposed" it is meant herein that the identification information can be read using the reading element—i.e. the track could be physically covered, but still be "exposed" under this definition if the relevant information can still be read. For example, a standard magnetic read head is still able to read data through a thin non magnetic protective layer and a magneto-optical reading device is able to read through a transparent layer even if it is relatively thick. T As illustrated by the embodiment shown in FIG. 1G, the identification layer used in the invention can be buried within an object or a tag and still be completely functional if the track is exposed, even though no other part of the identification layer is accessible. By "accessible" it is meant that it is possible to excite or activate the identification features to influence the signal that is detected (and hence the fingerprint that is read). For example assuming that FIG. 1G shows an embedded one-layer tag (of dimensions a, b, c) within an object (of dimensions x, y, z). Further assuming that the identification features consist of magnetic particles. Then one may "access" the identification features by bringing a sufficiently strong magnet up to the y-z plane of the object. This magnet will influence the magnetic signal of the particles within the identification layer at or around the track, but the particles' signal is only meaningfully readable from the track, i.e. although they are "accessible" from the y-z plane, they are still only "exposed" by the track.

In a further embodiment of the invention, the identification layer is part of the object to be identified. Such an embodiment is illustrated in FIG. 1F. The object 101 comprises an identification layer 103, a top layer 105 and a bottom layer 104. From the (circular) edge of the identification layer 103 a track 110 for reading the identification features using a read head 111. The track is formed such that it exposes the thinnest dimension of the identification layer in such a manner that at least some of the readable identification features are only meaningfully readable from this thinnest dimension of the identification layer 103. FIG. 1G(i) shows a perspective view and a side view of a cuboid tag or object according to one embodiment of the invention. In this case the identification layer 103 only extends to one face of the cuboid thereby forming the track on that face only. The surface of that face is covered by a protective layer 121. Although the protective layer 121 physically covers the track 110, the track 110 is still exposed according to the definition used herein since the identification features can still be meaningfully read using a reading element 120. FIG. 1G(ii) shows a cross-section of a tag or object and a reading element according to one embodiment of the invention. The material 160 containing the magnetic particles is shown in enlarged form on the right side of the figure. In this case the material 160 containing the magnetic particles is not planar instead it contains one or more out of plane protrusions 161. The dimensions, "a" and "b" (as defined in FIG. 1A) of the identification layer 103 are shown in the figure. Here "a" is measured as the thickness of the plane containing the identification layer. Dimension "b" is defined as the distance between the exposed surface of the identification layer and the beginning of the significantly out-of-plane protrusion 161.

Methods of moving a read element across the track are shown in FIG. 1H-J. FIG. 1H shows a reading element 120 being scanned in a saw-tooth pattern over a track 110. The width of the scan area is "j". The scan pattern need not be confined to a saw-tooth pattern, but can be any desired pattern that is able to cover the area of the track containing the relevant identification information. Likewise, the reading element 120 does not need be of a smaller dimension than the scan width but can also be of the same or a larger dimension of the scan width.

FIG. 1I shows a reading element 120 being moved in a direction parallel to the track 110. In this case the width of the reading element 120 is "j" and is equal to or preferably exceeds the width of the track.

FIG. 1J shows a reading element 120 being moved in a direction "substantially parallel" (as defined previously) to the track 110. The width of the reading element 120 is "j". This deviation from parallelism can be set deliberately or, for example, caused by tolerance in the movement of the reading element.

In the following, referring to FIG. 2, an identification system 200 according to a first embodiment of the invention will be further described.

The identification system 200 shown in FIG. 2 has an identification tag 102 and a reading element 201. The identification system 200 provides immediate benefits in the production and reading of the track 202 of the identification layer 103, namely ease of manufacturing, ease of location and ease of reading through, for example, mechanical guidance.

In the following, referring to FIG. 3, another view of the identification system 200 according to the first embodiment of the invention will be described.

FIG. 3 shows a detail 301 of an identification layer 103 comprising magnetic particles 303. When the reading element 201 is moved along the reading direction 304, a fingerprint 302 of the magnetic particles 303 is detected. This fingerprint can be converted into a signature later on.

The disorder in the identification layer 103 can be achieved in a number of different ways. For the purpose of verification, the principle is to create a track that exposes a portion of an identification layer and then to probe the disorder therein with a suitable detector. The result is a signal as a function of position along the track to which is referred within this specification as a fingerprint or "signature" when processed.

This fingerprint/signature may be determined by measuring, for example, the variation in a magnetic field, an electromagnetic field, an electric field, electrical conductivity, electrical capacitance, electrical inductance, electromagnetic wavelength, electromagnetic wave amplitude, electromagnetic polarity, or a combination thereof. In each case this is a variation determined with position along the longer dimension of the track, such that the sensor element of the detector extends, preferably, across at least the full width of this track. It is also considered here, fingerprints/signatures that are determined by the rate of change (or higher differential orders) of the parameters outlined above, determined by measuring the fingerprint/signature by tracking across the identification layer 103 at a constant velocity or with a constant acceleration, for example.

The "system" in this specification particularly refers to the fact that the identification layer is attached to an object, either directly by being part of the object, or by virtue of the fact that the identification layer is part of a label or a tag that can be adhered to the object. The words "tag" and "label" are used interchangeably in this specification. The reading element 201 is used to detect and generate a fingerprint that in turn may be stored. Subsequent readings of the identification layer generate fingerprint/signatures that can be compared to the first stored signature. A match indicates that the signature is derived from the original identification layer.

Suitable process steps and materials systems to illustrate this invention are described by way of example:

In the following, laminated tags containing magnetic particles are described in more detail.

In one aspect of the invention the magnetic field variation of an identification layer can be detected using a suitable read-head with a reading element. In this example, the randomly distributed magnetic particles deposited on a substrate are considered as the identification layer (even though the particles may be discrete from each other). The identification layer is then covered with another layer of material. This sandwich of two or more layers (in this described case, three) of material is also termed here as a "laminate".

Next, referring to FIG. 4A to FIG. 4H, views during a method for manufacturing an identification tag or an object according to the first embodiment of the invention will be described.

FIG. 4A to FIG. 4D show a process which may be used to produce such tags or objects. Firstly, as shown in FIG. 4A, nickel flakes 400 are brushed onto the glue containing side of a polymeric laminating sheet 401. Then, as shown in FIG. 4B, another laminating sheet 402 is overlaid and the stack of material is laminated together by passing the stack through a conventional office-stationary laminator at 110° C. and the lowest preset speed (speed 1). The edge cross-section is then polished to ensure that a smooth surface containing a track 403 of the identification layer is exposed, as shown in FIG. 4C. This edge can then be read using a magnetic field sensor to provide a fingerprint/signature 404, as shown in FIG. 4D, in which the particles cause peaks in the magnetic field that then coincide with peaks in the fingerprint/signature. Suitable magnetic field sensors include inductive heads, AMR heads, GMR heads and magneto optical Kerr effect detectors. The process for manufacturing tags or objects of the invention illustrated in FIG. 4F to FIG. 4H is identical to the one of FIG. 4A to FIG. 4D with the exception that elongated nickel flakes or fibres or whiskers that are arranged in the plane of the identification layer are used. Because of the different size and shape of the nickel flakes, the fingerprint 404 that is obtained from reading the track is of course different from the one in FIG. 4D. The elongated shapes give the added advantage that the magnetic signal detected from the track is a substantially out-of-plane magnetic signal, making the signal easier to detect (and hence the fingerprint easier to read) and the tag even harder to forge.

FIG. 5 shows light microscopy and electron microscopy images of the identification tag manufactured according to the method of the first embodiment of the invention.

Thus, examples of light microscopy and scanning electron microscopy images of the track 403 are shown in FIG. 5.

Desirable features of this embodiment for the purpose of the invention are now discussed. Firstly, for the identification layer that relies on magnetic field variation, any particle exhibiting magnetic properties can be used in the identification layer including but not limited to magnetic materials such as ferrimagnetic materials, antiferromagnetic materials and preferably ferromagnetic materials. Magnetic particles used include but are not limited to ferromagnetic materials such as Fe, Ni, Co, Gd, Dy, the corresponding alloys, oxides and mixtures thereof, and other compounds such as MnBi, CrTe, EuO, $CrO_2$ and MnAs. Other materials influenced by magnetism are also contemplated. Examples of such materials include ferrimagnetic materials e.g. spinels, garnets and ferrites such as magnetite. Other materials commonly used in magnetic media, such as alloys of Ce, Cr, Pt, B, Nd (e.g. Nd—Fe—B, Nd—Fe—Co—B, Nd—Pr—Fe—Co—Ti—Zr—B), Sm (e.g. $SmCo_5$), and alloys such as, AlNiCo, Permalloy and MuMetal are also contemplated. Combinations of particles of any of the above are also considered.

In the case of this example, the disorder in the identification layer is a function of the particle size, particle morphology, degree of particle crystallinity, crystal orientation in the particles, inter-particle spacing, magnetic saturation, and the particle habit in the layer. By selecting suitable particles or combinations of particles, it is possible to promote the disorder to make the likelihood of another similar fingerprint occurring either by chance or by design extremely remote. Examples include the use of complex anisotropic particle shapes such as plates, rods, or fractals, and mixtures thereof. The use of non-magnetic packing particles (such as, but not limited to other metal flakes, silica, clays, latex spheres, carbon black, and boron nitride) is also considered.

Other advantages of this example are that by selecting particles of certain morphologies, their habit can be predicted (that is, it may be preferential to select plate-like or rod-like particles so that they tend to lie flat, in a plane parallel to the layer). This helps keep the width of the identification layer desirably narrow. In addition, if particles extend into the plane behind the exposed region of the fingerprint, the shape anisotropy will give a strong magnetic field from the particle. This will result in both a greater signal-to-noise ratio which will improve the reading process, but also make it that much more difficult to replicate and hence counterfeit.

In this example, it is considered to use polymeric sheets that are laminated to contain the identification layer. However, this is just one example, and it is also possible to use other solid materials such as metal foils, paper, wood, glass, leather, textiles, and silicon that may be adhered in the form as described to reveal the edge of (the thinnest dimension) of an identification layer and hence a suitable track. It is also considered the fact that the upper layer and lower layer that sandwich the fingerprint may be of differing materials, differing thickness and deposited in different ways. For example, the lower layer may be a flexible solid substrate onto which the particles are deposited. However, the upper layer may be a layer deposited by spin-coating, spraying, evaporation, screen printing, or sputtering so that the result is a solid layer even if the precursor is a gas, plasma, paste or liquid. It is also considered the adhering of said layers with glue, epoxy resin, solder, eutectic heat bonding, silica sol gel, frit, mechanical interlocking or mechanical compression. The glue may be a thin additional layer or constitute the layer itself, and could be present on the particles beforehand, on the lower and/or the upper layer. Clearly by selecting materials with different thermal and mechanical properties, it is possible to tailor the tag or object containing the identification layer to different operating environments (for example high temperature, low temperature, liquid, gaseous, oxidizing, reducing, and chemically aggressive). The degree to which cutting, cleaving, polishing or otherwise preparing the track exposing the thinnest dimension of the identification layer varies depending on the nature of the materials used. It should be noted that the polishing process itself can be used to introduce further inherent disorder that contributes to the fingerprint and hence signature obtained from the material forming the identification features.

In another embodiment of this example, it is considered that the identification layer is subjected to a strong uniform magnetic field prior to each reading of the track. Here "strong" means a magnetic field sufficient to reorient the magnetic domains within the particles that are at or near the surface of the track so that the magnetic field generated by the particles is aligned substantially out of the plane of the track. This approach has the advantage of resetting the magnetic field pattern each time so that effects of changes during the service life of the tag or object can be minimised. This ability to reset the fingerprint also means that the tag or object can be used between readings in environments in which the magnetic orientation and strength of the particles can change (e.g. in areas of strong external magnetic field and/or at elevated temperatures). Furthermore this prevents a rewriteable magnetic layer being used to duplicate the fingerprint since any magnetic information stored on the magnetic layer will be erased by the strong magnetic field.

The sizes of the particles that are suitable for this application can be wide ranging, and indeed in a broad distribution for the population, hence promoting the disorder further. Preferably the particles are less than 500 micrometers in all dimensions, and preferably still they are of the order of 10 micrometers or less in the narrowest dimension. In some applications, it is particularly useful to select very small particles (in the sub micron range) so that the variation across an identification layer is complex and offers many billions of combinations of signature from one to another. Also, in some applications there is a desire to have a covert fingerprint in which the selection of small particles goes some way to achieve this. In such instances, it is also possible to select suitably coloured, colourless and/or textured particles.

In the following, referring to FIG. 6, an identification system 600 according to a second embodiment of the invention will be described.

The identification tag included in the identification system 600, when compared to identification tag 102 shown in FIG. 2, additionally to the identification layer 103 includes a further identification layer 601. Between the two adjacent identification layers 103, 601, a separating layer 602 is provided.

It is also disclosed a variation of this embodiment in which more than two identification layers 103 or 601 is present. This can be achieved by a multiple stack of laminates, so that, for example two, three or more identification layers 103, 601 are located approximately parallel to each other as illustrated in FIG. 6. This provides redundancy and/or more unique information in the fingerprint that in turn makes counterfeiting that much more difficult. In this case the reading element 201 may read all the tracks formed from the thinnest dimension of the identification layers 103, 601 in parallel using only one element. Alternatively, the reading element 201 may read each of the identification layers 103, 601 in parallel with separate sensing elements or read each in series using multiple read-heads and/or sensing elements, and/or passes. In addition, the considerations of the layer materials and deposition methods given previously apply here too.

It is also considered the ease of manufacturing the tags or objects of the invention in both a batch process, as described here, but also in a roll-to-roll process.

Referring to FIG. 7, views during a method for manufacturing an identification tag or object according to a second embodiment of the invention will be described next.

FIG. 7 illustrates a roll-to-roll process for manufacturing these tags or objects, including a roll 701 of one-sided polymer laminate. In such a case, the rate of the roll process and the pulsed deposition of particles from a particle dispenser 700 defines the lengths of and spaces between each fingerprint. After having passed a circular brush 702, rolls 703 for stamping/pressing are passed, followed by laminating rolls 705 which may work at a temperature of, but not limited to, 110° C. Further, a waste path 704 is provided for any edge trimming that is performed. By including a polishing device 706 after pinch rollers 710, and a reading/indexing device 707, it is possible to manufacture these tags or objects, read and index them in line, and spool them on to reels ready for use for the purpose in high volume and at low cost. At the end, a finished polymer roll 708 is produced, perhaps on a second carrier film or backing roll provided by 709. By indexing, it is meant that when a tag is dispensed from the reel, it is known which fingerprint/signature was read and stored previously.

In the following, referring to FIG. 8, an optional step for manufacturing an identification tag according to a third embodiment of the invention will be described.

As shown in FIG. 8, it is also possible to produce a wide web of laminate 800 and cut into strips using a cutting device 801 so that a number of identification layers 802 become exposed and can be individually polished, read, indexed and stored for later use indicated by arrows 803.

In the following, referring to FIG. 9, a credit card 900 as another object according to an embodiment of the invention will be described.

The credit card 900 comprises a support substrate 901 carrying at a main surface thereof a conventional magnetic strip 902. Additionally, a narrow edge of the credit card 900 is provided comprising an identification layer 103 which is shown in more detail in an enlarged portion shown in FIG. 9. As can be seen in FIG. 9, the design of an object such as credit card is analogues to that of a tag 102 as the identification layer 103 can be supported by the substrate 901 (if it is not part of the substrate 901) and can be covered by a top layer 105.

As is evident from the embodiment of FIG. 9, it is considered that a suitable object itself (that may be manufactured as a laminate, for example), containing the identification layer may be the object that is in effect tagged. This is different to manufacturing the laminates as tags to then attach to other objects. By way of example, the object is considered a credit card, but other examples include certificates, bank notes, security access cards, vehicular key-cards, passports, identity cards, lead frame, electronic device package, a packaging material (for example for pharmaceutical products), media disks (e.g. CDs, DVDs) or a luxury item such as a handbag. Such an embodiment is obtained when an identification layer 103 as shown in FIG. 9 is included into an object such as a credit card, in a manner that a portion of this thinnest dimension of the credit card is then used for exposing the track for reading out the identification layer.

In the following, referring to FIG. 10A to FIG. 10C, identification systems 1000, 1030, 1060 according to further embodiments of the invention will be described.

The use of magnetic particles in the fingerprint is one example that is disclosed to provide for the fingerprint/signature. Other options are the use of conductive particles (such as metal particles, carbon black, graphite, metal coated particles) and an electrode (which may the underlying or overlying layer, or an additional layer, made of for example metal foil, metal leaf, a sputtered metal, an evaporated metal, a conductive oxide, a conductive composite) so that at least some of the particles can take up a different potential or act as an antenna of an electromagnetic or electric field. In such instances, the detector will either make contact with the track or pass at a slight distance away from the track, detecting variations in, for example, the voltage, current, electric field, electromagnetic field, capacitance or inductance. FIG. 10A to FIG. 10C illustrate some examples of such an embodiment have an electrically stimulated fingerprint/signature. In each case, the presence of a particle influences the detector and this in turn influences the signature.

FIG. 10A shows an identification system 1000 in which a reader 1001 is connected with the negative potential of a DC source. The positive potential of the DC source is connected to top layer 105 of the identification tag 1002. The reader 1001 is adapted to detect percolation current paths according to the signature of identification layer 103.

FIG. 10B shows an identification system 1030 in which a reader 1031 is adapted to read out the signature of identification layer 103. The lower layer 104 of the identification tag 1032 is connected to the negative potential of a DC source. The positive potential of the DC source is connected to top layer 105 of the identification tag 1032. The reader 1031 is adapted to detect potential differences or resistances according to the signature of identification layer 103.

FIG. 10C shows an identification system 1060 in which a reader 1061 is connected to a first connection of an AC source. A second connection of the AC source is connected to top layer 105 of the identification tag 1062. The reader 1061 is adapted to detect electromagnetic fields or inductance according to the signature of identification layer 103.

In the following, referring to FIG. 11A to FIG. 11C, identification systems 1100, 1130, 1160 according to embodiments of the invention using optical detection means for reading the identification features will be described.

FIG. 11A to FIG. 11C include the use of optically active particles such as, but not limited to, dye particles, dye coated particles, phosphorescent particles (such as phosphors), quantum dot particles, photoluminescent particles, polarizing crystals, chiral molecules, liquid crystals, and birefringent particles. These can be illuminated or excited by a light source (such as an ultraviolet lamp, a blue light emitting diode, a laser or a white lamp for example) and the variation of absorbed light, emitted colour, emitted intensity, and/or plane of polarisation detected using a suitable detector (such as a photodiode, spectrophotometer or charge-coupled device array with or without filters or polarisers). The result will also give a fingerprint signature that is suitable for the purpose.

FIG. 11A shows an identification system 1100 in which a reader 1101 is provided as an optical reader detecting PL spectra from quantum dot particles in the identification layer 103. A light source 1107 (emitting UV radiation) illuminates the identification layer 103 through a window 1108 (light transparent region) in the top layer 105. The reader 1101 is adapted to detect light according to the signature obtained from reading the track formed from the edge of the identification layer such that only the at least some of the readable identification features are only meaningful readable from the thinnest dimension of the identification layer 103.

FIG. 11B shows an identification system 1130 in which a reader 1131 is provided as an optical reader detecting phosphorescence from particles due to light transmitted through a layer of phosphor particles. A light source 1107 illuminates the identification layer 103. The reader 1131 is adapted to detect light according to the fingerprint of the identification layer 103 by measuring the wavelength and intensity of the phosphorescence with respect to position along the track formed from an edge of the thinnest dimension of the identification layer.

FIG. 11C shows an identification system 1160 in which a reader 1161 is provided as an optical reader detecting change in polarization of light with position across the identification layer due to particles influencing the plane of polarization. A light source 1107 (e.g. a laser) illuminates the identification layer 103. The reader 1161 is adapted to detect light by reading the fingerprint of the identification layer 103.

The advantages of the approach to use a laminated structure for guiding the read-head during the reading process include the following. Firstly it is possible to shape the read-head or its associated parts to be mechanically guided by the width of the tag in which the identification layer lies. It is also possible to include extra layers, for example alignment layers, into the stack above and/or below the identification layer to act as guides. These alignment layers may, for example, be detected using optical, magnetic, or electric sensors by providing visible, reflective, magnetic, or electrically conducting markings, either continuously, intermittently or at the start and/or end of the identification layer. Combinations thereof may be used and they may lie predominantly in the same plane—for example sputtered markings may be intermittently deposited on the same plane as the particles that are comprised in the identification layer. As with previously described layers, these layers may be deposited in a number of different ways including, but not limited to, sputtering, evaporation, lamination, printing, spin-coating and/or spraying.

FIG. 12A to FIG. 12D show identification systems according to embodiments of the invention illustrating the above discussed examples.

FIG. 12A shows an identification system, in which the layer sequence 103, 104, 105 forming an identification tag 1200 that is read by a reading element 1201 that is mechanically guided by a U-shaped guiding means 1212. The guiding means 1212 may be an extension of the reading element 1201 itself. Alternatively, it may be a shaped read-head containing the reading element 1201, or an outer casing that houses the read-head system. Such a mechanical guiding means may include rollers, coil springs, leaf springs, centralizing gimbles or pivots to maintain position. These guiding means may be located on the reading element, the read-head unit or the surrounding housing of the reader unit.

FIG. 12B shows an isometric view as well as a cross-sectional view of a further identification system. In this system, the reader unit 1210 has a right angle structure in which a guiding means 1212 guides the reading element 1201 along the track formed from an edge of the identification layer 102 (which can be part of an object or tag that includes a top layer 105 and a bottom layer 104).

FIG. 12C shows an identification system, in which the layer sequence 103, 104, 105 additionally includes guiding layers 1233 and intermediate layers 1234 forming an identification tag 1230. A reading element 1201 can be guided by means of the guiding layers 1233. One of the guiding layers 1233 can be a continuous sheet of metal providing a visual/optical guide. Another one of the guiding layers 1233 can be a continuous sheet of ferromagnetic material providing a magnetic guiding field.

FIG. 12D shows an identification system, in which the layer sequence 103, 104, 105 additionally includes guiding layers 1263 and intermediate layers 1234 forming an identification tag 1260. A reading element 1261 can be guided by means of the guiding layers 1263. One of the guiding layers 1263 can have markers (optical markers, for example) indicating start and finish points of a neighbouring fingerprint. Another one of the guiding layers 1263 can be an intermittent guiding layer of ferromagnetic material, for instance, providing a magnetic guiding field.

In some embodiments these layers are preferably parallel to each other. In some presently preferred embodiments these layers are of less than 100 micrometers in thickness, and preferentially still they are 1-10 micrometers thick.

In all of the above embodiments, parts from each may be applied to parts of the other. For example, the roll-to-roll process can be applied to the conductive particle variant. Furthermore, also combinations are considered, e.g. the use of conductive magnetic particles and a reader that detects more than one field or signature of interest. This provides for even more security and protection against counterfeiting.

In all of the previous diagrams, the reader has been shown to move across the fingerprint. However, it also possible to have a stationary reader and a moving tag/object.

It is further possible that the track can be protected by one or more protection layers (cf. also FIG. 1G). This can help to reduce mechanical or chemical damage to the fingerprint region during its service life. Suitable materials include, but are not limited to, a coating of Teflon, another polymeric coating, a sol-gel, and an amorphous diamond or diamond-like thin film. These materials could be deposited in a number of ways, either by evaporation, sputtering, PVD, PECVD, filtered cathodic vacuum arc, dip coating, or spraying. The protective layer/s may be confined to a portion of the edge of the layer structure, all of the edge or indeed continue to cover portions of the upper and lower surface of the tag/object. The protective layer allows reading of the relevant information by the reading device (i.e. the track must still be "exposed" as defined previously), or the protective layer must be easily removable to allow reading to occur (see also FIG. 1G).

In the case where the tag is produced to be later attached to the object, numerous suitable methods to effect that attachment can be employed. Although the actual method depends on the materials used in the tag, the materials present on the surface of the object and the service environment of said object, to name a few parameters, it is highlighted the use of glue, epoxy resin, solder, eutectic heat bonding, silica sol gel, frit, mechanical interlocking or mechanical compression. The layer that achieves the adherence may be a thin additional layer or constitute the identification layer itself, and could be present on some/all of either/both the upper and/or lower surface of the tag.

FIG. 13 shows an identification arrangement 1300 according to a further embodiment of the invention.

The identification arrangement 1300 has an identification tag 1301 adhered to an object 1302. The tag 1301 has an identification layer 1303 and is adhered to the object 1302 in an adhering area 1304.

Embodiments of the invention which make use of laminated sheets of porous material, are described in the following.

By using porous material, pores of such a porous material can be selectively filled with magnetic material or electrically conducting material to create identification layers.

In the following, referring to FIG. 14A to FIG. 16, views during a method for manufacturing an identification tag according to one embodiment of the invention will be described.

FIG. 14A to FIG. 14E illustrate an exemplary process of preparing a laminated tag using aluminium foil 1400 shown in FIG. 14A. Firstly, the aluminium foil 1400 is cleaned with lint free wipes together with isopropanol (IPA) followed by deionised water.

Then, as shown in FIG. 14B, the foil 1400 is placed in between two polymeric laminating sheets 1401, 1402 so that it is in contact with the glue sides, wherein a portion of the foil 1400 is protruding out. The stack of material, as shown in FIG. 14C, is laminated together by passing it through a conventional office-stationary laminator at, for example, 110° C. and lowest pre-set speed (speed 1). Then the laminated film 1403 is mounted into epoxy mold 1404 using Struers EpoFix and left to cure, as shown in FIG. 14D for example over night. The last step of preparation is a two-step polish. The sample is consecutively polished with polishing paper from grade 500 to 1200 to 2400 to 4000, followed by a fine polish using diamond suspensions with 3-micron beads and 1-micron beads. FIG. 14E shows the bottom view of the laminated Al film prepared in this way.

Next, as shown in FIG. 15, the sample and a Pt mesh 1501 are placed into a beaker 1500, and the temperature of a cold plate 1502 is set to the desired temperature of for example 4° C. using a thermal control device 1502. When the temperature of the solution reaches the set temperature, the power supply 1503 set to 150 V is connected as shown, using the protruding foil 1400 as a contact for the tag precursor. This anodizing process creates disordered porous alumina with pores randomly distributed in the edge of the aluminium containing layer. Following this, the sample is placed into the widening solution (for example, 5 wt % phosphoric acid), to enlarge the pores to a desired size.

Finally, the sample and Pt mesh 1501 are placed in a Ni plating solution containing 30 g $NiSO_4.6H_2O$, 4.5 g $NiCl_2.6H_2O$ and 4.5 g $H_3BO_3$. The plating voltage is set at −1.4 V, for example. After plating, Ni is randomly filled inside the pores. This region now constitutes the desired identification layer.

FIG. 16A shows a portion of the aluminium foil 1400 between the laminating sheets 1401, 1402.

FIG. 16B shows the array of FIG. 16A after an anodizing method step, so that pores 1600 are formed in the aluminium foil 1400.

FIG. 16C shows the array of FIG. 16B after a nickel plating method step, so that nickel particles 1601 are formed in some of the pores 1600 of the aluminium foil 1400.

FIG. 16D shows a signature 1610 captured by a reading element on the identification tag shown in FIG. 16C.

FIG. 16A to FIG. 16D illustrate the process of forming a tag containing an identification layer. As described for the case above using the magnetic particles in a laminate, this identification layer (i.e. the identification features contained therein) can now be read from the track of the identification layer using a suitable magnetic field detector to provide a signature.

Figure 1A:
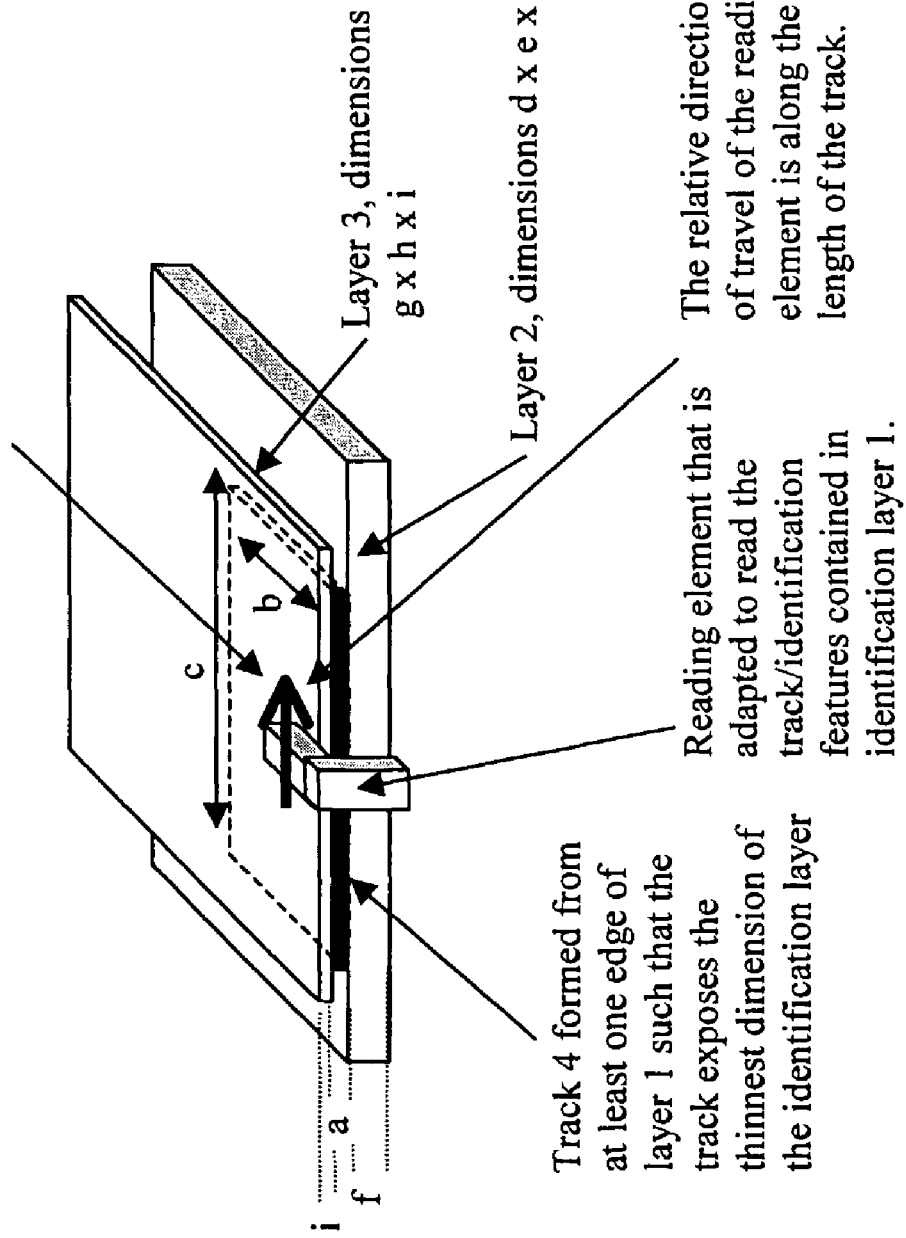
Figure 1B:
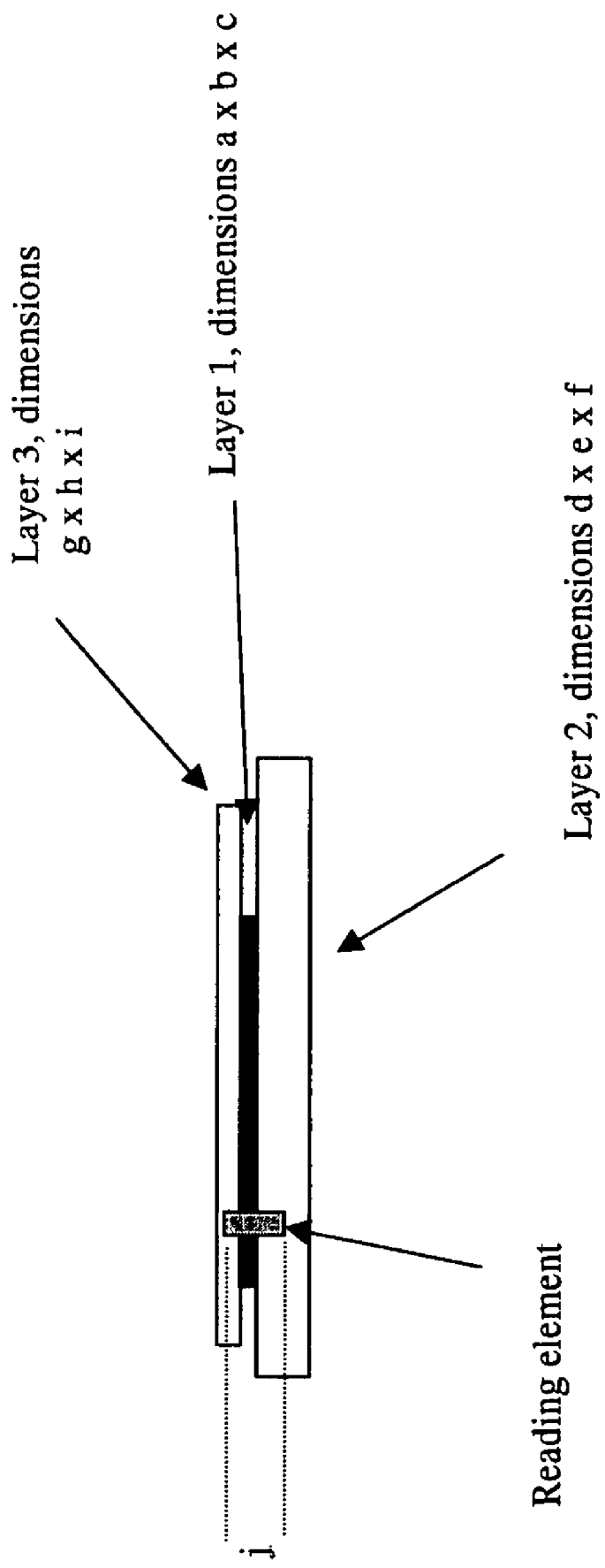
Figure 1G:
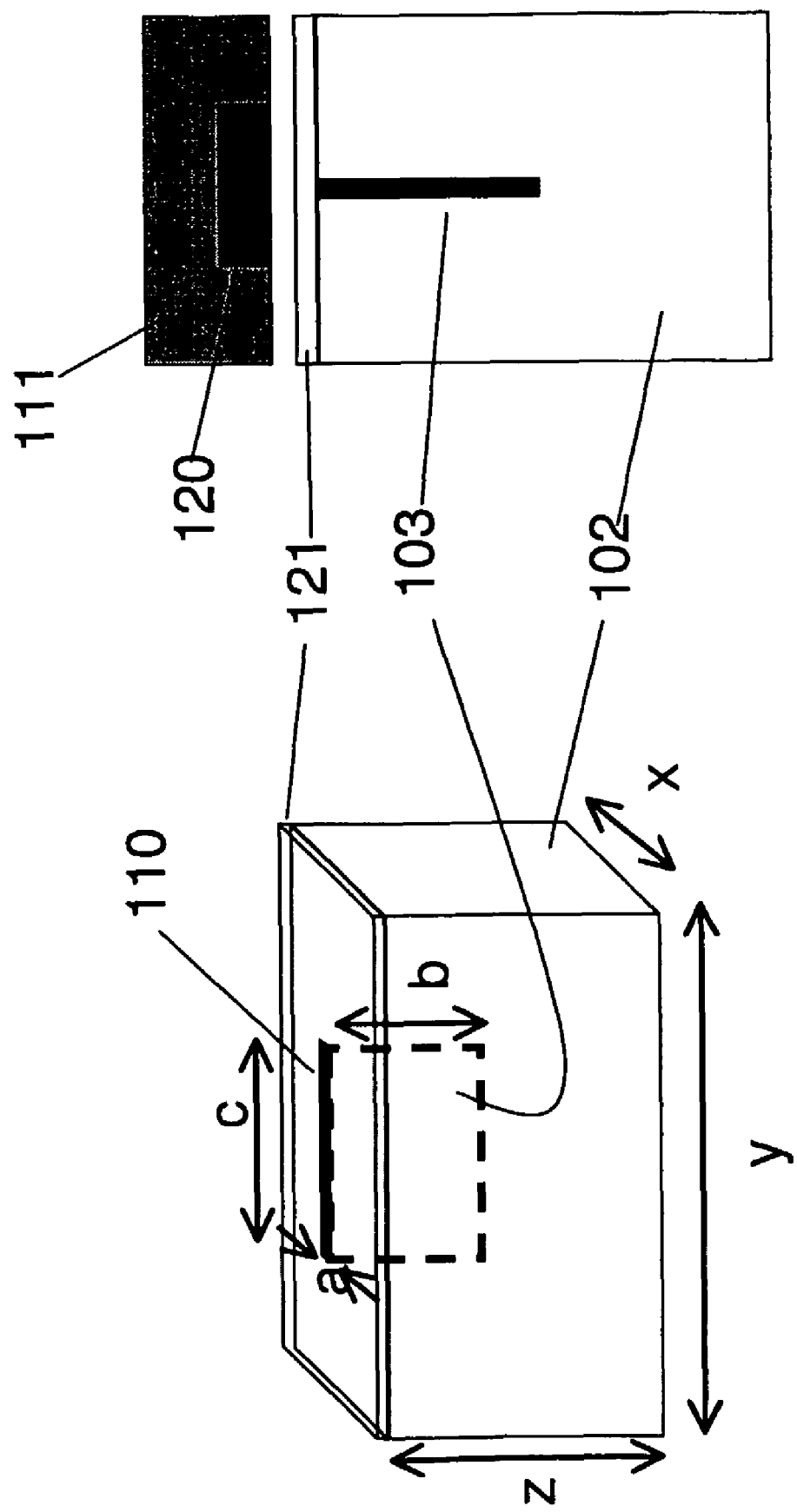
Figure 1H:
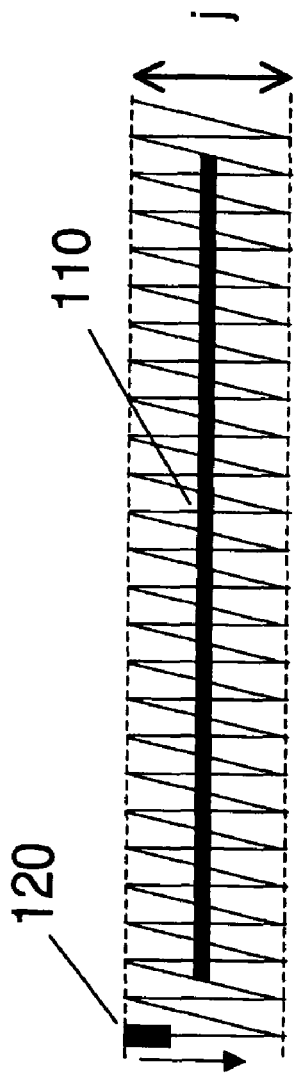
Figure 1I:
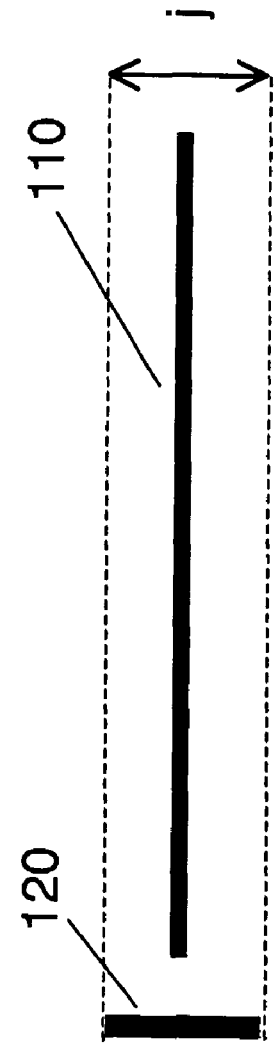
Figure 1J:
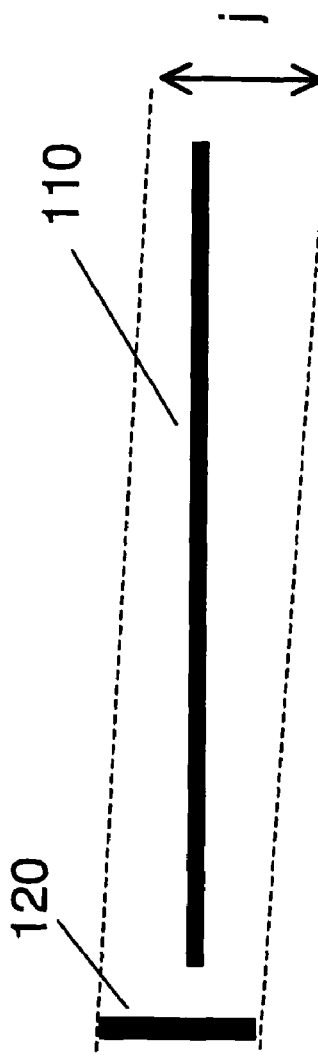
Figure 2:
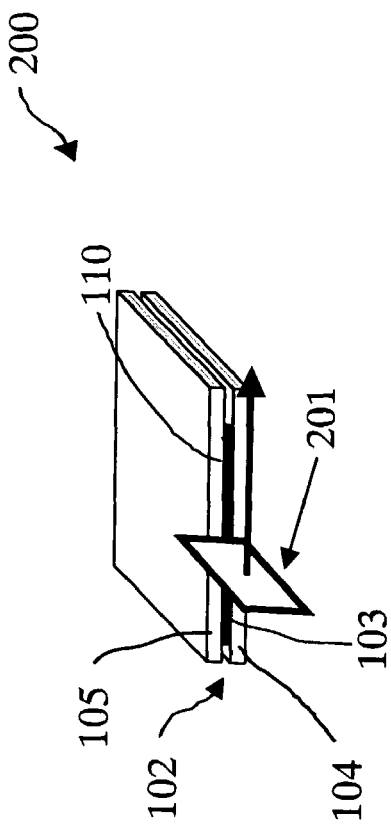
Figure 3:
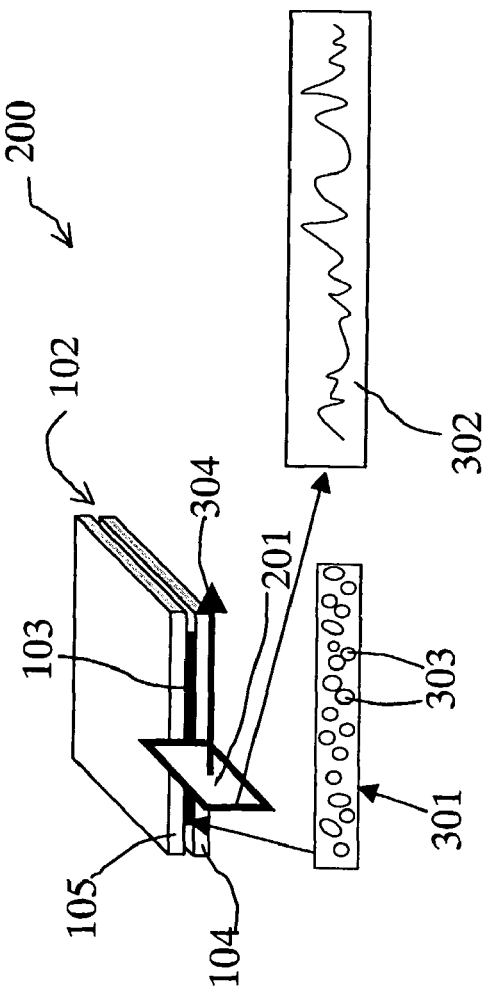
Figure 4A:
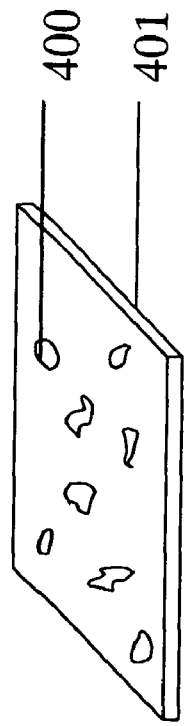
Figure 4B:
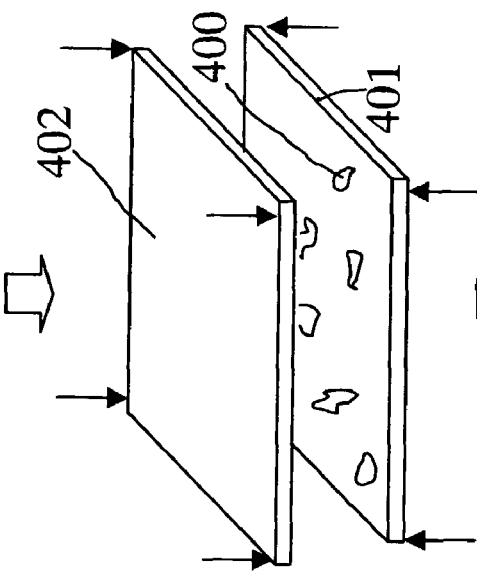
Figure 4C:
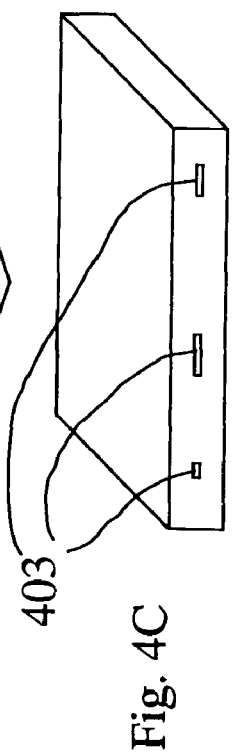
Figure 4D:
Figure 4E:
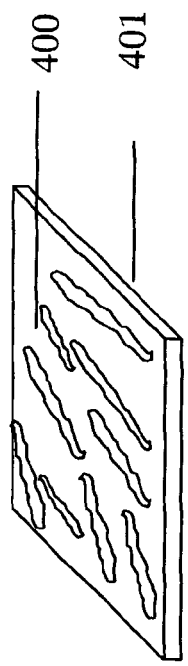
Figure 4F:
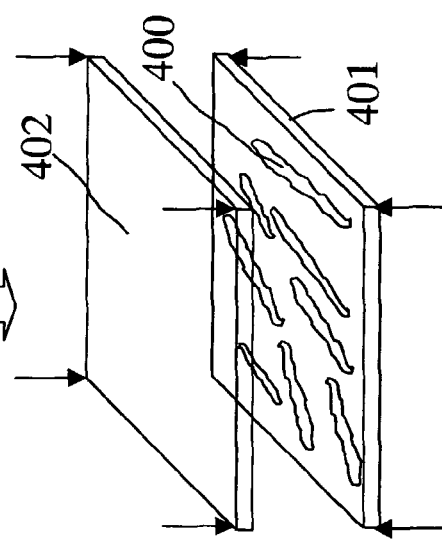
Figure 4G:
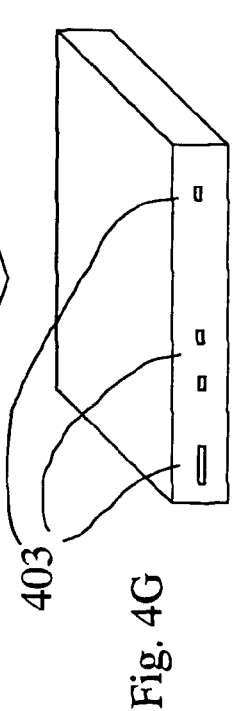
Figure 4H:
Figure 5:
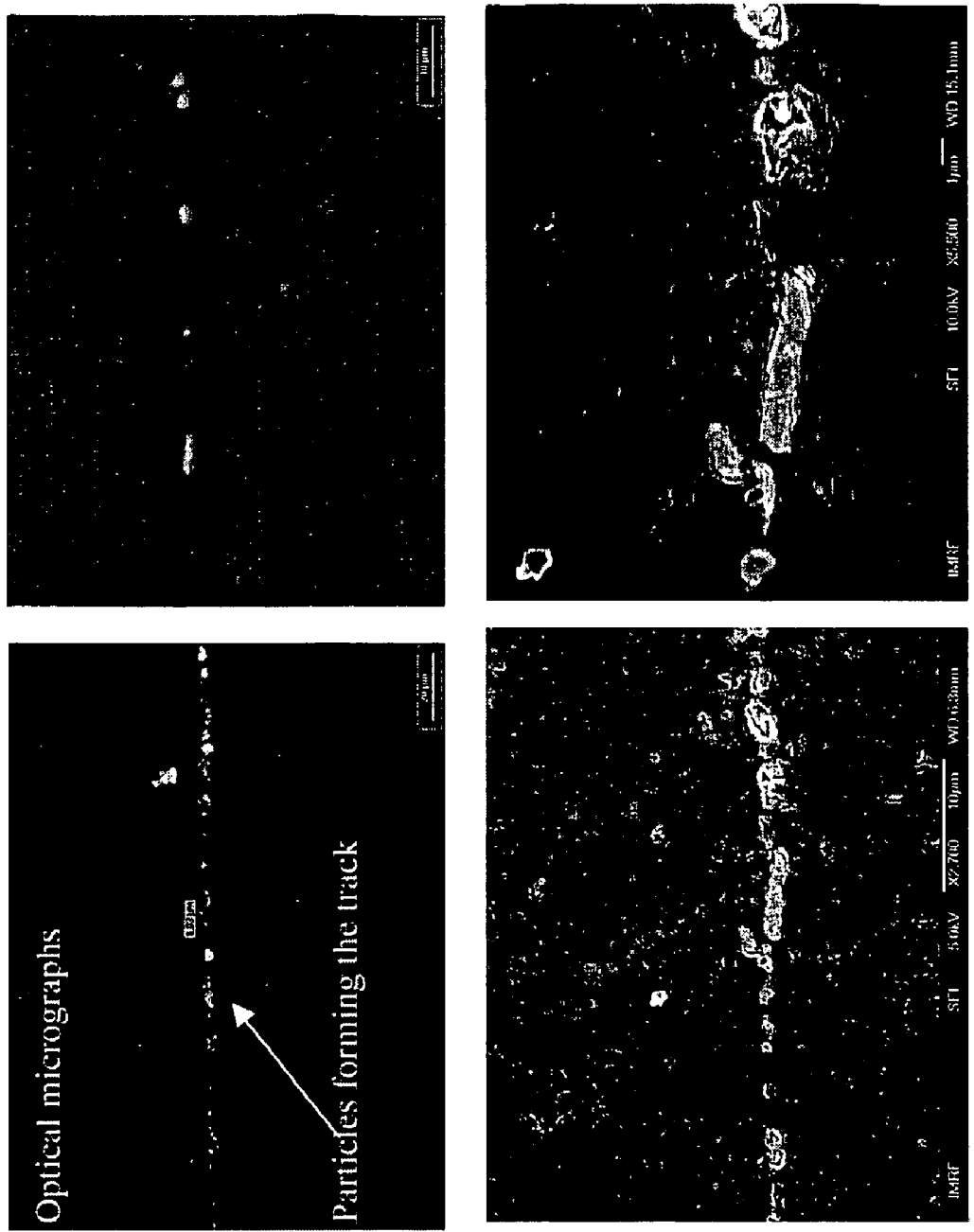
Figure 6:
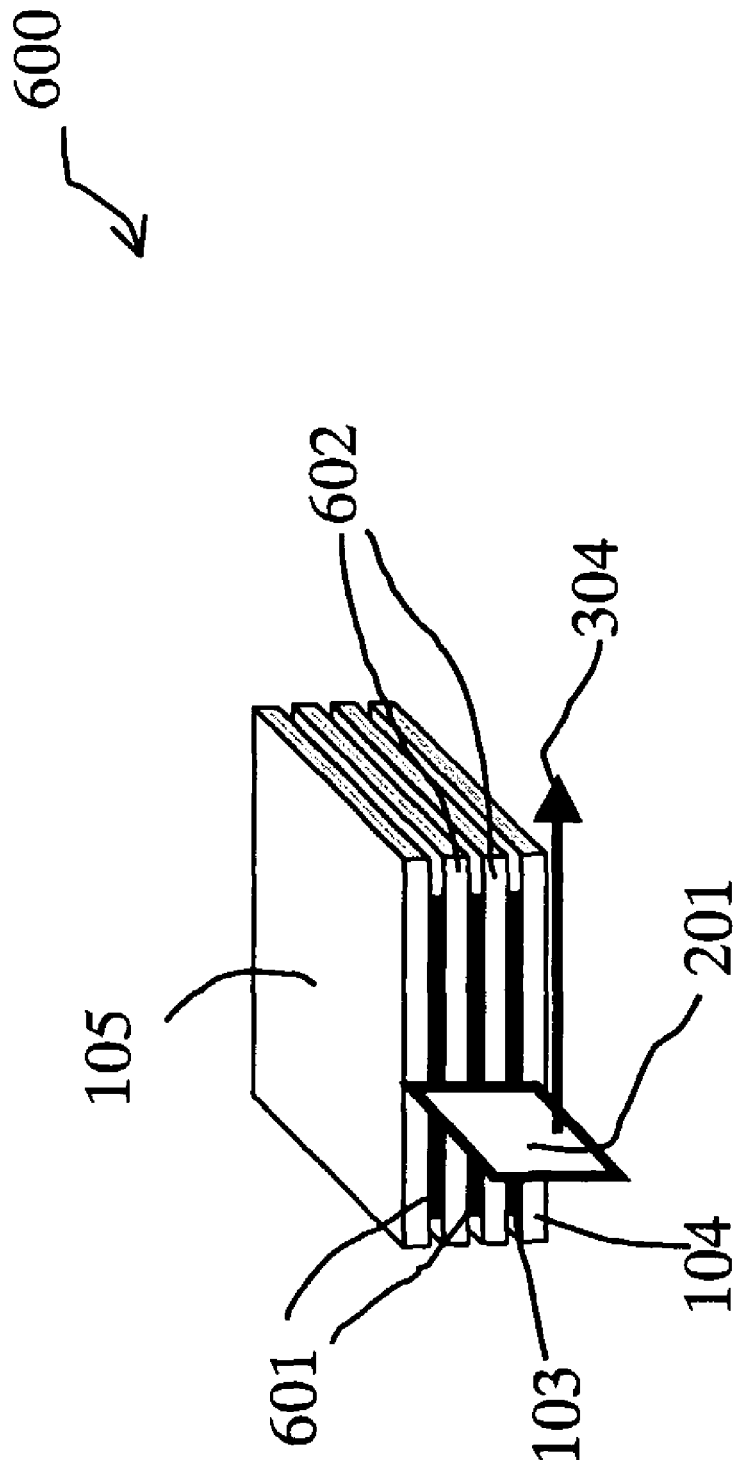
Figure 7:
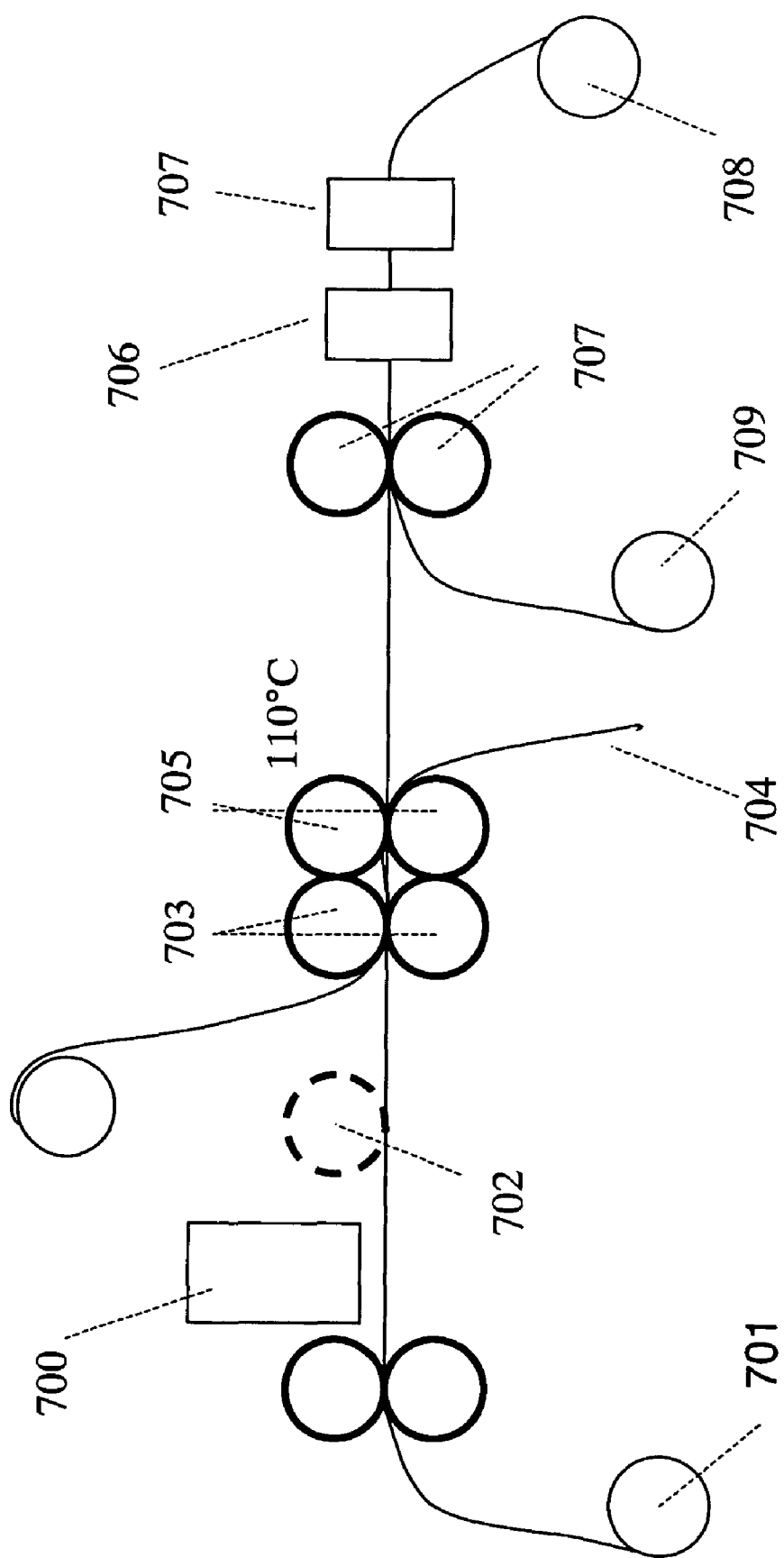
Figure 8:
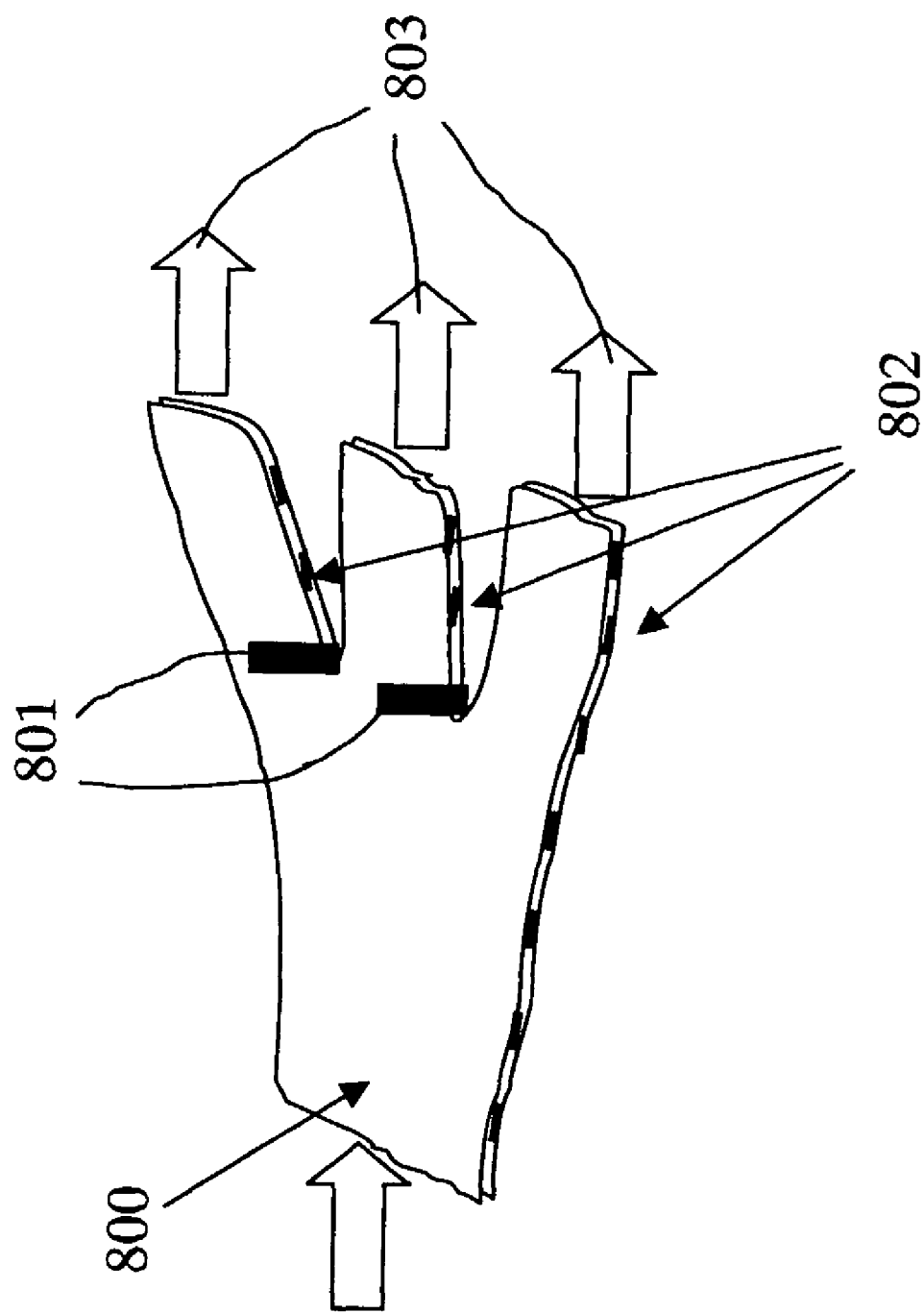
Figure 9:
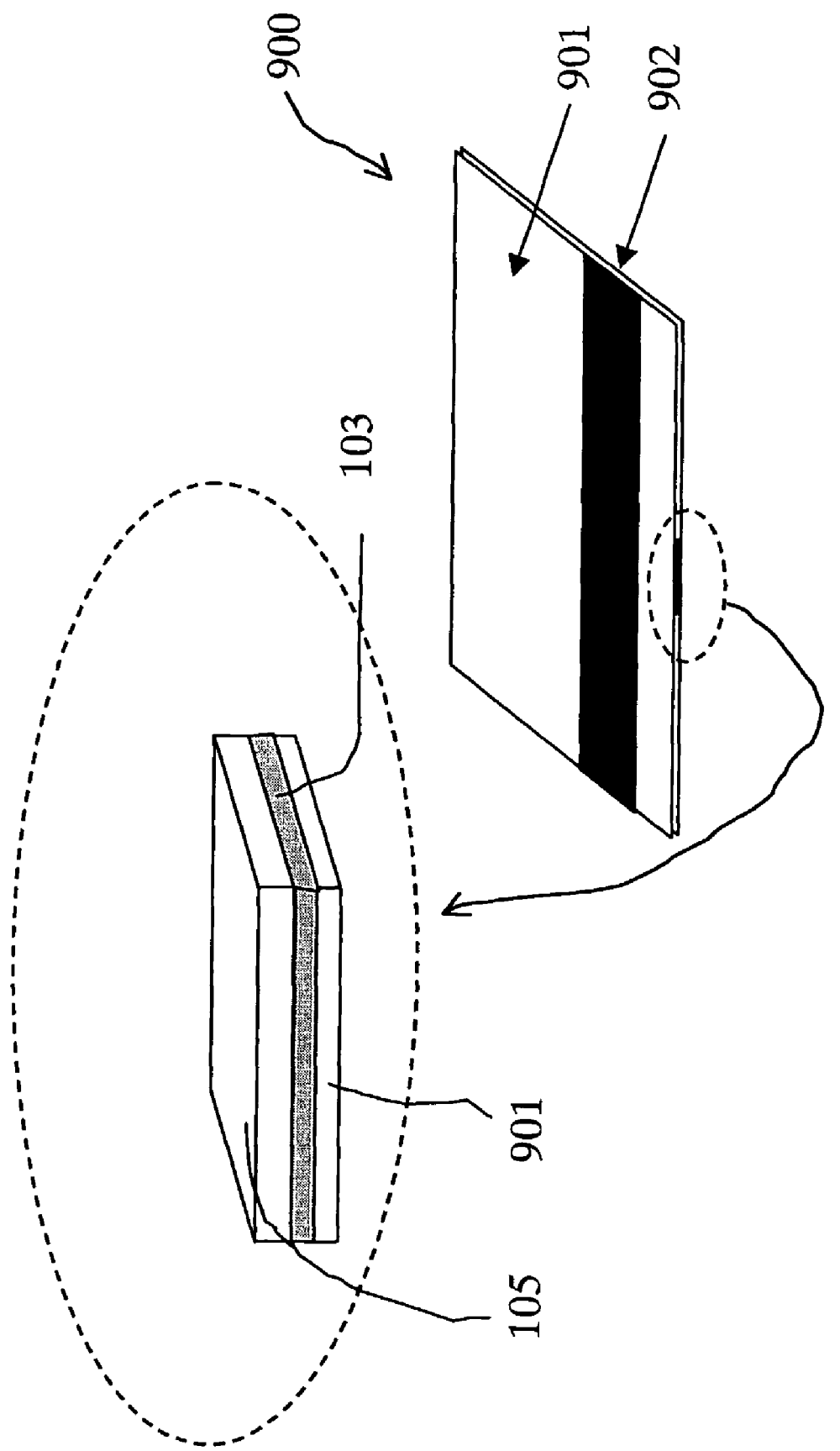
Figure 11A:
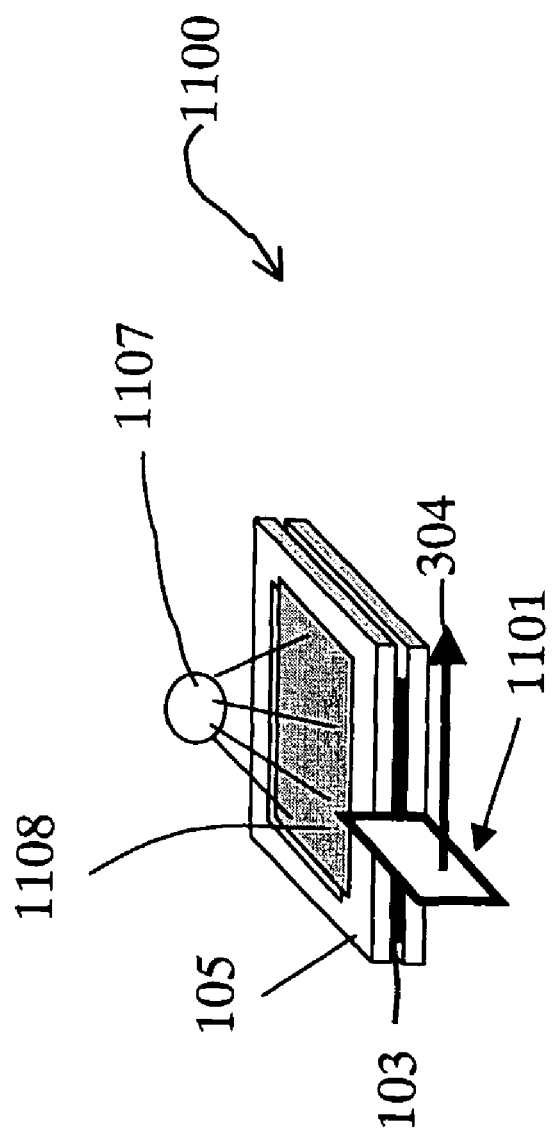
Figure 11B:
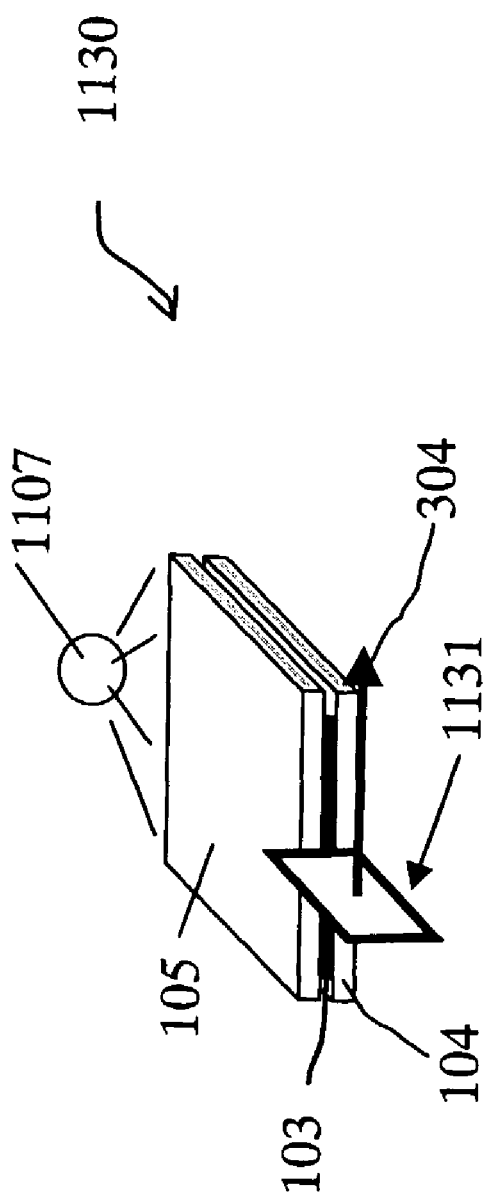
Figure 11C:
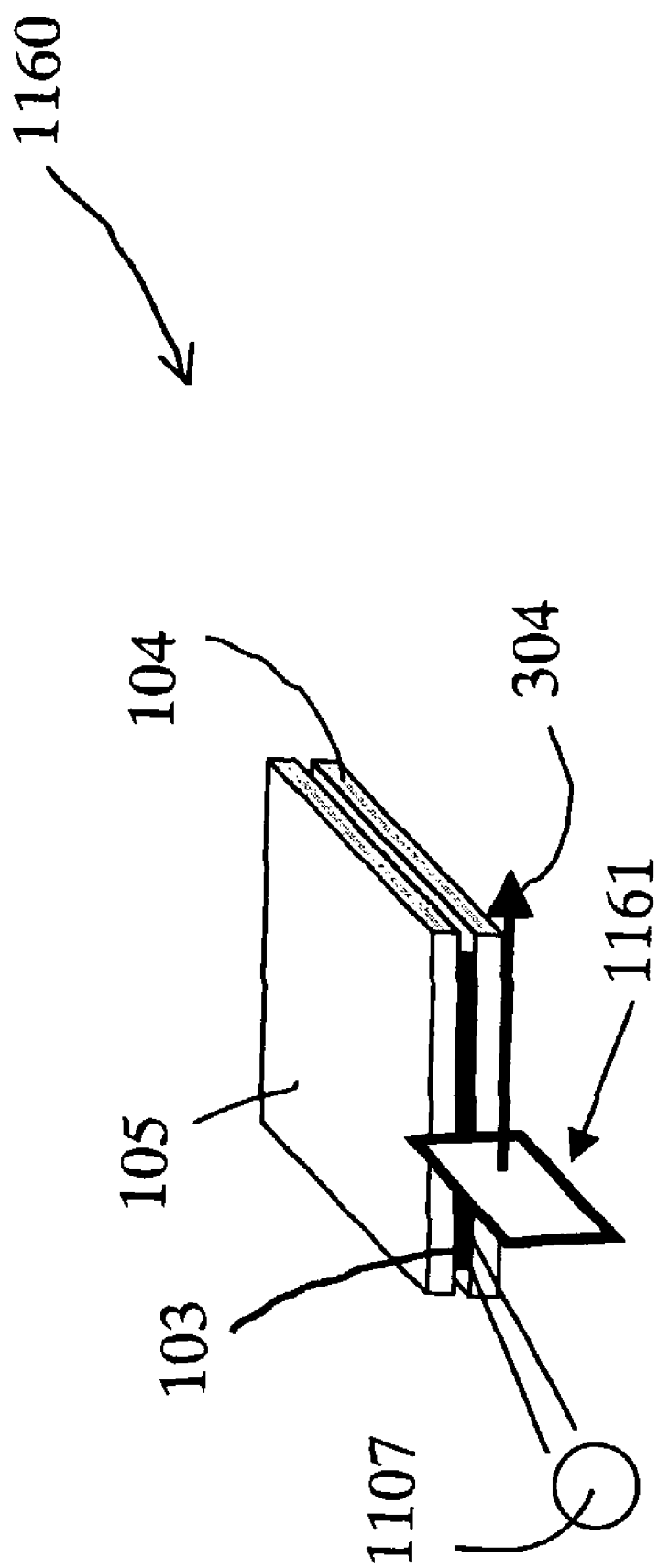
Figure 12A:
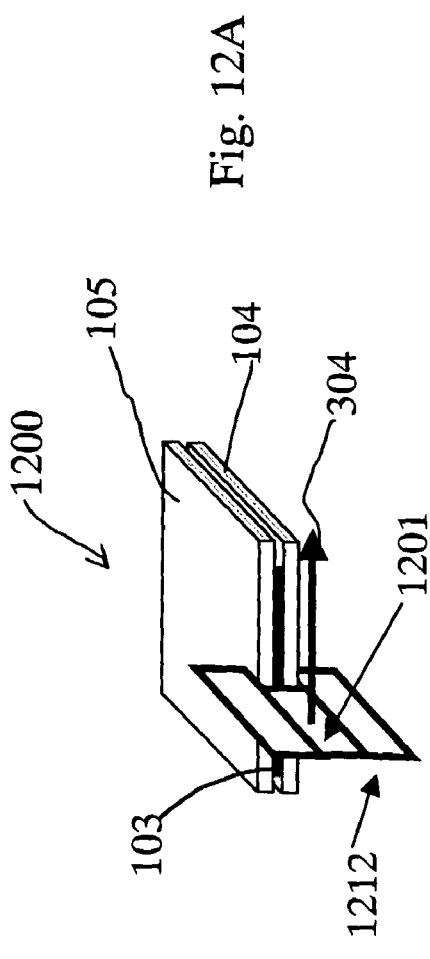
Figure 12B:
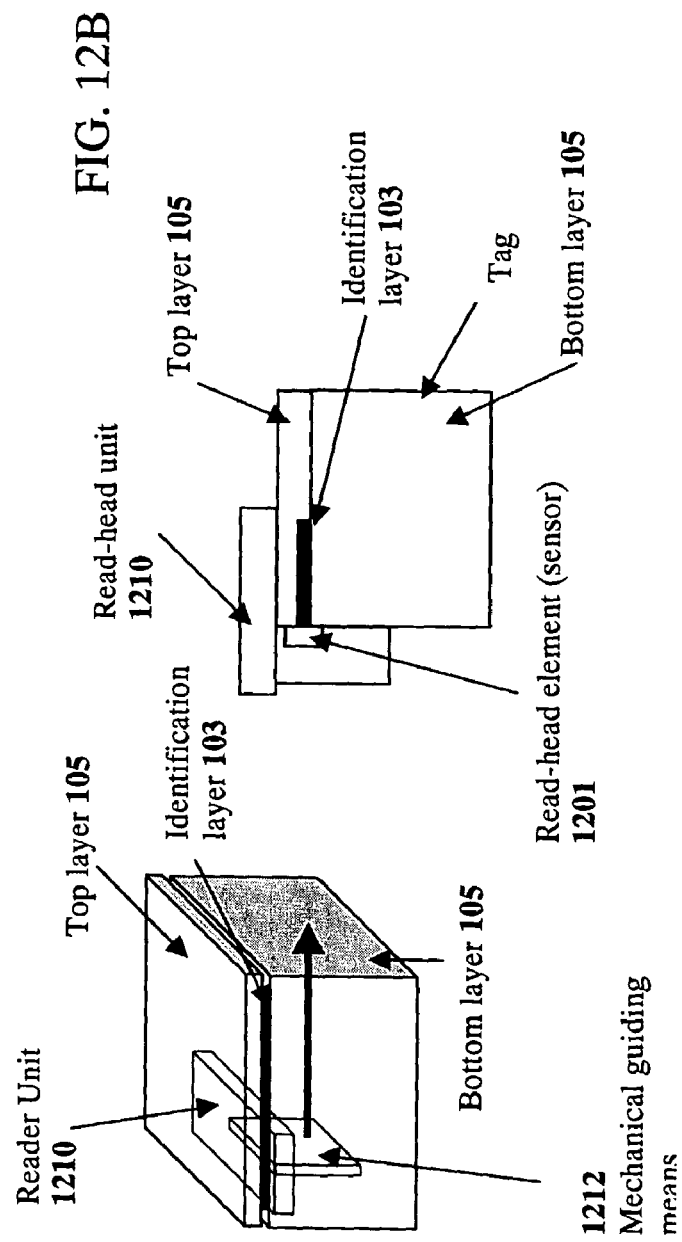
Figure 12C:
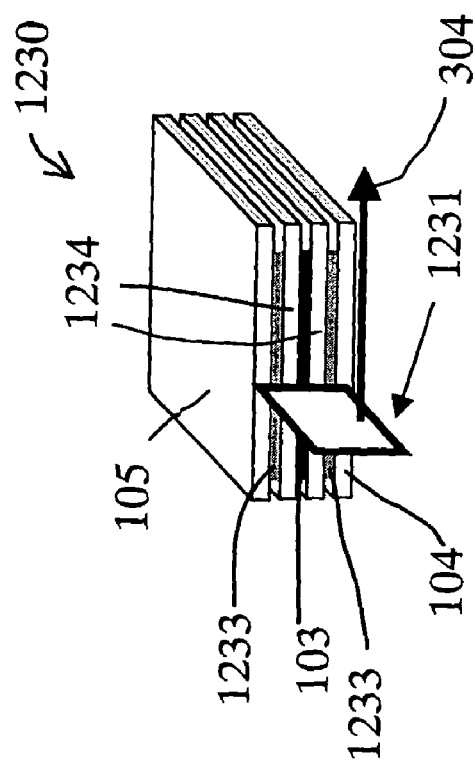
Figure 12D:
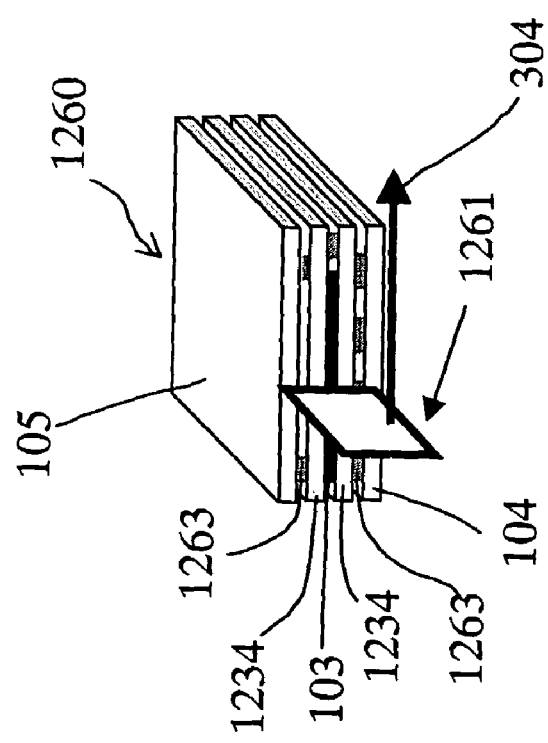
Figure 13:
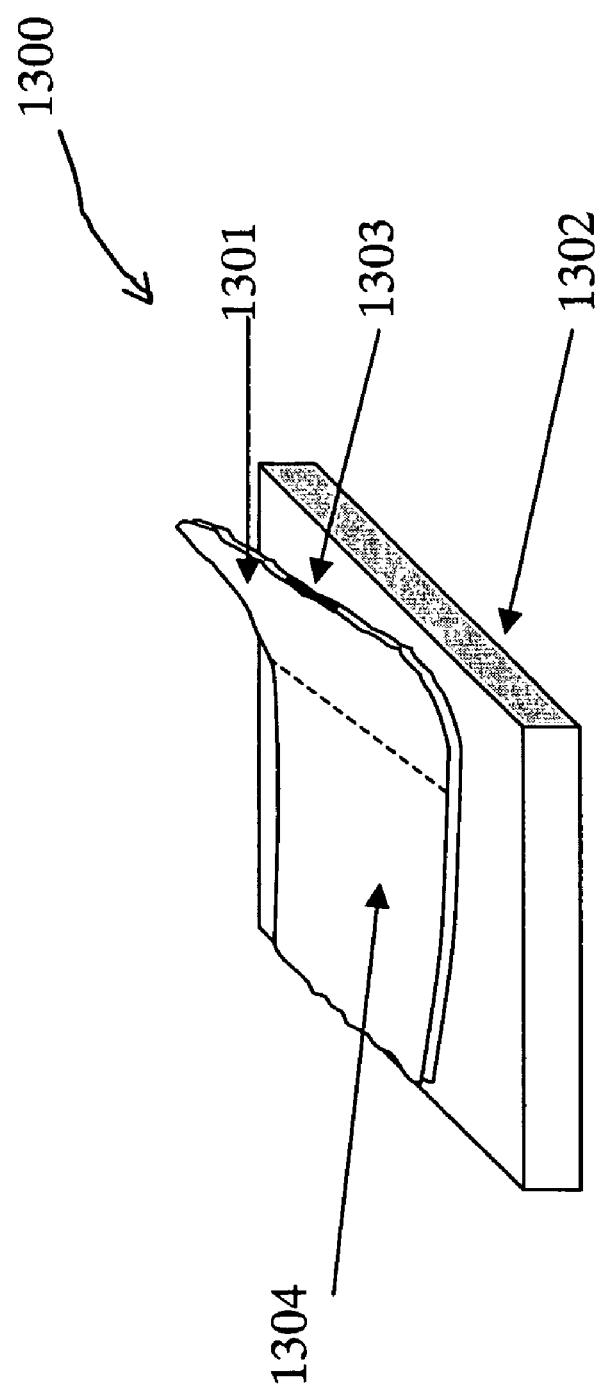
Figure 15:
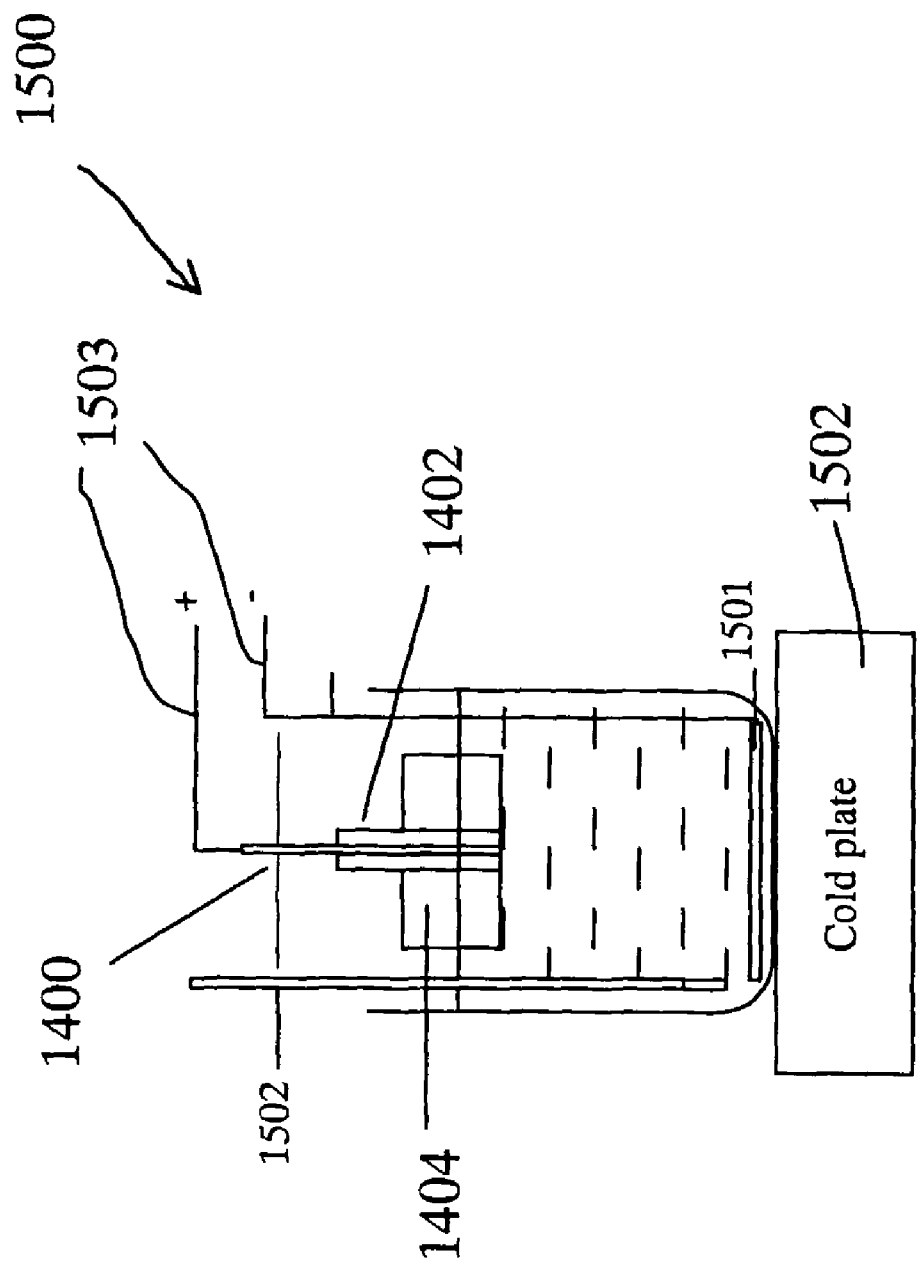
Figure 16E:
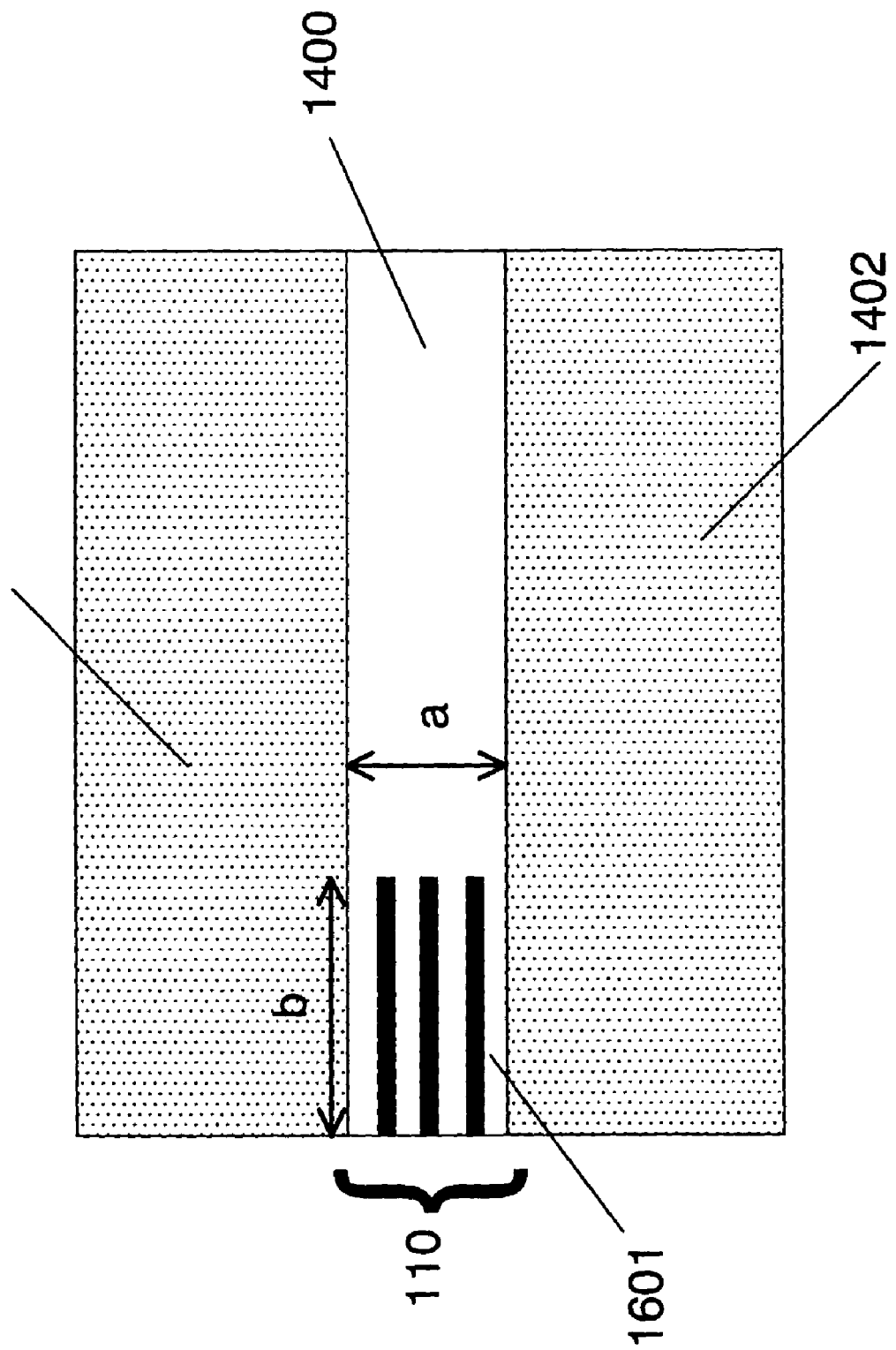
FIG. 16A to FIG. 16D are views during an exemplary method for manufacturing an identification tag according to the above-described embodiment of the invention, showing the pore forming and pore filling method steps.

FIG. 16E shows a cross-section of a tag with filled pores manufactured using the method described above. As in FIG. 1A, here too the dimensions of the track width "a" and the depth of the identification layer "b" are shown (however since it is a two dimensional representation, dimension "c" is not shown). As can be seen in the drawing one advantage of this method is that a narrow track can be easily formed (by using a thin foil of aluminium), and the pores that result are generally oriented out of the plane of the track. As before, this means that the reading of the magnetic fingerprint is easier and that the structure is more difficult to forge. In this respect it is noted that the creation of the structure (for example randomly distributed pores later filled with magnetic material, i.e. particles) that provides for the identification features to be arranged oriented out of the plane of the track is by no means restricted to the electro-chemical method as illustrated in FIG. 15 and FIG. 16. But any other suitable method such as the method shown in FIG. 4 that allows, for example, randomly distributed particles to be arranged out of plane of the track can used in the present invention.

Figure 17:
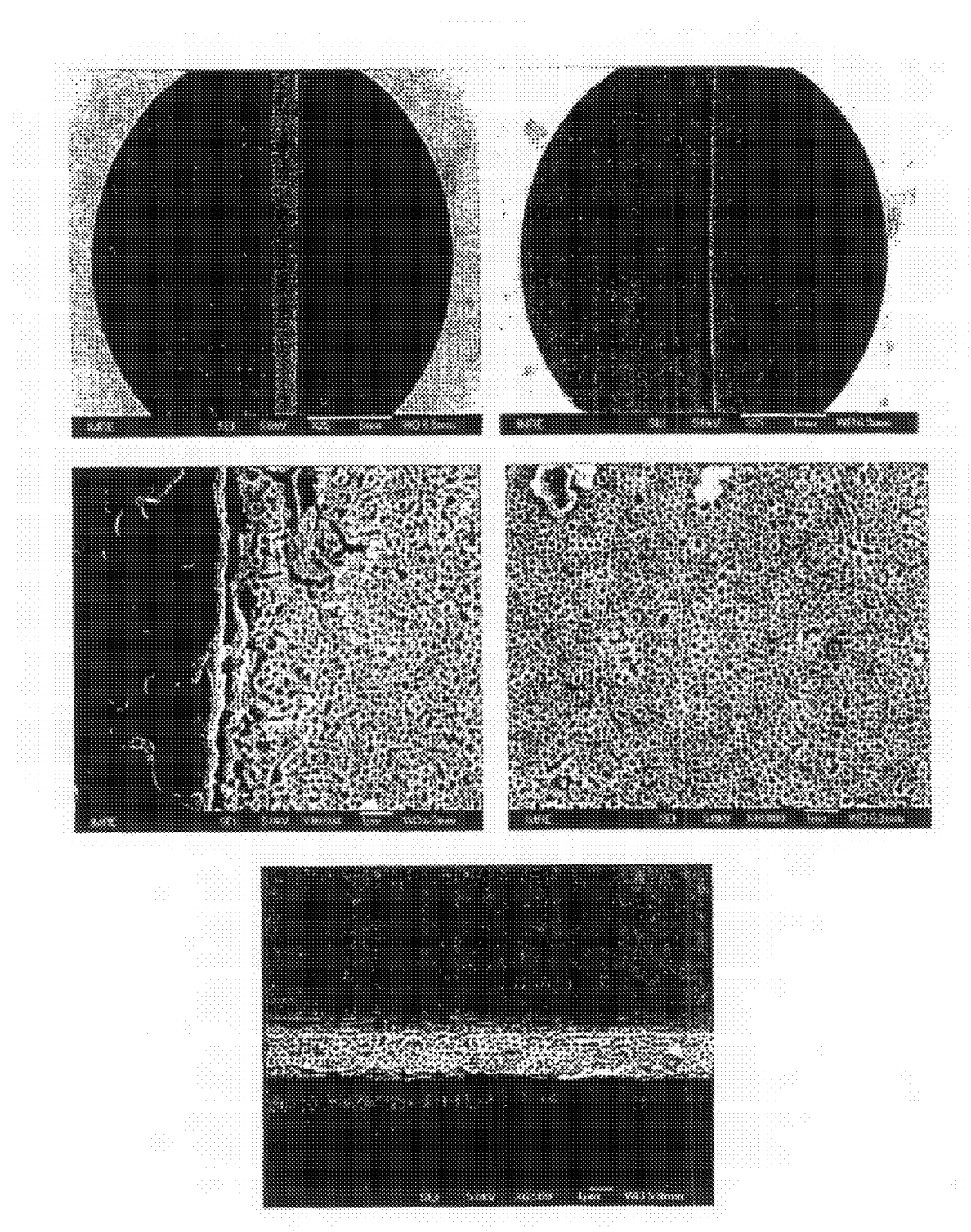

FIG. 17 shows scanning electron microscope (SEM) images of two such laminated aluminium foils and resulting porous alumina after the anodizing process described above. In these two examples, the thickness of the aluminium foils used to form the identification layer was 250 μm in the one case and 20 μm in the other case.

The track width (thinnest dimension of the identification layer) is less than 1 millimeter, preferably less than 500 micrometers, 100 micrometers, 10 micrometers or even 1 micrometer. Although the use of a foil precursor is illustrated by means of the above example, other forms of identification layers such as a sputtered layer, an evaporated layer, metal leaf, a printed layer, or a spun-on layer are also contemplated here.

The use of porous materials filled with magnetic material has a number of advantages for the purpose of using a layered approach to obtain the desired width to the identification layer.

Examples of variations in the process scheme are:

Pore size, distribution, spacing and control thereof through the processing conditions.

Varying the precursor material and purity to provide for a porous host of different pore size, shape and distribution The different magnetic materials for filling the pores, to different extents.

An embodiment of subjecting the identification layer to a strong magnetic field to reset before each reading.

The advantages of using nanostructured porous thin films with high aspect ratio as nano-bar magnets.

The variation of measuring electromagnetic and electric fields from pores filled with electrically conductive material.

In the following, referring to FIG. 18, a compact disc 1800 containing an identification layer of the invention as another object adapted to be identified according to the invention will be described.

The compact disc 1800 comprises a main surface. Additionally, an edge of the compact disc 1800 is designed such that it exposes the thinnest dimension of an identification layer 103 (which may, for example, be an aluminium layer comprising porous alumina partially filled with magnetic material, arranged between a top layer 105 and a bottom layer 104) which is shown in more detail in the enlarged portion also shown in FIG. 18.

Accordingly, in the embodiment of FIG. 18, it is the laminate itself, containing the identification layer that is the object that is in effect tagged. By way of example, a compact disc (CD) software media is explicitly illustrated here, but other examples (as highlighted previously) equally apply. The CD containing an identification layer 102 as shown in FIG. 18 can be obtained by anodising a small region of the thin sputtered aluminium layer of the CD at one edge using, for example, the process illustrated in FIG. 15 and FIG. 16. By so doing, the identification layer contains an exposed region that forms a track can be read to authenticate that the software media is genuine. Cutting and or polishing a small region of the CD before and/or after the anodisation or pore filling step is in some cases be desirable to form a smooth track.

Features of other embodiments in which the invention has been described with reference to an identification tag can be simply applied to embodiments in which the laminate itself, containing an identification layer may be the object that is adapted to be identified. Examples of such features include production in a roll-to-roll process, the use of multiple stacks, the mechanical guidance of a read-head and the use of neighbouring interlayers to guide such read-head. The same applies to the variety of materials, the modes of attachment and/or the modes of operation that are discussed herein.

In the following, embodiments of the invention are described using ion-implantation to create identification layers.

In the following, referring to FIG. 19A to FIG. 19D, views during a method for manufacturing an identification tag according to a further embodiment of the invention will be described.

One exemplary method for formation of a layer suitable as an identification layer is that of ion implantation. In this case the layer can be formed in the bulk of a precursor material rather than creating a layered sample in succession. FIG. 19A to FIG. 19C illustrate stages that are particularly suited to this approach. The bulk material 1900, as shown from one side in cross-section in FIG. 19A, may be selected from a wide range of materials, including but not limited to, polymers, metal sheets, wood, ceramics, leather, textile, a wafer of silicon, etc.

The ions 1901 used for the ion implantation, as shown in FIG. 19B, are those that are desired to form the identification layer or be a component of the identification layer. For an identification layer based on magnetic identification features, it is desirable to use ions of a ferromagnetic material such as, but not limited to, iron, nickel or cobalt. By selecting the ion energy it is possible to tailor the depth that the ions penetrate into the bulk material. This is because the stopping distance is a function of the bulk material 1900, the ion energy and ion's scattering cross section. Predicting and calculating the stopping distance is well known in the art (using, for example, simulation software such as TRIM). By using a high fluence of ions, it is possible to obtain a significant density of the ion material in the bulk, and with a subsequent annealing step, of which the resulting structure is shown in FIG. 19C, diffusion and coalescence are promoted, thus forming coalesced particles 1903 forming the identification layer. The result, for a particular fluence of ions, is a coagulated layer of distinct but variously sized islands (or particles) of material. This material may remain as the ion or react with the bulk or other gases to give compounds (such as oxides).

By cutting and/or polishing at least one edge of the bulk material 1900, this creates a track that exposes the identification layer 1903 (for the sake of clarity it is mentioned here again that FIG. 19 is a side view of the object or tag comprising the identification layer 1903). The process of forming the identification layer by ion implantation can be implemented in a roll to roll process as previously described, and may be combined with many of the other embodiments already discussed, for example in a multilayer stack by selecting different ion energies, for use in non-magnetic variants by selecting different ions and/or precursor materials.

FIG. 19D shows a fingerprint/signature 1910 captured by a reading element on the identification tag or object adapted to be identified shown in FIG. 19C.

It is also possible to use dense stopping layers within the precursor of the tag or object, for example titanium or tantalum layers that help to define the penetration depth. It is further possible to make use of diffusion barriers and diffusion of ions into the bulk in a variation of this method.

In the following, phase separation of immiscible binary polymer blend layers as another example for a method for generating identification layers will be described in detail.

The general phenomenon of phase separation of spin cast immiscible binary polymer blends has been experimentally studied, and an analytical model of the phase separation process has been proposed, see Walheim et al., Macromol. 30, 4995 (1997), Takenaka and Hashimoto, Phys. Rev. E 48, 647 (1993).

Here, the morphologies of the phase separated binary polymer blends are used to form disordered patterns of, for example, ferromagnetic material in a layer. The phase separated patterns are random and self-assembled due to the effects of thermal noise and other chaotic processes. Therefore, this suits the purpose of the invention, because the probability that two patterns are identical is very small.

Figure 20:
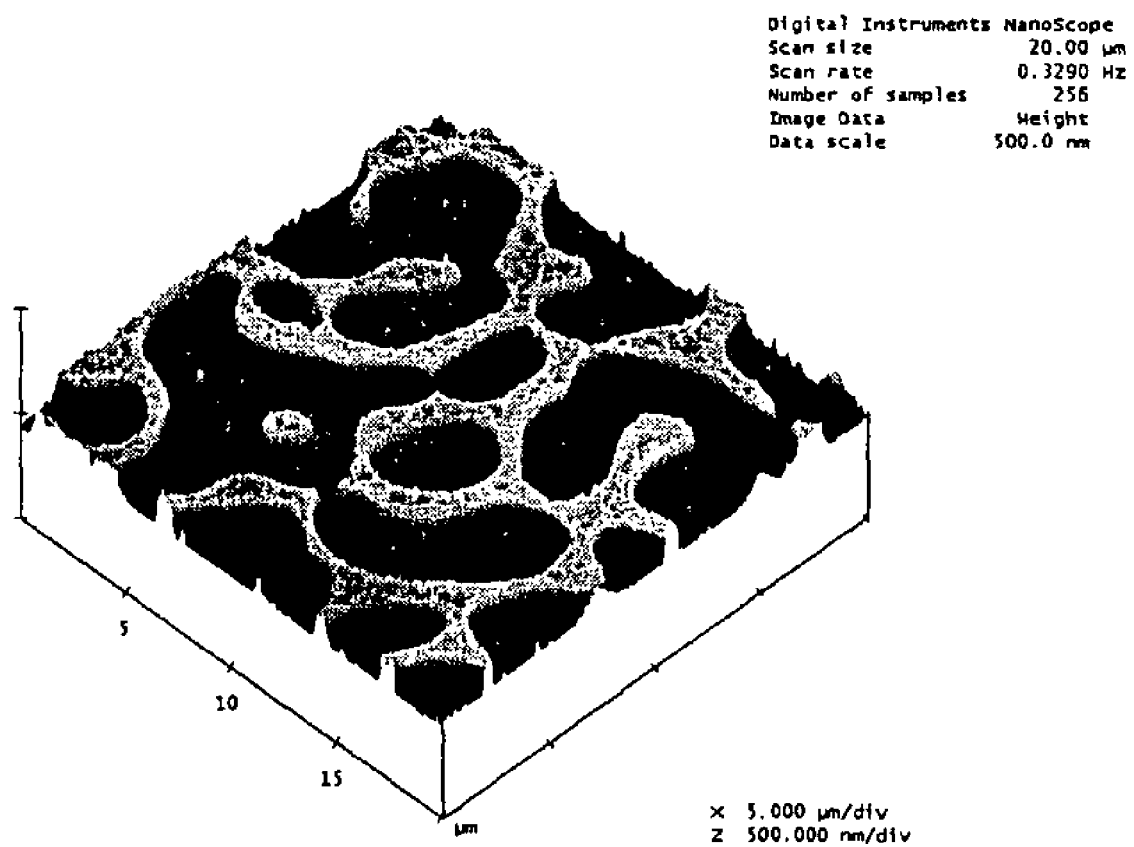

FIG. 20 shows an atomic force microscope (AFM) image of a phase separated morphology of a poly(methyl methacrylate) (PMMA)-polystyrene (PS) blend after spin-coating and removal of PS.

This image is obtained by spin-coating a polymer solution of high molecular weight poly(methyl methacrylate) (PMMA) and high molecular weight polystyrene (PS) onto a medium to high surface energy substrate. PS is then dissolved using an appropriate solvent without removing the PMMA domains. A thin residue layer of PMMA is then removed using an oxygen plasma treatment to form the final disordered pattern. This disordered pattern is then transferred to the underlying substrate below by one of several methods.

In the following, referring to FIG. 21A to FIG. 21F, views during a method for manufacturing an identification tag according to a further embodiment of the invention will be described.

This method is shown in FIG. 21A to FIG. 21F in which the disordered pattern is transferred onto a thin film of Ni by etching away parts of the Ni thin film.

Figure 21A:
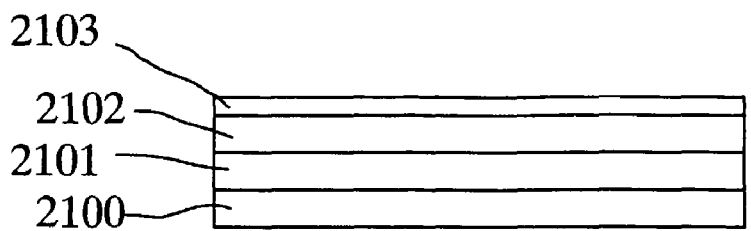

In this example, as shown in FIG. 21A, the substrate 2100 is made of Si and a thin film of Ni 2101 is deposited onto the Si substrate 2100 by a physical vapour deposition. A thin layer of Cr (not shown) is deposited before Ni to improve the adhesion of Ni 2101 to the Si substrate 2100. Photoresist 2102 is then spin-coated onto Ni 2101 before Cr 2103 is then deposited onto the Photoresist 2102.

Figure 21B:
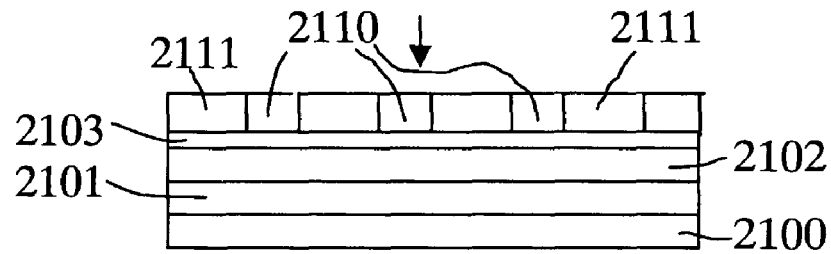

As shown in FIG. 21B, an immiscible polymer blend solution is spin-coated onto the Cr layer 2103 at a certain angular velocity to obtain the desired phase separated morphology, consisting of a PS phase 2110 and a remaining phase 2111.

Figure 21C:
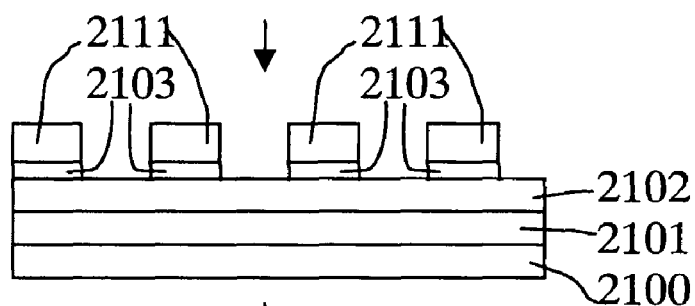

As shown in FIG. 21C, the PS phase 2110 is then selectively removed using a solvent such as cyclohexane so that the remaining phase 2111, namely PMMA, remains on the Cr 2103. The Cr layer 2103 is then wet etched with a Cr etch solution to obtain the layer sequence shown in FIG. 21C.

Figure 21D:
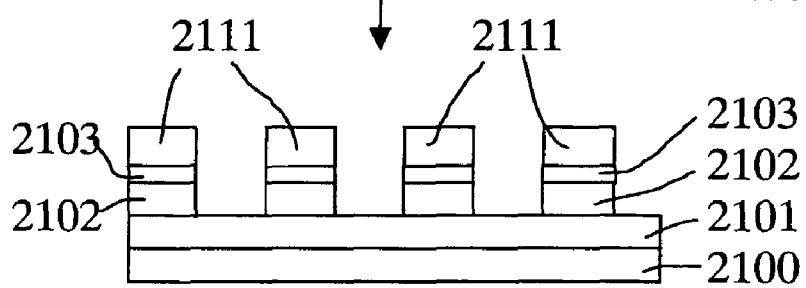

As shown in FIG. 21D, the exposed photoresist 2102 is then exposed to UV and developed thus revealing the Ni thin film 2101. Alternatively, the exposed photoresist 2102 can be removed with an anisotropic $O_2$ plasma etch.

Figure 21E:
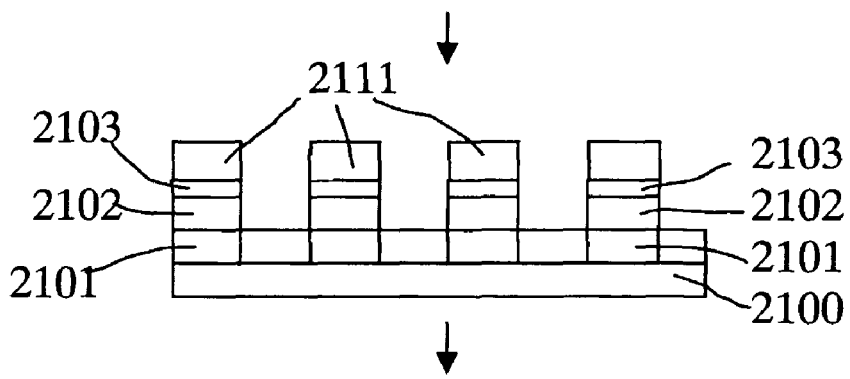

As shown in FIG. 21E, a Ni etching solution is then used to etch the Ni thin film 2101.

Figure 21F:
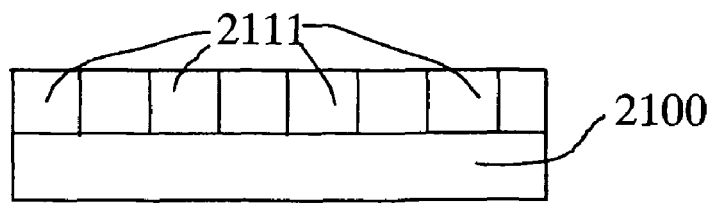

As shown in FIG. 21F, the photoresist 2102 is removed (together with the structures arranged above the photoresist) to finally result in the disordered patterns 2120 of Ni.

In the following, referring to FIG. 22A to FIG. 22F, views during a method for manufacturing an identification tag according to yet a further embodiment of the invention will be described.

FIG. 22A to FIG. 22F show a process to form a disordered pattern onto a substrate by electroplating Ni.

In this embodiment, as shown in FIG. 22A, the substrate 2200 is Si with a thin film of Au 2201 deposited onto Si 2200 by a physical vapour deposition. A thin layer of Cr (not shown) is deposited before Au 2201 to improve the adhesion of Au 2201 to the Si substrate 2200. Photoresist 2202 is then spin-coated onto Au 2201, and a Cr layer 2203 is deposited onto the photoresist 2202.

As shown in FIG. 22B, an immiscible polymer blend solution is spin-coated onto the Cr layer 2203 at a certain angular velocity to obtain the desired phase separated morphology, consisting of a PS phase 2210 and a remaining phase 2211.

As shown in FIG. 22C, the PS phase 2210 is selectively removed using a solvent such as cyclohexane so that the remaining phase 2211 of PMMA remains on Cr 2203. The Cr layer 2203 is then etched with a Cr etch solution.

As shown in FIG. 22D, the exposed photoresist 2202 is exposed to UV and developed thus exposing the Au thin film 2201. Alternatively, the exposed photoresist 2202 can be removed with an anisotropic $O_2$ plasma etch.

As shown in FIG. 22E, a Ni structure 2220 is then electrodeposited onto Au 2201 until a desired thickness is reached.

Then, see FIG. 22F, the photoresist 2202 (together with the structures arranged above the photoresist) is removed to finally result in the disordered patterns 2230 of Ni.

In the following, referring to FIG. 23A to FIG. 23D, views during a method for manufacturing an identification tag according to yet a further embodiment of the invention will be described.

FIG. 23A to FIG. 23D show an exemplary process to form a disordered pattern onto a substrate by electroless deposition of Ni.

Figure 23A:
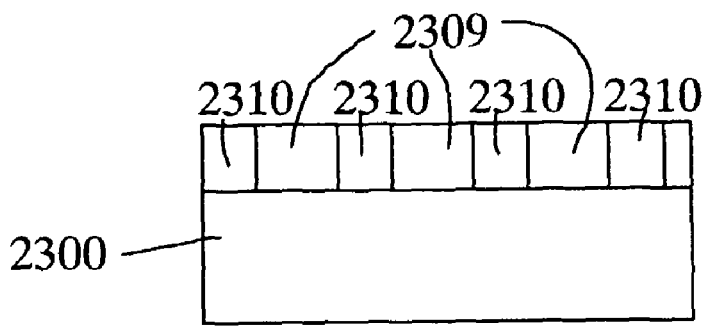

According to this embodiment, as shown in FIG. 23A, a substrate 2300 of Si is used. An immiscible polymer blend solution is spin-coated onto Si 2300 at a certain angular velocity to obtain the desired phase separated morphology, comprising a PS phase 2309 and a remaining phase 2310.

Figure 23B:
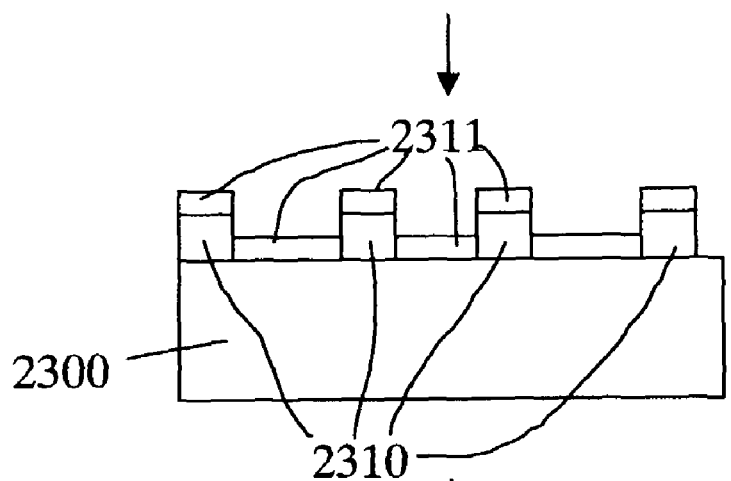

As illustrated in FIG. 23B, the PS phase 2309 is selectively removed using a solvent such as cyclohexane so that PMMA 2310 remains on the Si substrate 2300. A thin Cr adhesion layer 2311 is then physically vapour deposited followed by a thin Palladium layer (not shown).

Figure 23C:
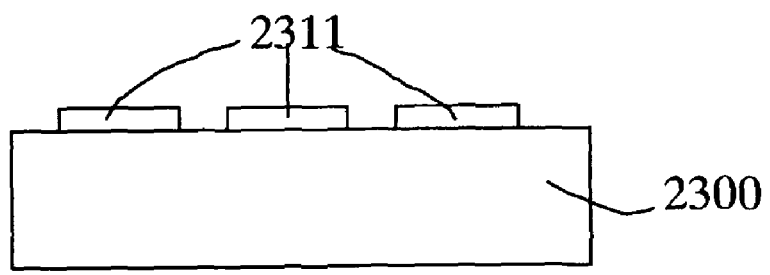

Next, see FIG. 23C, portions of the Pd—Cr film 2311 arranged on top of the remaining phase 2310 are lifted off by dissolving the PMMA 2310 in acetone.

Figure 23D:
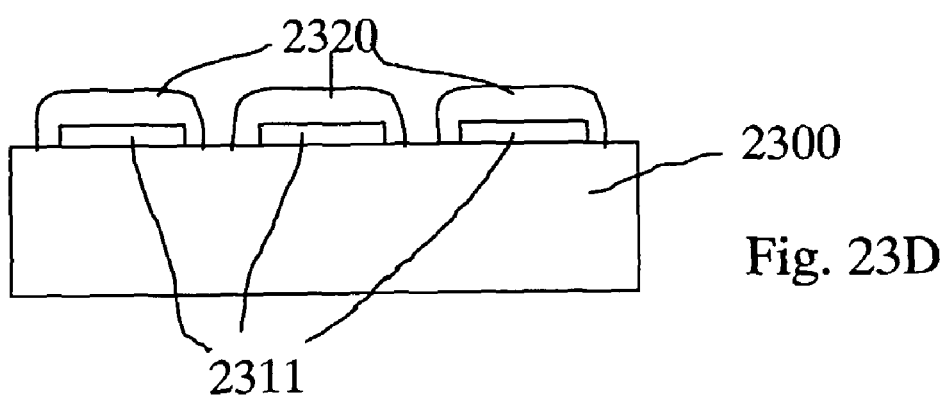

As shown in FIG. 23D, Ni 2320 is then deposited by immersing the Si substrate 2300 covered with remaining portions of the Pd—Cr film 2311 into a heated bath of electroless plating solution.

Figure 24:
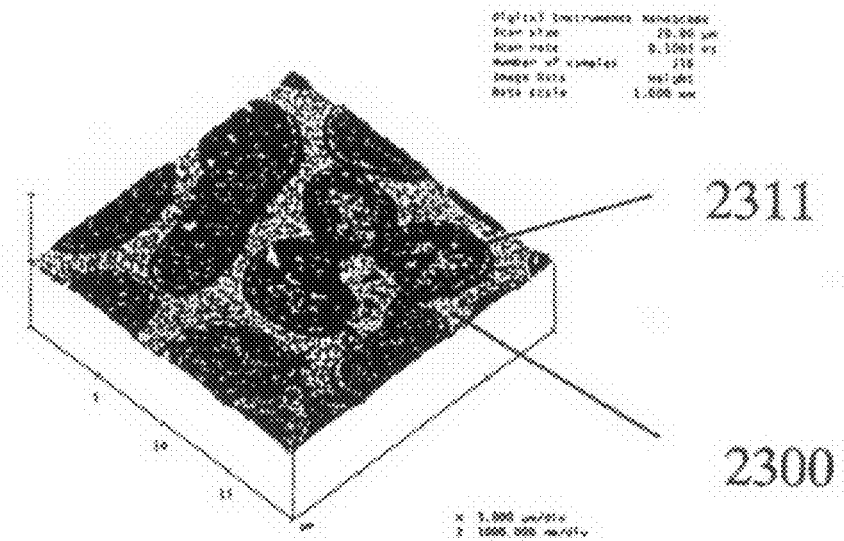
Figure 25:
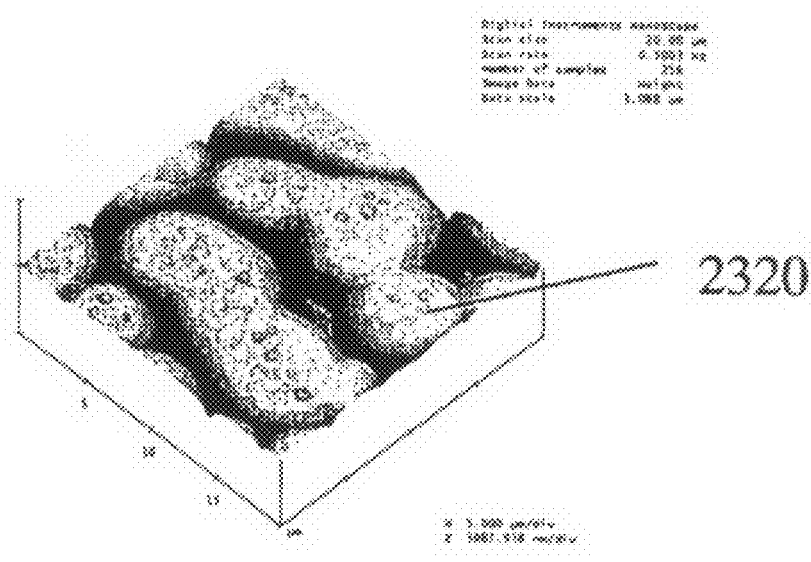

FIG. 24 and FIG. 25 show atomic force microscope images of the identification tag manufactured according to the method of the seventh embodiment of the invention.

In the above embodiments related to the use of the phase separated polymer to create a disordered layer, many variations can be performed. As an alternative to silicon, the substrate may be formed of any other solid material. Indeed, exemplary substrates are a polymer sheet, ceramic, glass, paper, wood, leather, textiles or metallic substrate. The choice of the substrate may be influenced by the service environment of the tag and similar considerations apply to that discussed for other cases above.

The overlying film is in the above case Ni (with a suitable intermediary adhesion layer or conductive layer). This may be any other magnetic material as disclosed for the previous embodiments (for example, Fe, Cr) or an alternative material if something other than a magnetic field is preferable for detection (e.g. Cu or Au if detecting an electrical characteristic as highlighted in other embodiments). It is also possible to combine the phase separation technique with particles, so that one of the polymer phases is preloaded with fine particles (ideally below 100 micrometer diameter, but preferably 1 micrometer diameter). These particles will stay within the phase, and migrate under surface tension towards the disordered boundaries created between the phases on mixing. Consequently, a disordered arrangement of particles is achieved that can be detected as described in the embodiments previously (for example, with a magnetic read-head in the case of using magnetic or magnetisable particles such as Ni).

The film has been described to be deposited by PVD, electroplating or electroless plating in the above three examples. However, this may also be achieved by, for example, evaporation, printing or spin-coating a metal-complex precursor or metal containing paste or suspension. As this is the layer that will define the width of the track, it is preferential to have a film that is less than 100 micrometers thick, and preferably still about 1 micrometer thick.

This process can be implemented in a roll-to-roll process as previously described, and may be combined with many of the other embodiments already discussed, for example in a multiplayer stack, as part of the object itself, and so on.

In all of the above embodiments, the laminates can be engineered to have a very thin carrier layer so that the act of removing the tag from the object disturbs or affects the identification layer to the extent that the signature no longer correlates with the original signature. This means that trying to remove a tag and place it on another (possibly counterfeit) object will not be possible.

Figure 26:
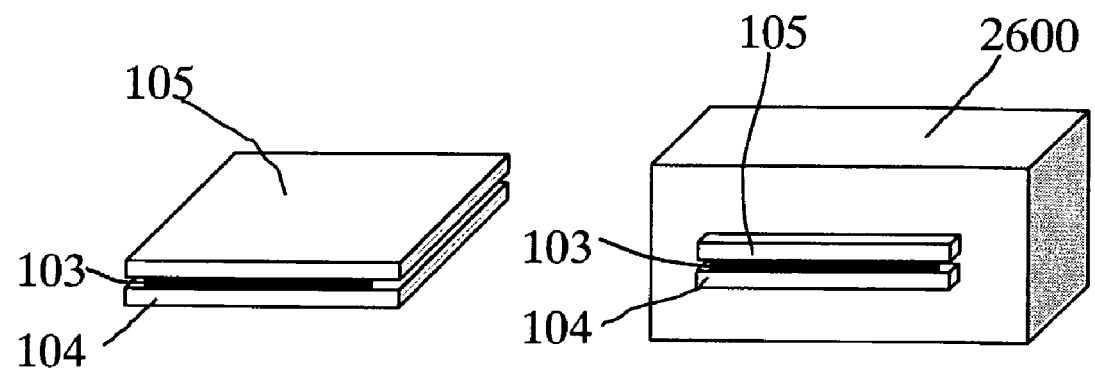

Once the identification layer has been formed in the manner described, a section can be cut so that it is very thin in one dimension. Such an embodiment is shown in FIG. 26 showing a layer sequence having a lower layer 104, an upper layer 105 and an identification layer 103 sandwiched between the lower layer 104 and the upper layer 105. A small slice of the layer sequence 103, 104, 105 is cut and is adhered to an object 2600 (see FIG. 26). In this respect it is noted that suitable techniques, for example diamond knife microtomy can cut ultrathin slices of material of a few 10 s of nanometers, a tag as described herein is typically about 100 micrometers or thicker in section, and so the thinnest dimension is still the thickness of the layer that comprises the identification features (in some embodiments ideally below 100 micrometers).

It is possible in the above embodiments to scale the level of security by changing the dimensions of the identification layer and associated track (longer tracks generally contain more information on a given length scale), the dimensions of the disorder (smaller scale disorder means that there is more information over a given length scale) and the complexity of that disorder (particle size variation, pore shape variation, and other degrees of freedom).

Figure 27:
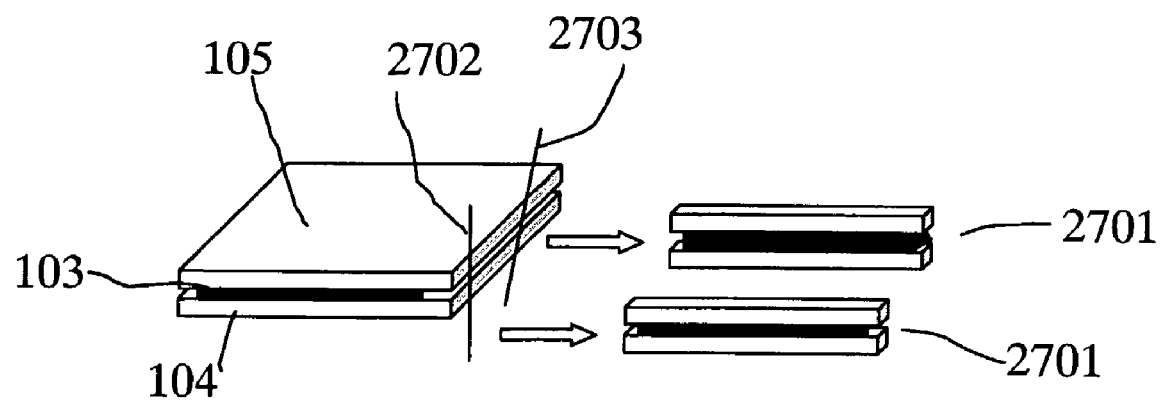

It is implied in the above embodiments for simplicity that the track created by exposing the thinnest dimension of the identification layer is perpendicular to the plane of the layers being considered. However, cutting and/or polishing the section at an angle is possible, as still the desirably narrow width of the track will be achieved. Only at very shallow angles does this not occur, and so at least angles greater than 10 degrees to the plane of the layers are useful, but angles of 80-90 degrees are preferential. This matter is illustrated in FIG. 27 showing that slices 2701, 2702 of the layer sequence 103, 104, 105 are cut using different angles (indicated by cutting lines 2702, 2703).

Figure 28:
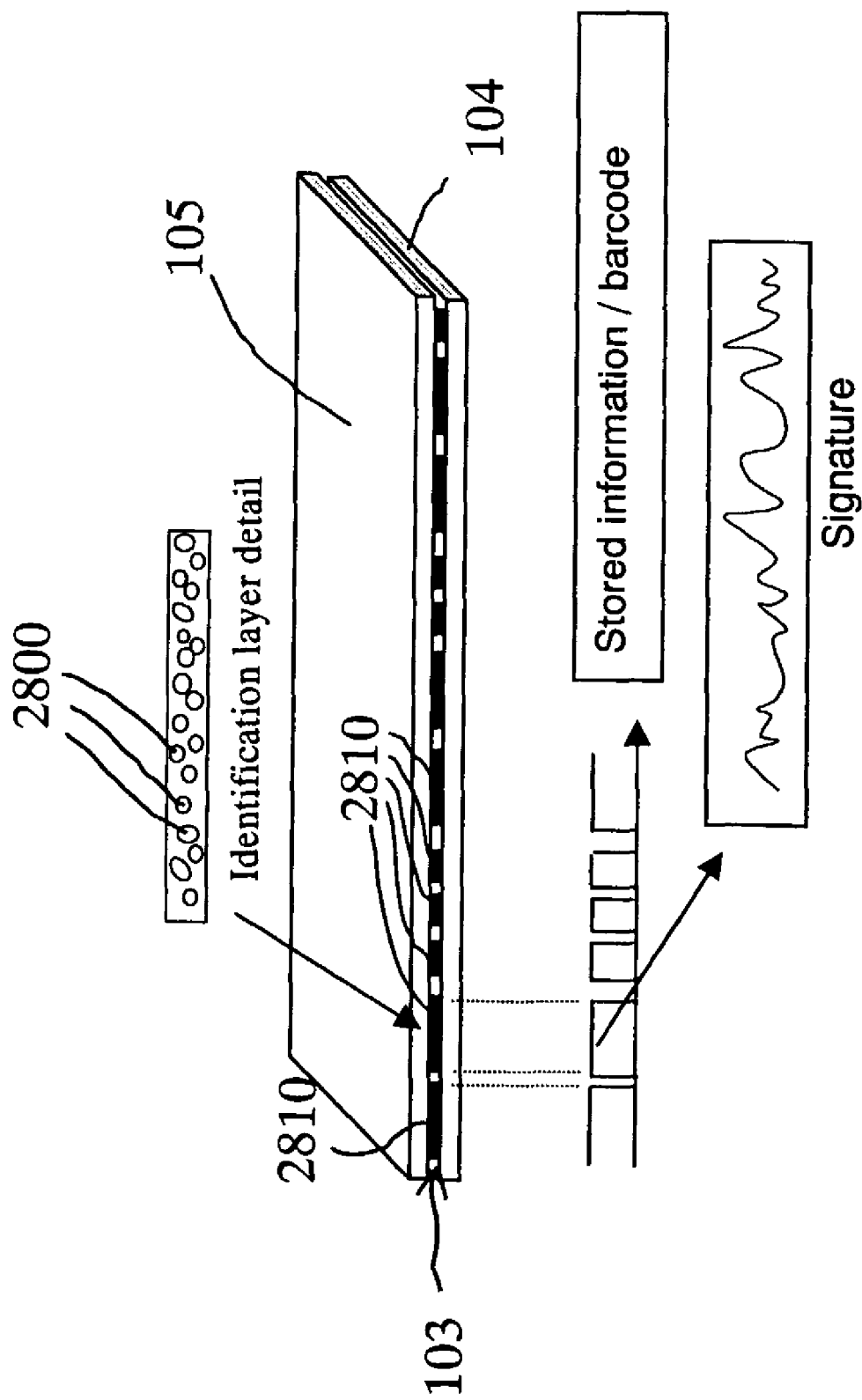

In the above embodiments, it is disclosed to locate information within the track as well (either throughout, or within a small designated portion thereof, or such that the track is a small designated portion of a strip with recorded information on). This is by considering different length scales of the disorder to the information, thus modulating one of the length scales so that, for example, bits of information may be stored. This is similar to a bar code, the domains in a magnetic strip or a binary number system. Such an embodiment is shown in FIG. 28, in which magnetic particle domains 2810 are physically deposited intermittently to correspond to the bits of information that wish to be stored permanently (e.g. a bar code that identifies a product family). On the finer scale showing magnetic particle elements 2800, the identification layer discussed previously is the detail within portions or one or more parts of this modulated structure.

Figure 29:
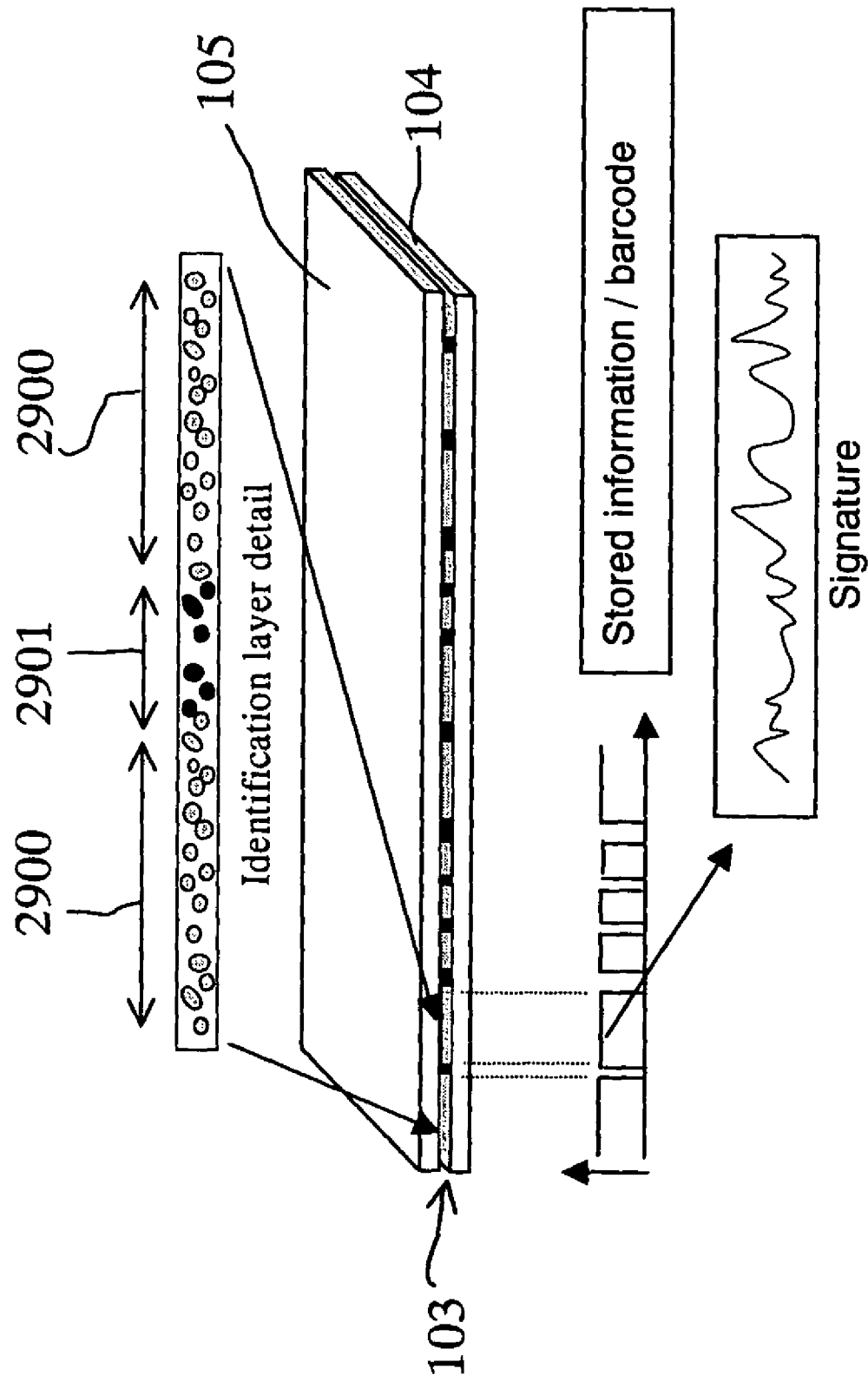

Another method according to the invention is similar to the above but rather than locating the information by modulating the physical structure, an extended continuous identification layer 103 is provided in which magnetic orientation is written "on" ("on"-portions 2900) and "off" ("off"-portions 2901) on one length scale, but the detailed structure of the particles acts as the fingerprint. This works particularly well where the particle density is high so that the bits of information on the larger length scale detected by a head with less resolution detects only little noise. FIG. 29 illustrates an embodiment of the invention in which this concept is realized.

Although the above illustrates storing information in terms of particles and magnetic material, it also applies to other embodiments, such as modulating the optical activity/reflectivity of particles to provide for an optical bar code with a finer fingerprint structure therein.

Figure 30A:
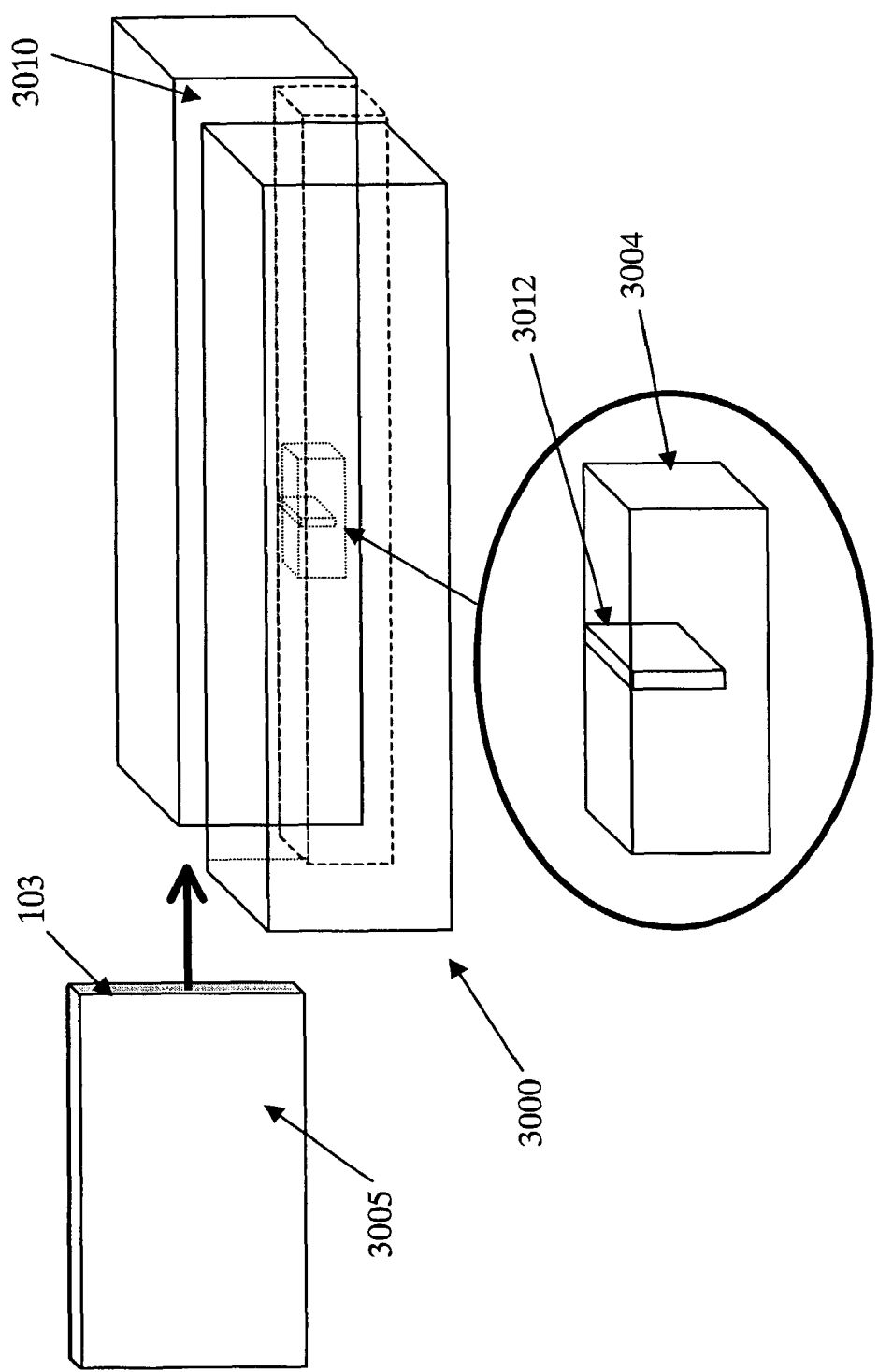
Figure 30C:

With reference to FIG. 30A a reading device 3000 according to the invention is described. The reading device comprises a slot 3010 as found in a conventional credit card reader, for example. In addition, the reader is adapted to have the read-head 3004 located at the bottom of the slot 3010. The reading element (sensor) 3012 or reading elements (note, for example, that in the case of a magnetic signal, the "reading element/s" could be standard inductive, anisotropic magnetoresistive (AMR), giant magnetoresistive (GMR) reading elements or they could be based on other concepts such as magneto-optical reading methods) is located in the read-head 3004 so as to encompass the width of the track. As shown in FIG. 30A, the reading element can be arranged substantially perpendicular to the movement of an object to be inserted into the slot 3010. Accordingly, once an object such as a credit card 900 comprising an identification layer 103 that has a track exposed for reading the identification features from the thinnest dimension of the identification layer 103 is moved through the slot 3010, the reading element 3012 in the read head 3004 reads the fingerprint. This fingerprint may then be further processed by the reading device 3000 to obtain the signature. Note that the reading device may further comprise a sensor for monitoring the position of the tag or track as it passes through the reading device—an optical motion detector, for example, is suitable for this purpose.

If provided, the reading device 3000 may further comprise suitable processing means (not shown) to compare the signature from the fingerprint read by the reading element with a pre-stored reference signature and to identify the credit card 3000 to be authentic, if the signature read from the credit card object differs from the pre-stored reference signature by less than a predetermined threshold. If the pre-stored signature is located in a remote data storage medium (with respect to the reading device), the reading device is usually adapted to receive the pre-stored reference signature from that remote data storage medium. However, more usually the reading device is adapted to send the read signature or fingerprint to the remote data storage medium where it is compared with the stored signatures. A message would then be sent (for example, back to the reading device) detailing if a match had been found, thus identifying and/or authenticating the tag or the object. Otherwise, if the pre-stored reference signature is stored on the object or tag itself, the reading device is (also) adapted to receive or read this pre-stored reference signature from the object or tag 3005.

Figure 30B:
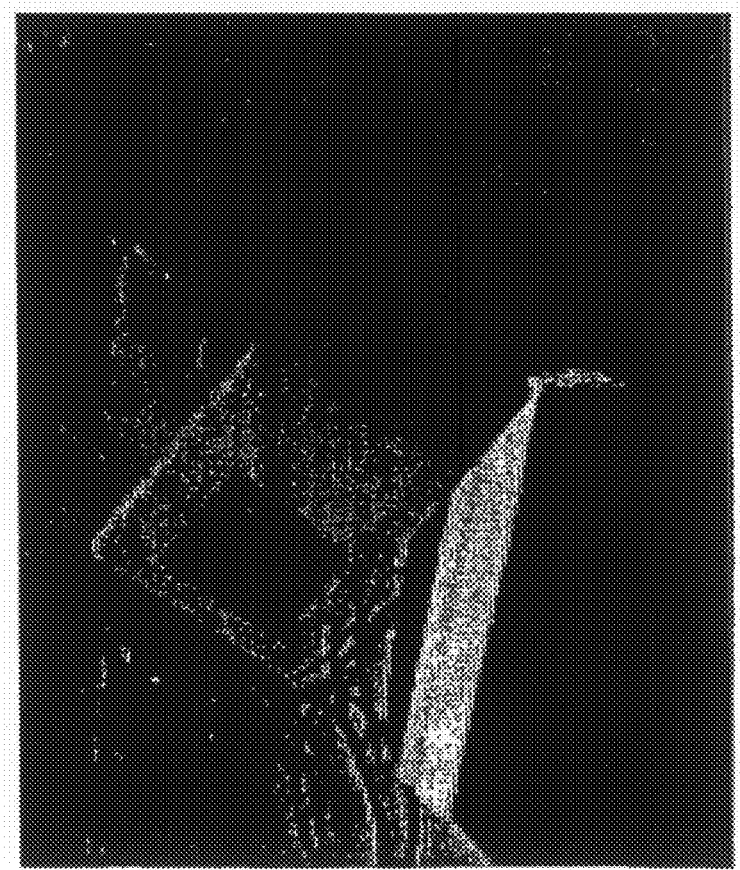

FIG. 30A and FIG. 30B show two examples of tagged objects that have been reduced to practice and read over one hundred times in laboratory tests. FIG. 30A shows a tagged identity card in the form of a credit-card sized laminated plastic card in which the tag comprises of magnetic particles dispersed between two sheets of plastic laminated together, cut to about 2 cm×1 cm in size and inserted between the layers of the plastic identity card prior to laminating. The leather sample shown in FIG. 30B comprises two pieces of wallet leather with a similar tag (plastic sheets with magnetic particles) inserted between them and glued together. The leather label (sample) is also about the size of a credit card and remains mechanically flexible. Both samples have been read repeatedly and reliably using a slot reader which is also shown in the photograph of FIG. 30A. The two examples illustrate that especially for magnetic or electrical reading of the identification features the track for reading the identification features does not have to be visible to be exposed for reading but can be buried within the object or covered by a protective layer.

Figure 31:
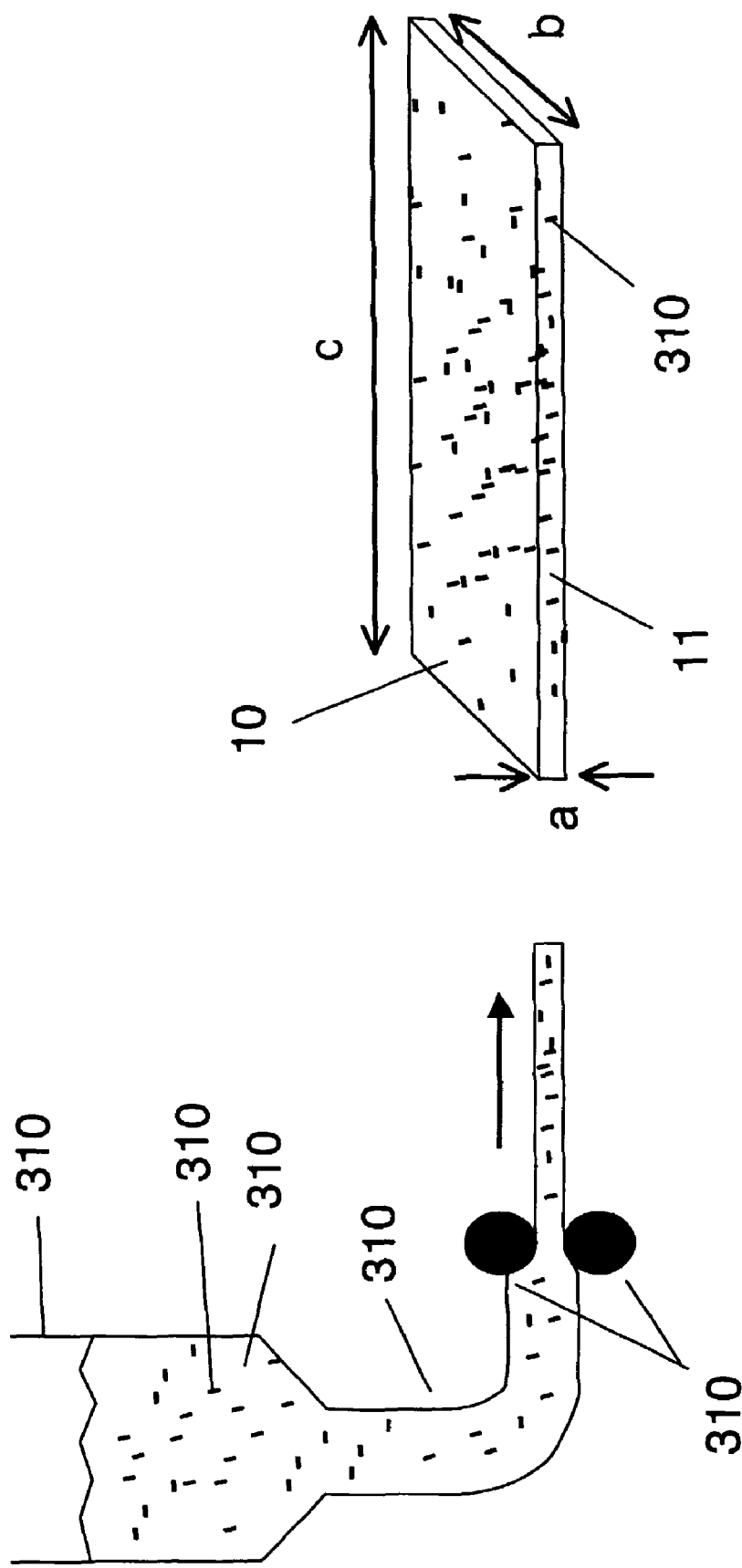

FIG. 31 shows the formation of a one-layer tag according to an embodiment of the invention. Here magnetic or magnetisable particles 3101 are mixed with a non-magnetic matrix material 3102 (this matrix material can be, but is not limited to, a polymer or metal). The mix flows from a hopper 3103 down a pipe 3104 and is extruded and/or rolled using an extruding/rolling mechanism 3105. An isometric view of the resulting tag is also shown in FIG. 31. In this case the identification layer 103 (with dimensions a, b, c) is sufficiently robust so as not to require supporting layers on either the top or bottom surface. The track, 110, is one or more of the thinnest edges of the tag and is of width "a". As in tags using two or more layers the magnetic or magnetisable particles at or near the surface of the track contribute to the magnetic fingerprint that is read by a reading device that is moved along the track.

Figure 32:
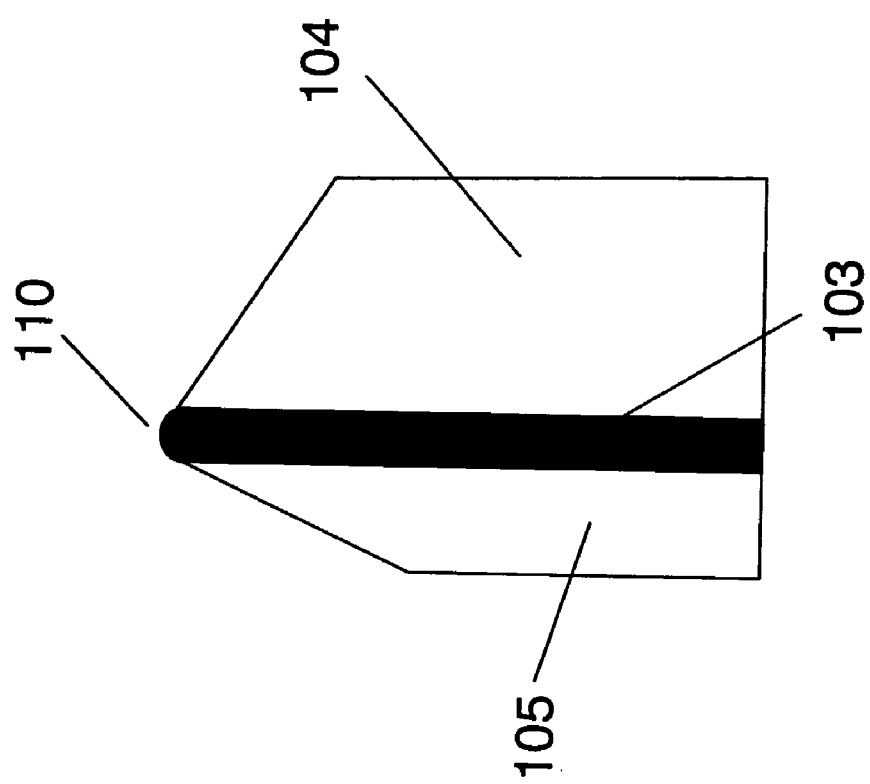

FIG. 32 shows a cross-section of a three-layer tag according to a further embodiment of the invention. The track 110 is formed from the exposed thinnest dimension of the identification layer 103. In this case, the tag surface containing the track 110 is a shallow non-symmetrical v-shaped surface. Furthermore the top 105 and bottom 104 supporting layers are not of the same thickness. However, it is now clear that a reading device with an appropriately shaped guide is able to reliably read the fingerprint from the track. Furthermore it will be clear that the track may be contained in a tag surface with virtually any shape providing that a suitably shaped reading device can be made that allows the reading element to be passed along the track that exposes the identification layer of a tag or object of the invention.

What is claimed is:

1. An identification tag
comprising at least one identification layer including a plurality of randomly distributed particles forming identification features,
wherein a track for reading the readable identification features is configured to expose a thinnest dimension of the identification layer such that at least some of the readable identification features are only meaningfully readable from said track, and wherein one portion of the track is configured for meaningfully reading at least some of the readable identification features without activation or excitation of the identification layer via a different portion of the track.

2. The identification tag according to claim 1, wherein the identification tag is attachable to an object to be identified in a manner such that at least some of the readable identification features are only meaningfully readable from the thinnest dimension of the identification layer.

3. The identification tag according to claim 1, further comprising a top layer arranged on top of the identification layer.

4. The identification tag according to claim 3, further comprising a bottom layer, wherein the identification layer is arranged between the bottom layer and said top layer.

5. The identification tag according to claim 4,
further comprising at least one further identification layer arranged between said bottom layer and said top layer.

6. The identification tag according to claim 5,
further comprising at least one intermediate layer arranged between said at least one identification layer and said at least one further identification layer.

7. The identification tag according to claim 4,
further comprising at least one alignment layer arranged between said bottom layer and said top layer, wherein the at least one alignment layer is configured to facilitate the alignment during the process of reading said readable identification features.

8. The identification tag according to claim 4, wherein the bottom layer comprises a material selected from the group consisting of a plastic, a metal, a ceramic, a textile, a leather, a glass, and combinations thereof.

9. The identification tag according to claim 1,
wherein said at least one identification layer comprises a material selected from a plurality of randomly distributed magnetic or magnetizable particles, a plurality of randomly distributed conductive and/or semiconductive particles, a plurality of randomly distributed optically active particles, or combinations thereof.

10. The identification tag according to claim 1, wherein the identification layer comprises a material selected from the group consisting of alumina, metals, ceramics, polymers, and combinations thereof.

11. The identification tag of claim 1, wherein the identification layer comprises is a magnetic material selected from the group consisting of Fe, Ni, Co, their alloys, their oxides, and combinations thereof.

12. The identification tag according to claim 1, wherein the plurality of randomly distributed particles have a largest dimension of between 10 nanometers and 500 micrometers.

13. The identification tag according to claim 12,
wherein the track has a width of about 100 nanometers to about 1 millimeter.

14. The identification tag of claim 12, wherein the track has a width selected from the group consisting of a width of less than about 500 micrometers, less than about 100 micrometers, less than about 10 micrometers, less than about 1 micrometer, and less than about 500 nanometers.

15. The identification tag according to claim 1, wherein the track is substantially covered by a protective coating.

16. The identification tag of claim 15, wherein the protective coating comprises a material selected from the group consisting of a polymeric coating, a sol-gel, amorphous diamond, and a diamond-like material.

17. The identification tag according to claim 1, wherein the track is the only accessible portion of the identification layer.

18. A system comprising
an identification tag according to claim 1; and
an object to which said identification tag is attached.

19. An object adapted to be identified, said object comprising at least one identification layer comprising a plurality of randomly distributed particles forming identification features, wherein a track for reading the identification features is configured to expose a thinnest dimension of the identification layer in such a manner that at least some of the identification features are only meaningfully readable from said track, and wherein one portion of the track is configured for meaningfully reading at least some of identification features without activation or excitation of the identification layer via a different portion of the track.

20. The object according to claim 19, wherein the track is configured to expose only one side of the identification layer.

21. The object according to claim 19, wherein the object is selected from the group consisting of a luxury item, an engineering component, a textile, a packaging, a seal to a container or vessel, a credit card, a certificate, a bank note, a security access card, a vehicular key-card, a passport, an identity card, a lead frame, an electronic device package, and a media disk.

22. A reading device for reading identification features of an identification tag or an object to be identified, said reading device comprising:
   at least one reading element adapted for reading the identification features comprising a plurality of randomly distributed particles disposed in an identification layer of the identification tag, wherein a track is configured for reading the identification features and to expose a thinnest dimension of the identification layer in such a manner that at least some of the readable identification features are only meaningfully readable from said track,
   wherein the at least one reading element is adapted for meaningful reading information from at least some of the plurality of randomly distributed particles from one portion of the track without activation or excitation of the identification layer via a different portion of the track, and
   wherein the at least one reading element is arranged with its longest dimension substantially perpendicularly to the relative motion between the reading device and the tag or object being identified; and
   guiding means for guiding said reading element along said track.

23. An identification system comprising:
   an identification tag comprising an identification layer including a plurality of randomly distributed particles forming identification features, wherein a track for reading the identification features exposes a thinnest dimension of the identification layer such that at least some of the identification features are only meaningfully readable from said track, and wherein one portion of the track is configured for meaningfully reading at least some of the identification features without activation or excitation of the identification layer via a different portion of the track; and
   a reading device for reading identification information encoded in said identification tag, said reading device comprising:
      at least one reading element arranged with its longest dimension substantially perpendicularly to a relative motion between the reading device and the tag or an object being identified; and
      guiding means for guiding said at least one reading element along said track.

24. A method for forming an identification tag for identifying an object to which said identification tag is configured to attach, said identification tag comprising at least one identification layer in which readable identification features are located, wherein said method comprises:
   forming said at least one identification layer such that the identification layer comprises a plurality of randomly distributed particles forming the readable identification features;
   forming a track for reading the readable identification features from at least one edge of the identification layer such that said track exposes a thinnest dimension of the identification layer in such a manner that at least some of the readable identification features are only meaningfully readable from said track, wherein one portion of the track is configured for meaningfully reading at least some of identification features without activation or excitation of the identification layer via a different portion of the track.

25. A method for forming an object adapted to be identified, said object comprising an identification layer in which readable identification features are located, wherein said method comprises:
   forming said at least one identification layer including a plurality of randomly distributed particles that form the readable identification features;
   forming a track for reading the readable identification features from at least one edge of the identification layer such that said track exposes a thinnest dimension of the identification layer in such a manner that at least some of the readable identification features are only meaningfully readable from this thinnest dimension of the identification layer, wherein one portion of the track is configured for meaningfully reading at least some of the readable identification features without activation or excitation of the identification layer via a different portion of the track.

* * * * *